United States Patent
Fish, III

(10) Patent No.: US 7,424,524 B2
(45) Date of Patent: Sep. 9, 2008

(54) DISTRIBUTED MEANS OF ORGANIZING AN ARBITRARILY LARGE NUMBER OF COMPUTERS

(75) Inventor: Russell H. Fish, III, Dallas, TX (US)

(73) Assignee: Viametrix Inc., Dallas, TX (US)

( * ) Notice: Subject to any disclaimer, the term of this patent is extended or adjusted under 35 U.S.C. 154(b) by 909 days.

(21) Appl. No.: 10/178,075

(22) Filed: Jun. 21, 2002

(65) Prior Publication Data

US 2003/0009512 A1 Jan. 9, 2003

(51) Int. Cl.
*G06F 15/16* (2006.01)

(52) U.S. Cl. .................... 709/220; 709/227; 370/408; 714/6

(58) Field of Classification Search ................ 709/220, 709/224, 227, 228; 370/408, 238; 714/6
See application file for complete search history.

(56) References Cited

U.S. PATENT DOCUMENTS

| | | | |
|---|---|---|---|
| 4,616,358 A | 10/1986 | Rehm et al. ................ 370/58 |
| 4,855,903 A | 8/1989 | Carleton et al. ............ 364/200 |
| 5,166,674 A | 11/1992 | Baum et al. ............ 340/825.07 |
| 5,224,100 A | 6/1993 | Lee et al. ................. 370/94.3 |
| 5,371,744 A | 12/1994 | Campbell et al. ............ 371/8.2 |
| 5,471,580 A | 11/1995 | Fujiwara et al. ....... 395/200.02 |
| 5,483,652 A | 1/1996 | Sudama et al. ............ 395/600 |
| 5,540,441 A | 7/1996 | Ilan et al. ................. 273/269 |
| 5,544,314 A | 8/1996 | Fuchsreiter et al. ........ 395/200 |
| 5,574,770 A | 11/1996 | Yoo et al. .................. 379/34 |
| 5,706,276 A | 1/1998 | Arslan et al. .............. 370/216 |
| 5,835,723 A | 11/1998 | Andrews et al. ....... 395/200.56 |
| 5,850,592 A | 12/1998 | Ramanathan ................ 455/7 |
| 5,859,983 A | 1/1999 | Heller et al. .......... 395/200.81 |
| 5,884,031 A | 3/1999 | Ice ....................... 395/200.33 |
| 5,933,826 A | 8/1999 | Ferguson .................... 707/9 |
| 5,940,529 A | 8/1999 | Buckley .................... 382/155 |
| 5,983,214 A | 11/1999 | Lang et al. .................. 707/1 |
| 6,026,447 A | 2/2000 | Badovinatz et al. ........ 709/300 |
| 6,028,857 A | 2/2000 | Poor ........................ 370/351 |
| 6,035,331 A | 3/2000 | Soga et al. ................ 709/223 |
| 6,058,423 A | 5/2000 | Factor ...................... 709/226 |
| 6,078,847 A | 6/2000 | Eidson et al. .............. 700/229 |
| 6,084,864 A | 7/2000 | Liron ....................... 370/316 |
| 6,088,758 A | 7/2000 | Kaufman et al. ........... 711/100 |
| 6,144,989 A | 11/2000 | Hodjat et al. .............. 709/202 |
| 6,175,899 B1 | 1/2001 | Baylor et al. .............. 711/144 |
| 6,226,788 B1 | 5/2001 | Schoening et al. ........... 717/6 |
| 6,230,252 B1 | 5/2001 | Passint et al. .............. 712/12 |
| 6,347,331 B1 * | 2/2002 | Dutcher et al. ............. 709/203 |
| 6,381,628 B1 | 4/2002 | Hunt ........................ 709/201 |
| 6,442,706 B1 * | 8/2002 | Wahl et al. ................... 714/6 |
| 6,704,320 B1 * | 3/2004 | Narvaez et al. ............. 370/408 |
| 6,823,376 B1 * | 11/2004 | George et al. .............. 709/221 |
| 6,834,299 B1 * | 12/2004 | Hamilton et al. ........... 709/220 |
| 7,111,053 B1 * | 9/2006 | Black et al. ............... 709/220 |

* cited by examiner

*Primary Examiner*—Khanh Dinh
(74) *Attorney, Agent, or Firm*—Schultz & Associates, P.C.

(57) ABSTRACT

A technique for organizing a plurality of computers such that message broadcast, content searching, and computer identification of the entire collection or a subset of the entire collection may be performed quickly without the use of a controlling computer. The technique describes the creation, operation, and maintenance of a connection scheme by which each computer in the collection appears to be the top level of a hierarchical array. The maintenance of this hierarchical connection scheme allows one to many communications throughout the collection of computers to scale geometrically rather than linearly.

12 Claims, 51 Drawing Sheets

| Level | Population of the Level | Total Network Population |
|---|---|---|
| 1 | 1 | 1 |
| 2 | 4 | 5 |
| 3 | 8 | 13 |
| 4 | 12 | 25 |
| 5 | 16 | 41 |
| 6 | 20 | 61 |
| 7 | 24 | 85 |
| 8 | 28 | 113 |
| 9 | 32 | 145 |
| 10 | 36 | 181 |

FIG. 6

| Next State / Initial State | State1 | State2 | State3 | State4 | State5 | State6 | State7 |
|---|---|---|---|---|---|---|---|
| State1 | x | found collection of computers | x | x | x | x | x |
| State2 | lost N0 link | x | found edge of collection on radial | found edge of collection on indirect radial | found edge of collection on indirect radial, N012 vacant | found edge of collection on indirect radial, N1 & N01 vacant | found edge of collection on indirect radial, N1 vacant & on radial |
| State3 | lost all Links | x | x | orbit counter-clockwise | orbit counter-clockwise N012 vacant | orbit counter-clockwise N1 & N01 vacant | x |
| State4 | lost all links | x | x | x | orbit counter-clockwise N012 vacant | orbit counter-clockwise N1 & N01 vacant | orbit counter-clockwise N1 vacant & on radial |
| State5 | lost all Links | x | x | x | x | N01 disappears | x |
| State6 | lost all links | x | x | x | x | x | x |
| State7 | lost all Links | x | orbit counter-clockwise | x | x | x | x |

FIG. 9A-1

| Next State / Initial State | State1 | State2 | State3 | State4 | State5 | State6 | State7 |
|---|---|---|---|---|---|---|---|
| State8 | lost all Links | X | X |  |  |  | orbit counter-Clockwise N1 is on radial |
| State9 | lost all Links | X | X | X | X |  | N1 disappears X |
| State10 | lost all Links | X | N1 & N2 disappear X | X | X | X |  |
| State11 | lost all Links | X | X | X | N1 & N2 disappear X | N1,N2,&N01 disappear X | X |
| State12 | lost all Links | X | N0 reappears decay to radial,N2 Vacant | X |  | X | X |
| State13 | lost all Links | X |  | N0 reappears | X | X |  |
| State14 | lost all links |  |  |  |  |  |  |

FIG 9A-2

| Next State / Initial State | State8 | State9 | State10 | State11 | State12 | State13 | State14 |
|---|---|---|---|---|---|---|---|
| State1 | X | X | X | X | X | X | X |
| State2 | X | found Collection of Computers, N1 Is on radial | X | X | X | X | X |
| State3 | X | X | N2 appears X | X | X | X | X |
| State4 | orbit Counter-Clockwise | N1 appears on radial | X | N1 appears | X | N0 disappears | X |
| State5 | N1 Reappear | X | X | N1 & N12 reappear | X | X | N0 disappears |
| State6 | N1 & N01 Reappear | X | X | N1,N2,&N01 reappear | X | X | N0 disappears |
| State7 | X | N1 Appears | X | X | X | X | N0 disappears |

FIG. 9A-3

| Next State / Initial State | State8 | State9 | State10 | State11 | State12 | State13 | State14 |
|---|---|---|---|---|---|---|---|
| State8 | X | X | X | N12 Reappears X | X | X | N0 disappears |
| State9 | X | X | X | orbit Counter-clockwise | X | X | No disappears X |
| State10 | X | X | X | X | N0 disappears | X | X |
| State11 | N12 Disappears | N12 disappears N1 on radial | X | X | X | N0 disappears N0 on radial | N0 disappears |
| State12 | X | X | N0 reappears X | X | X | X | X |
| State13 | X | N0 Reappears N1 exists, N12 is vacant | X | N0 reappears N1,N12,&N2 exist | X | X | X |
| State14 | N0 reappears N1 exists N12 is vacant | N0 reappears N1 exists N12 exists | X | X | X | X | |

State 1

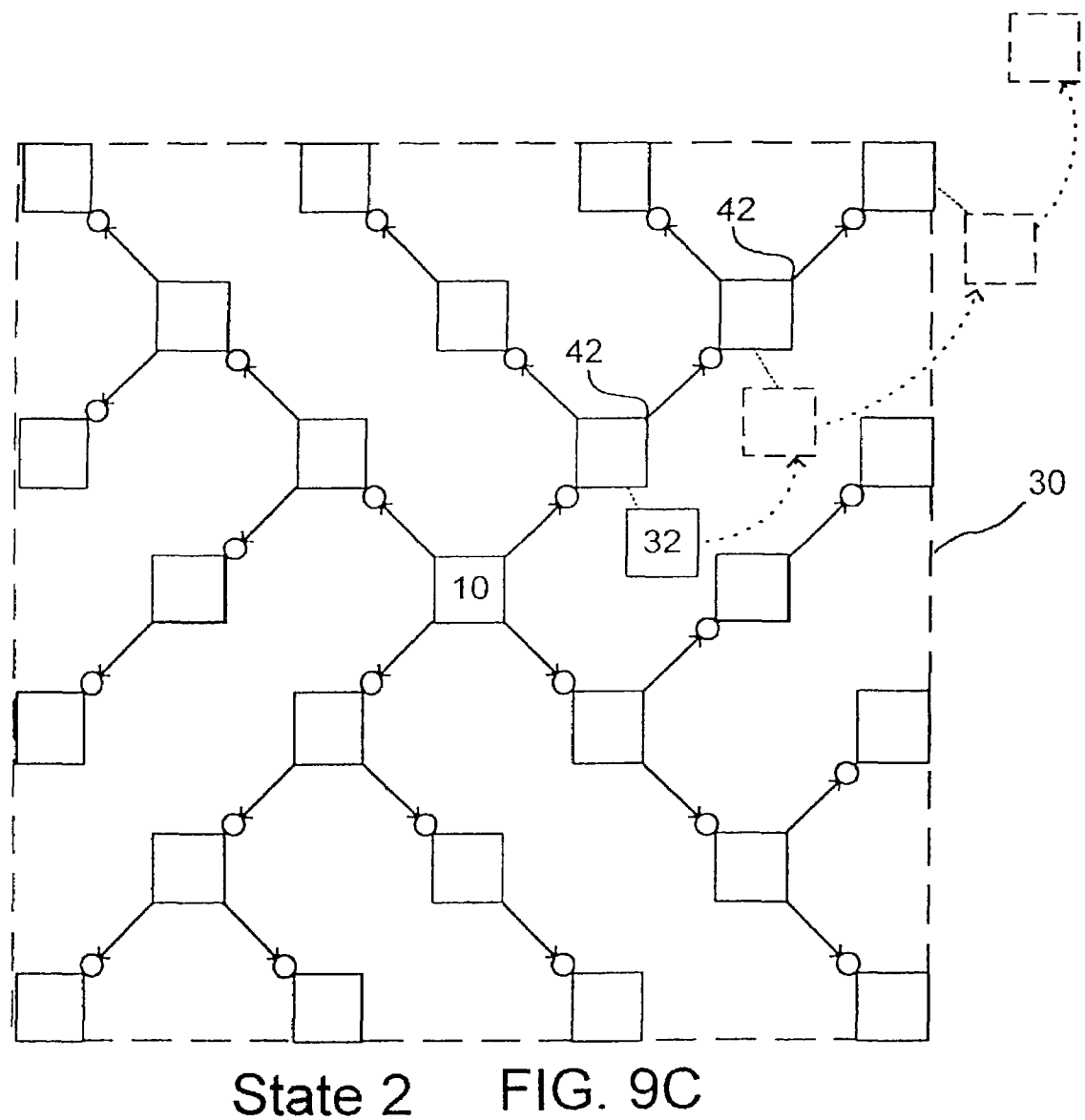
State 2   FIG. 9C

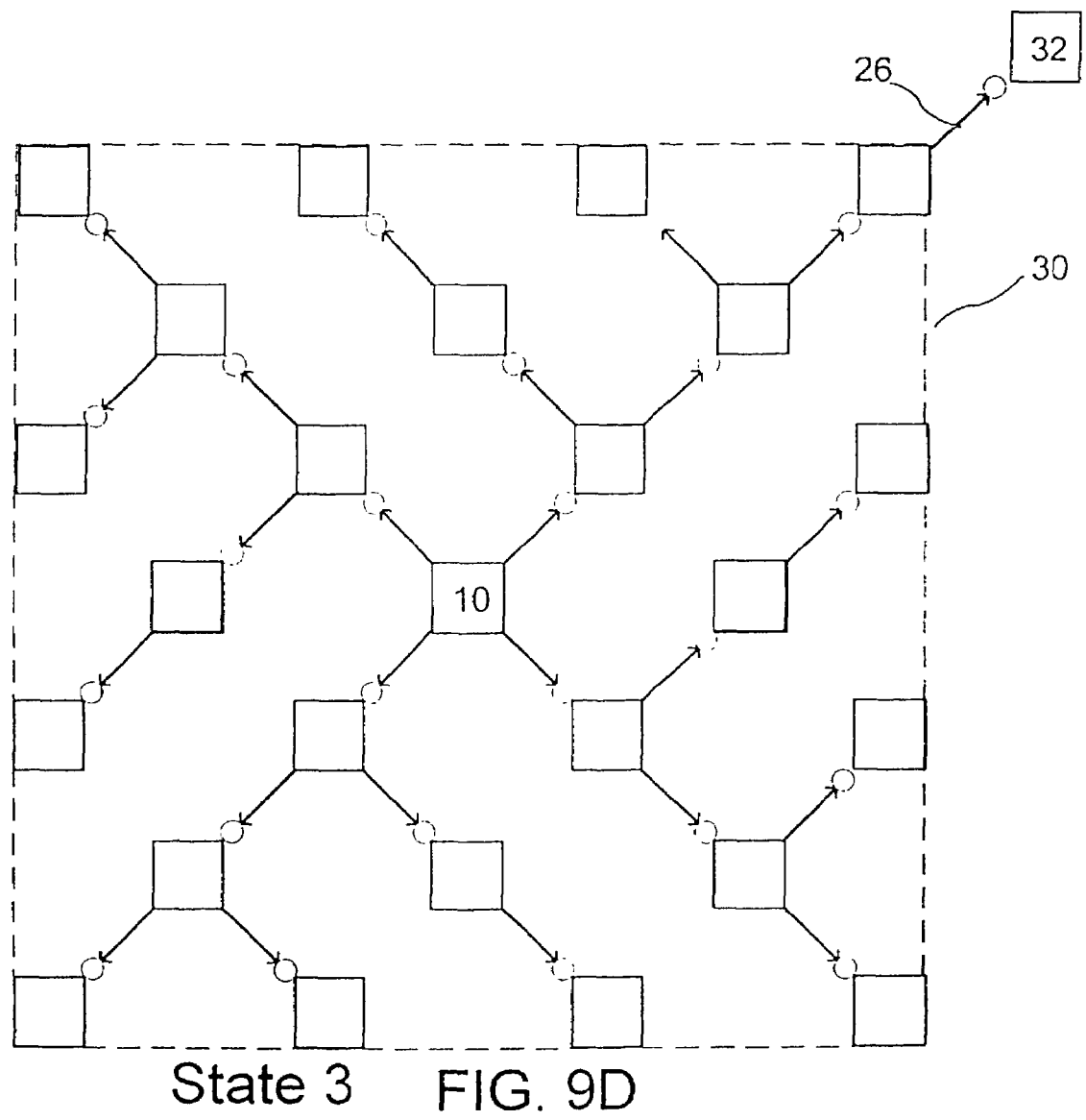
State 3   FIG. 9D

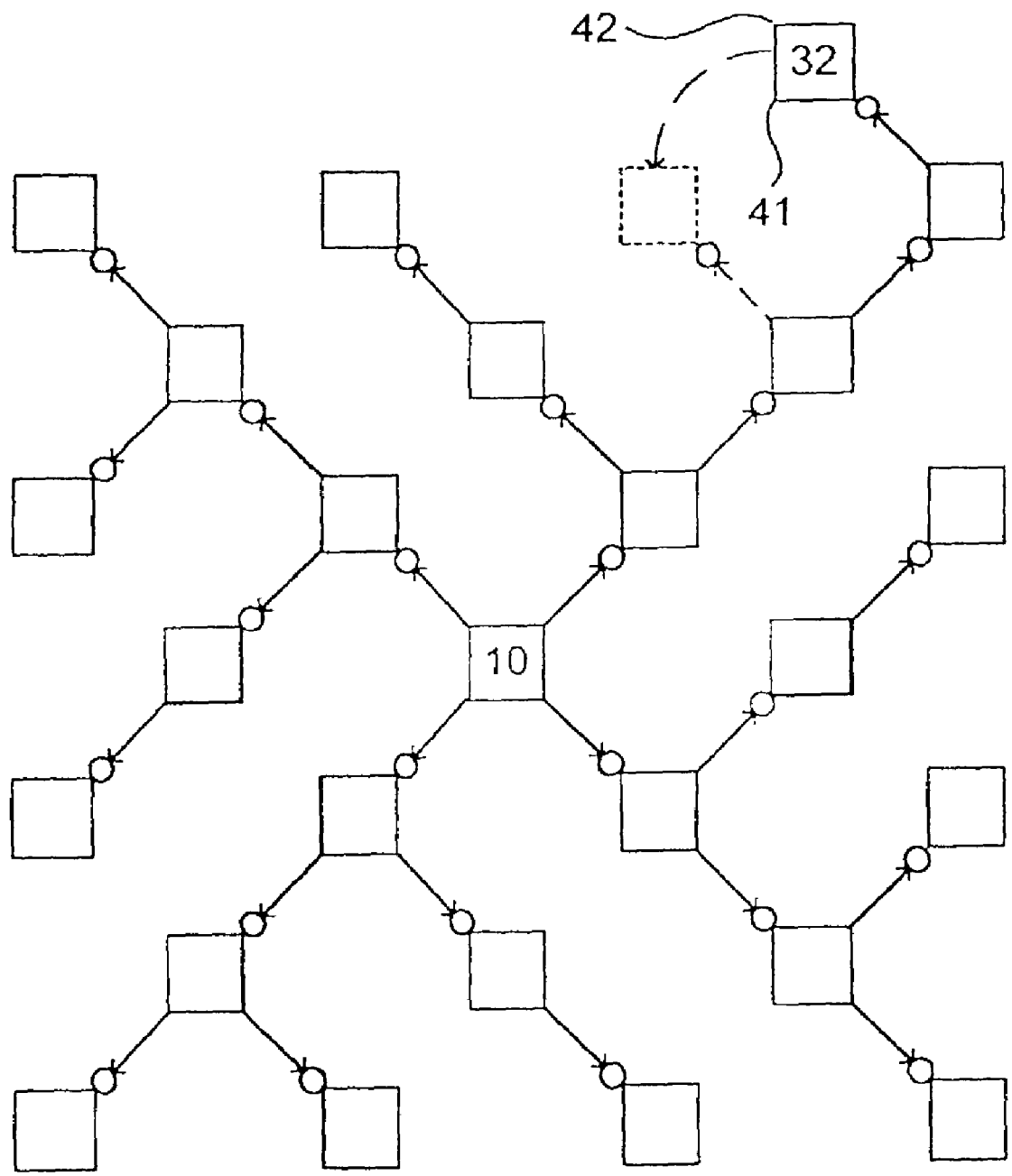
State 4    FIG. 9E

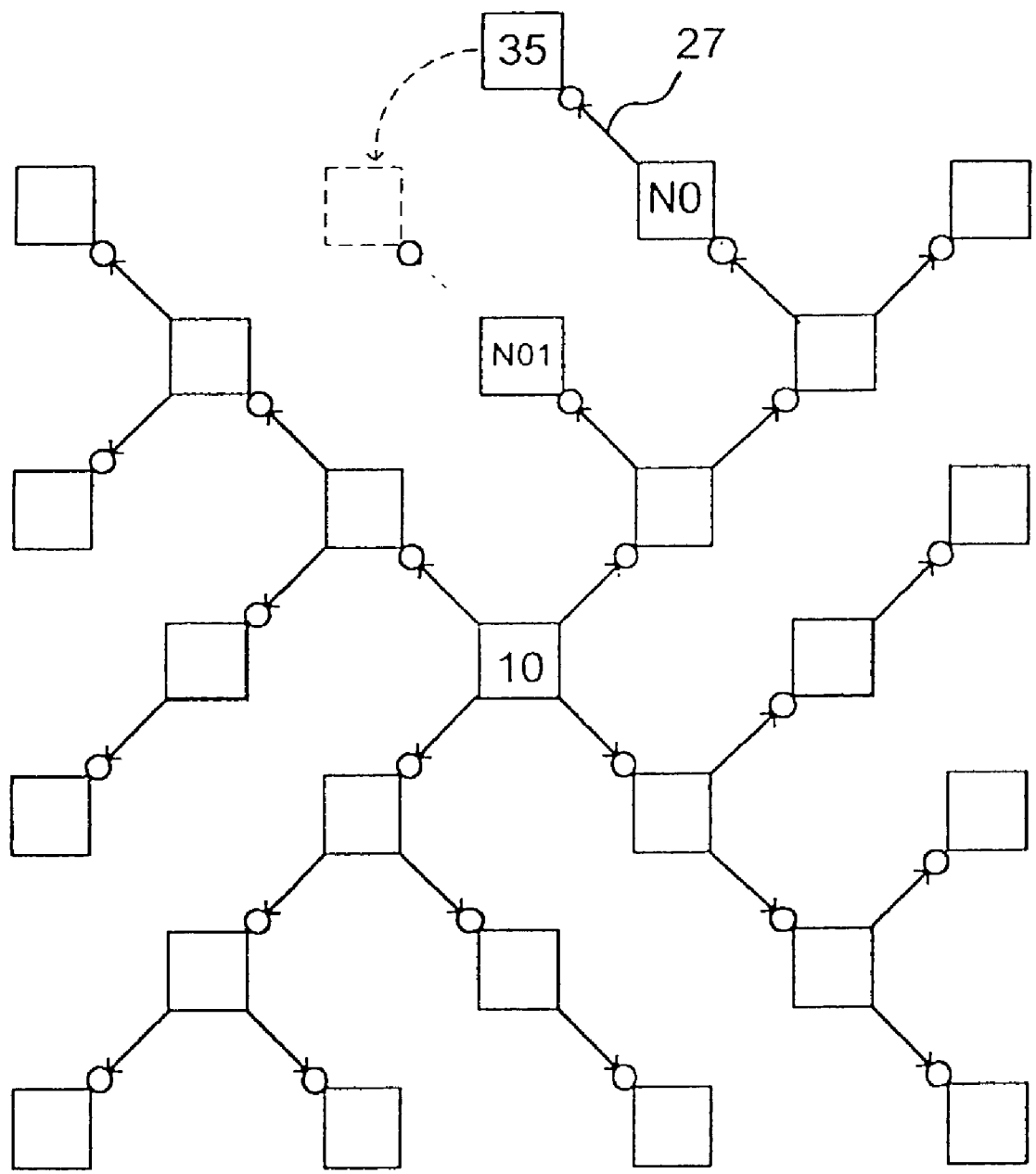
State 5  FIG. 9F

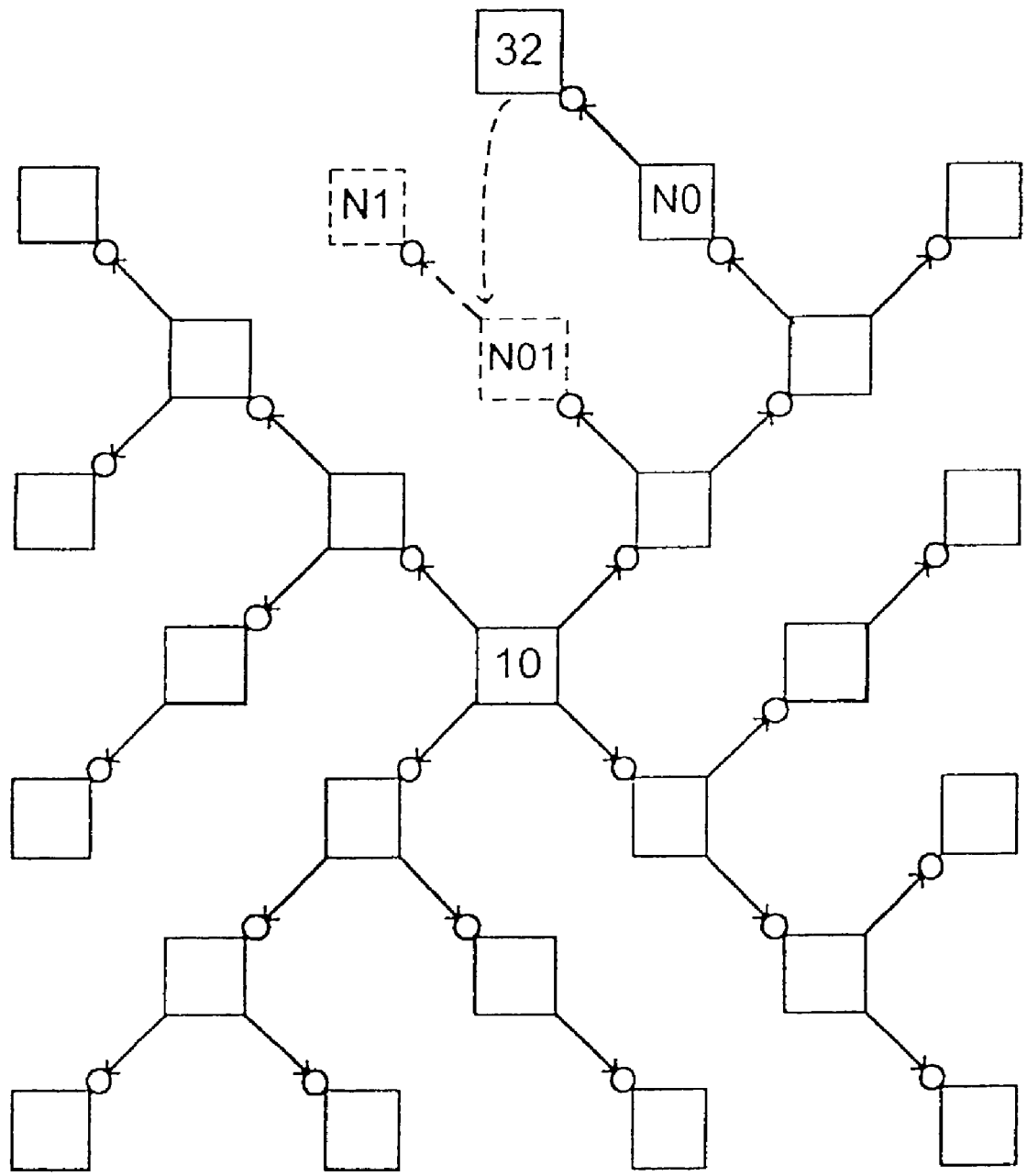
State 6     FIG. 9G

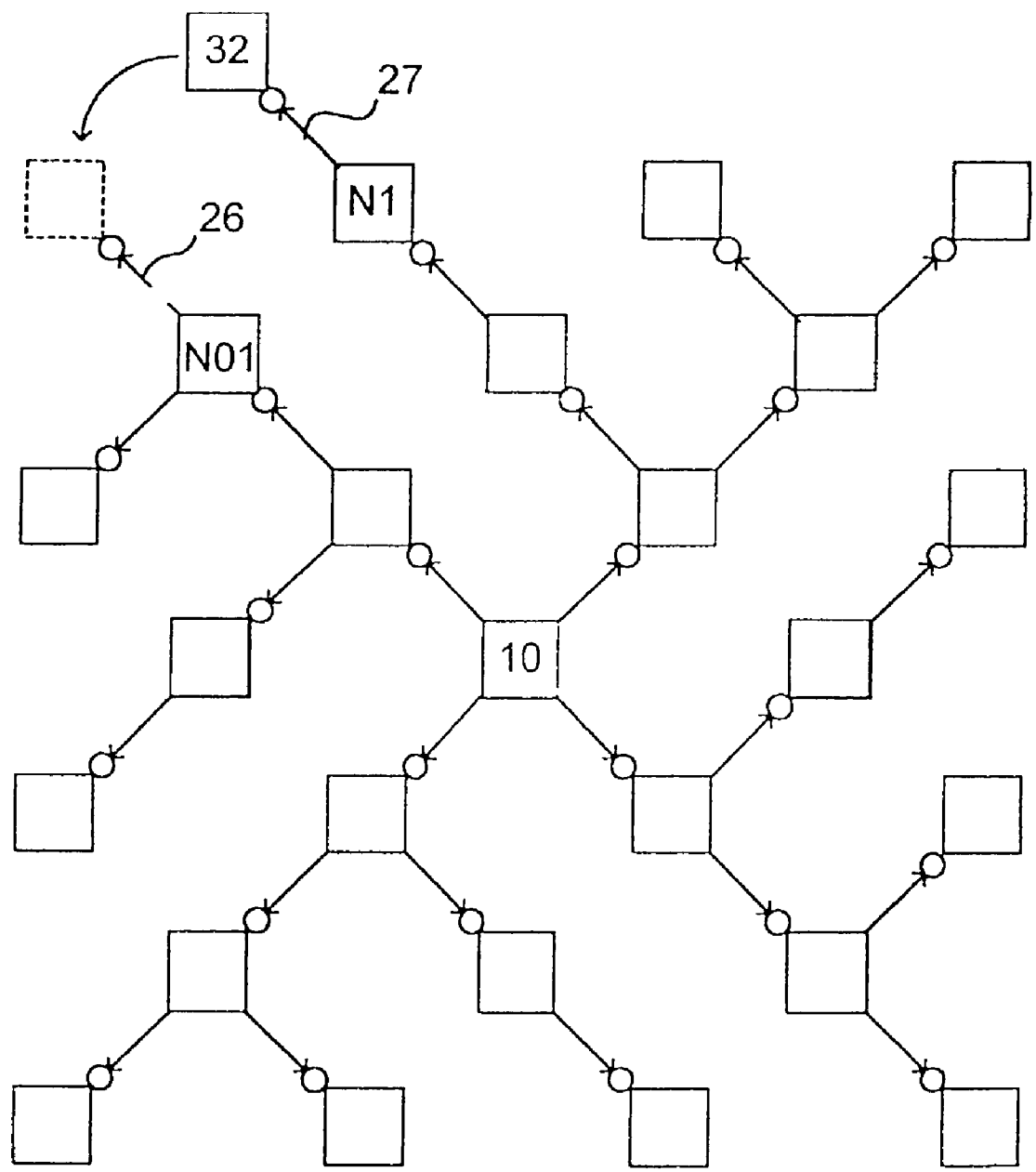
State 7 FIG. 9H

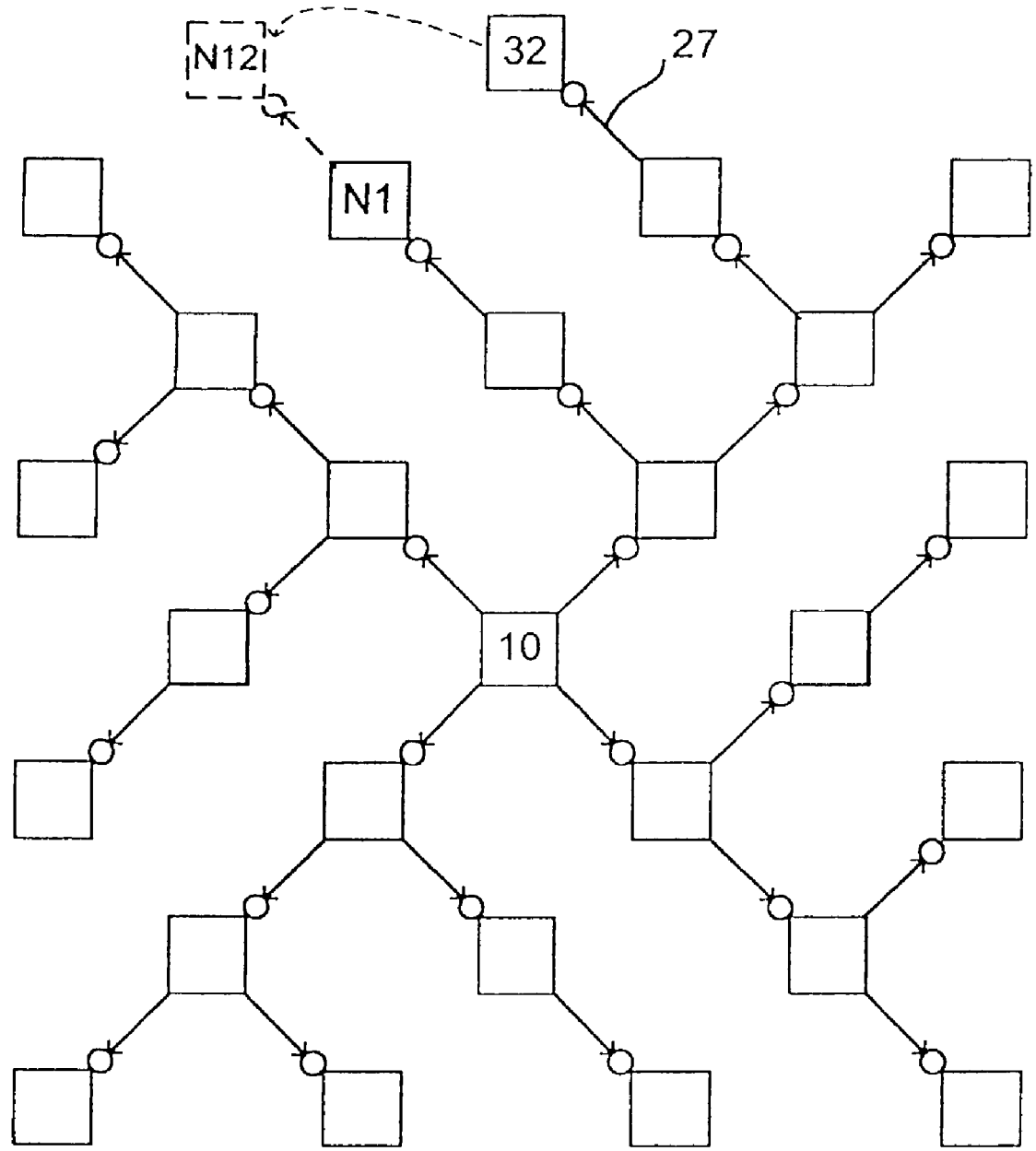
State 8     FIG. 9I

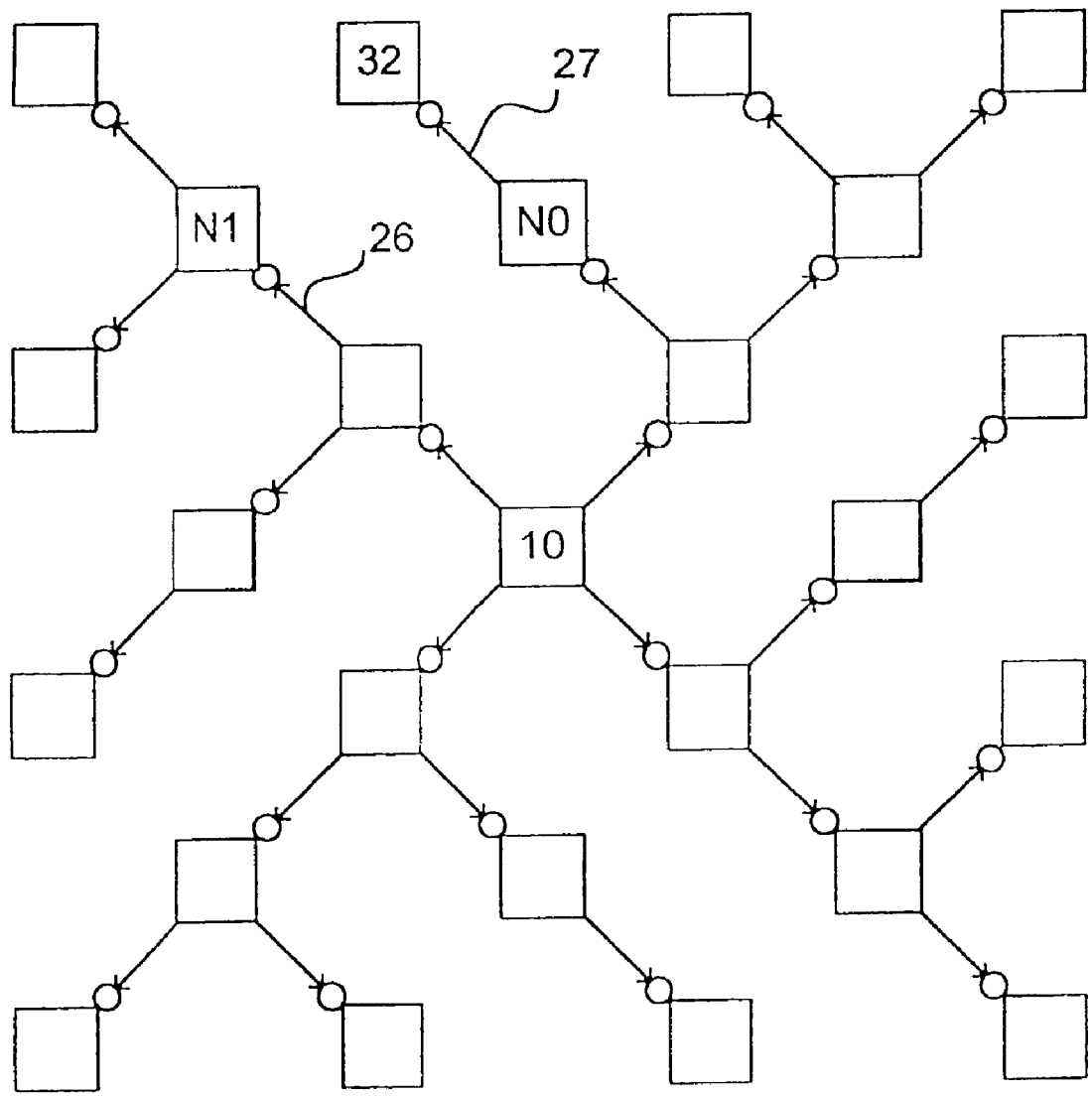
State 9      FIG. 9J

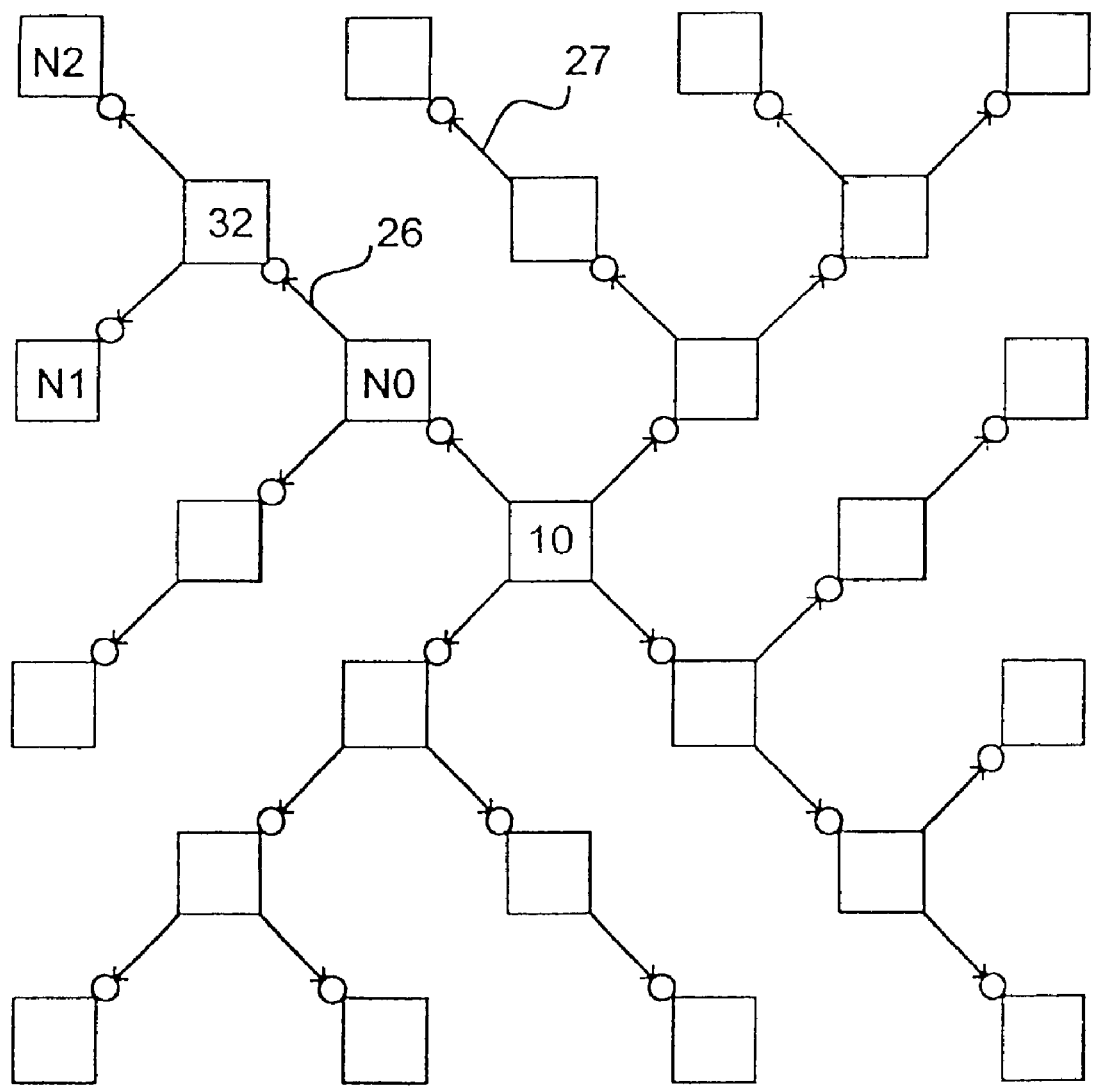
State 10      FIG. 9K

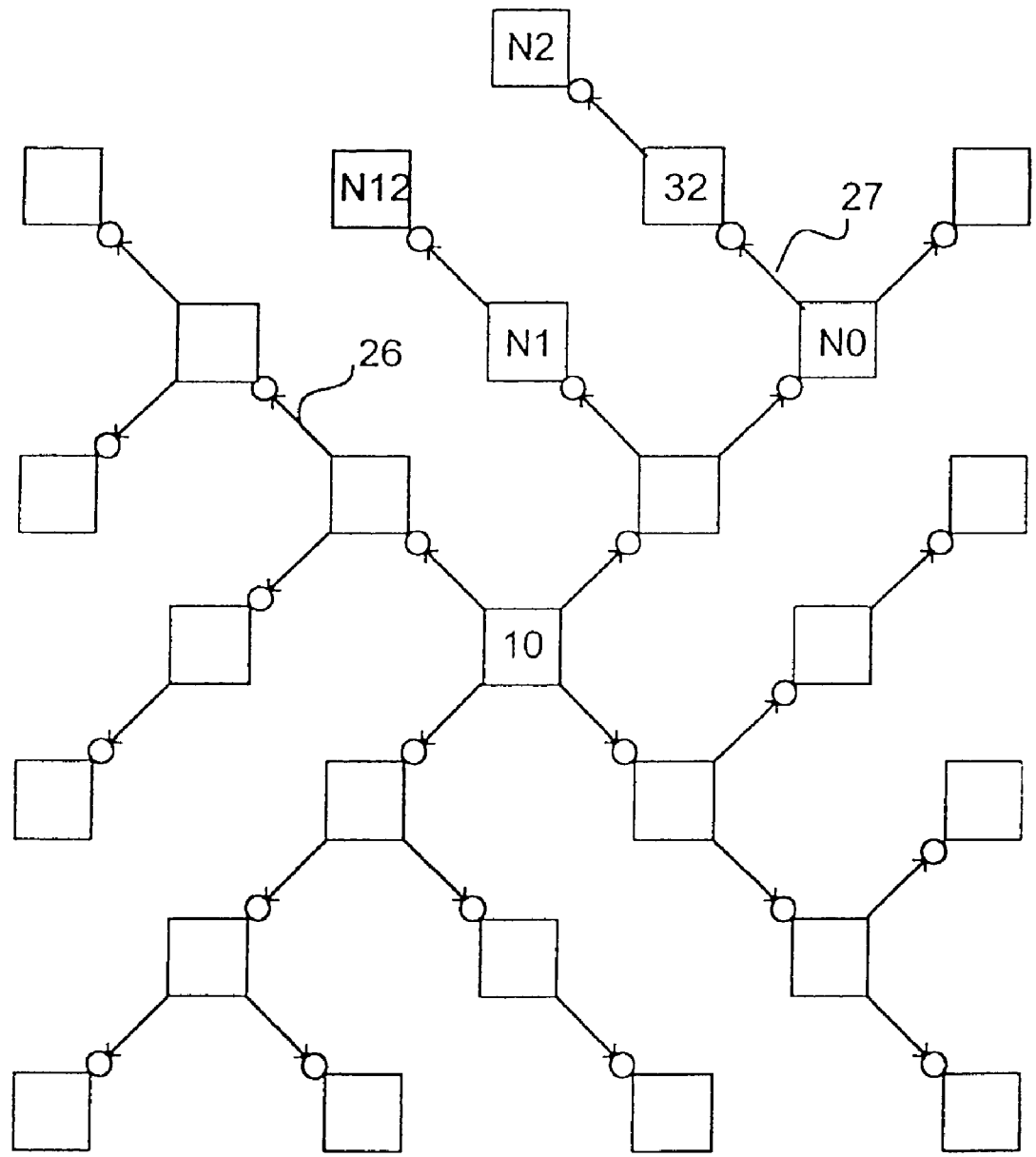
State 11      FIG. 9L

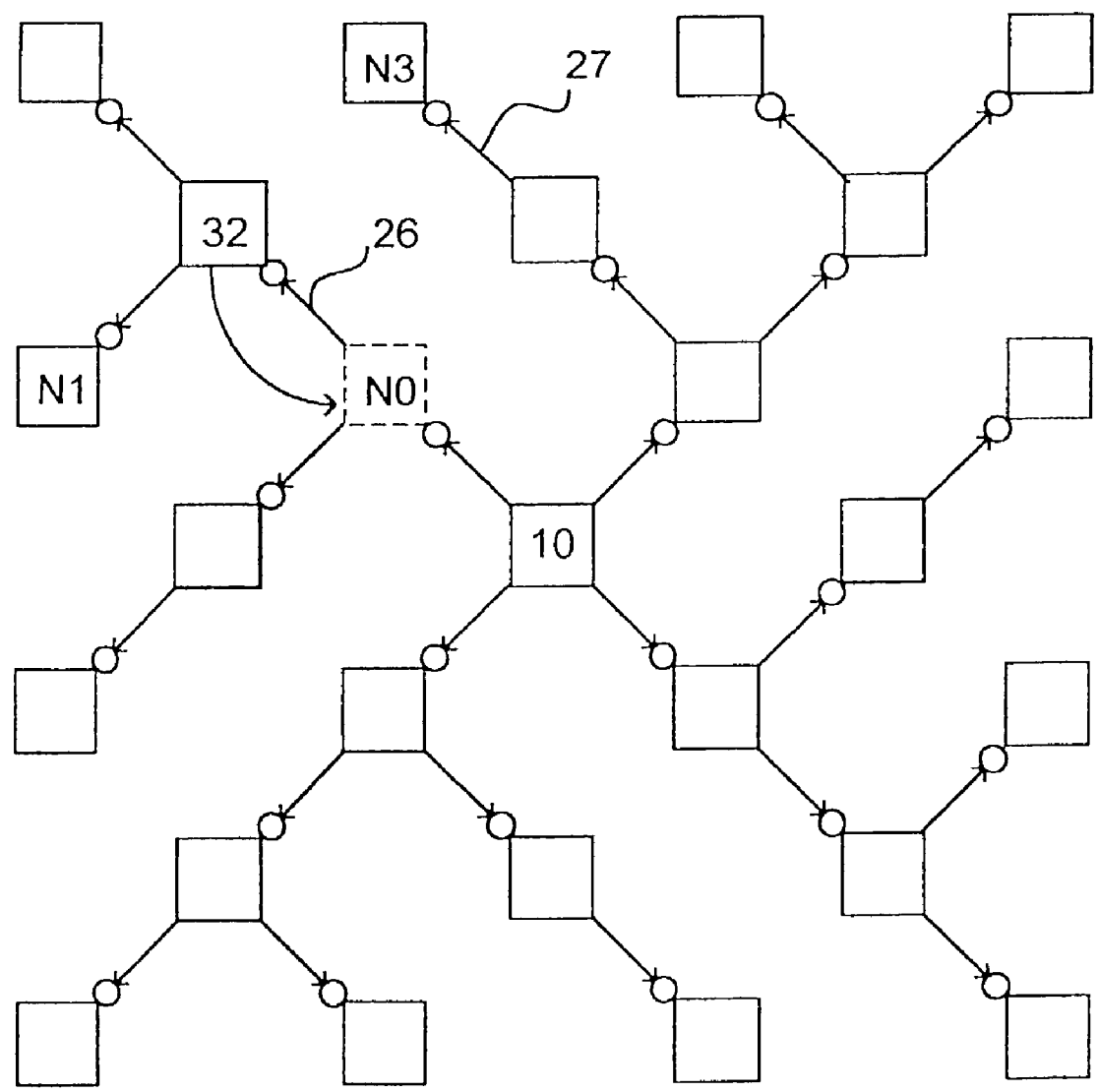
State 12  FIG. 9M

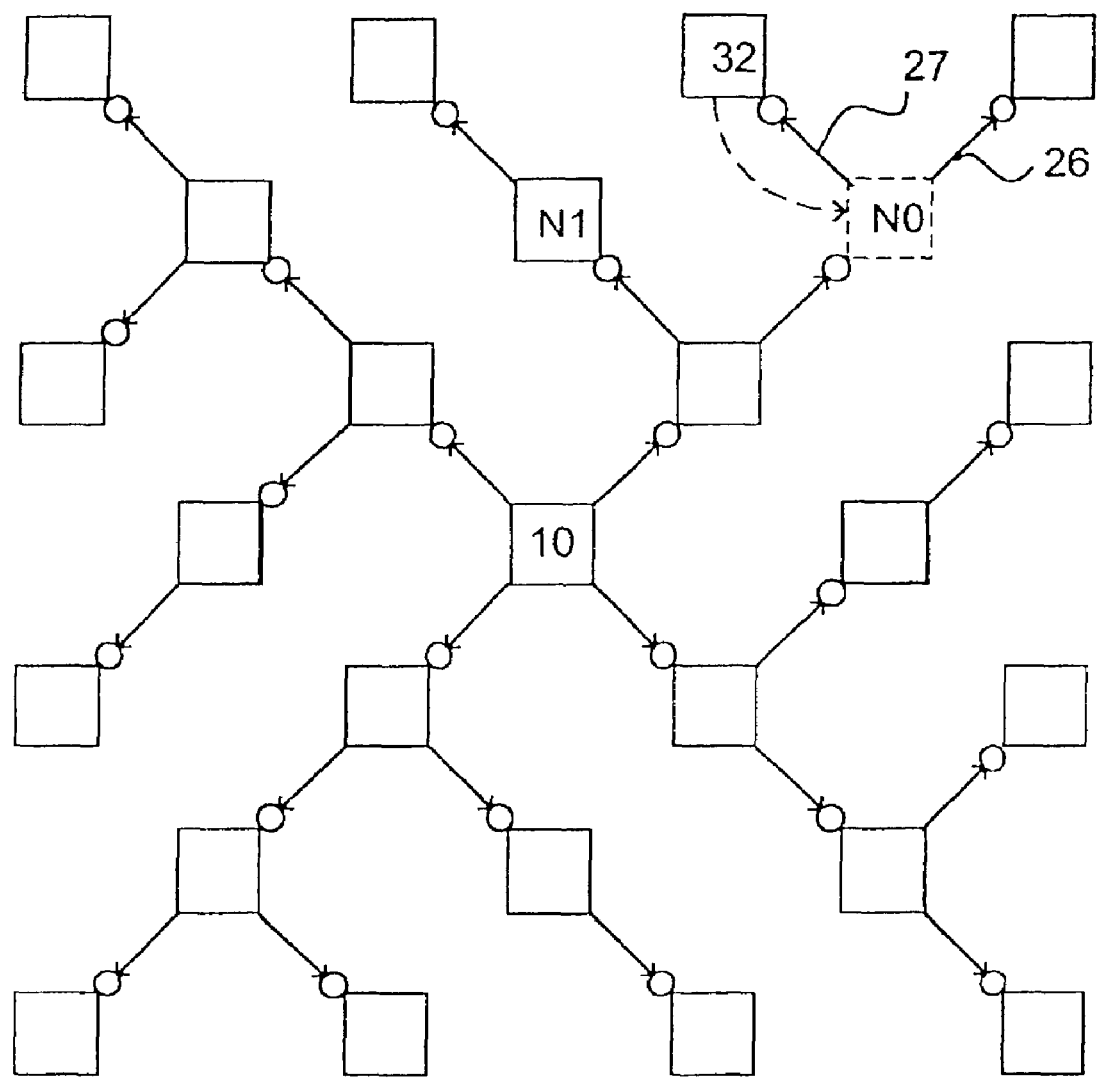
State 13     FIG. 9N

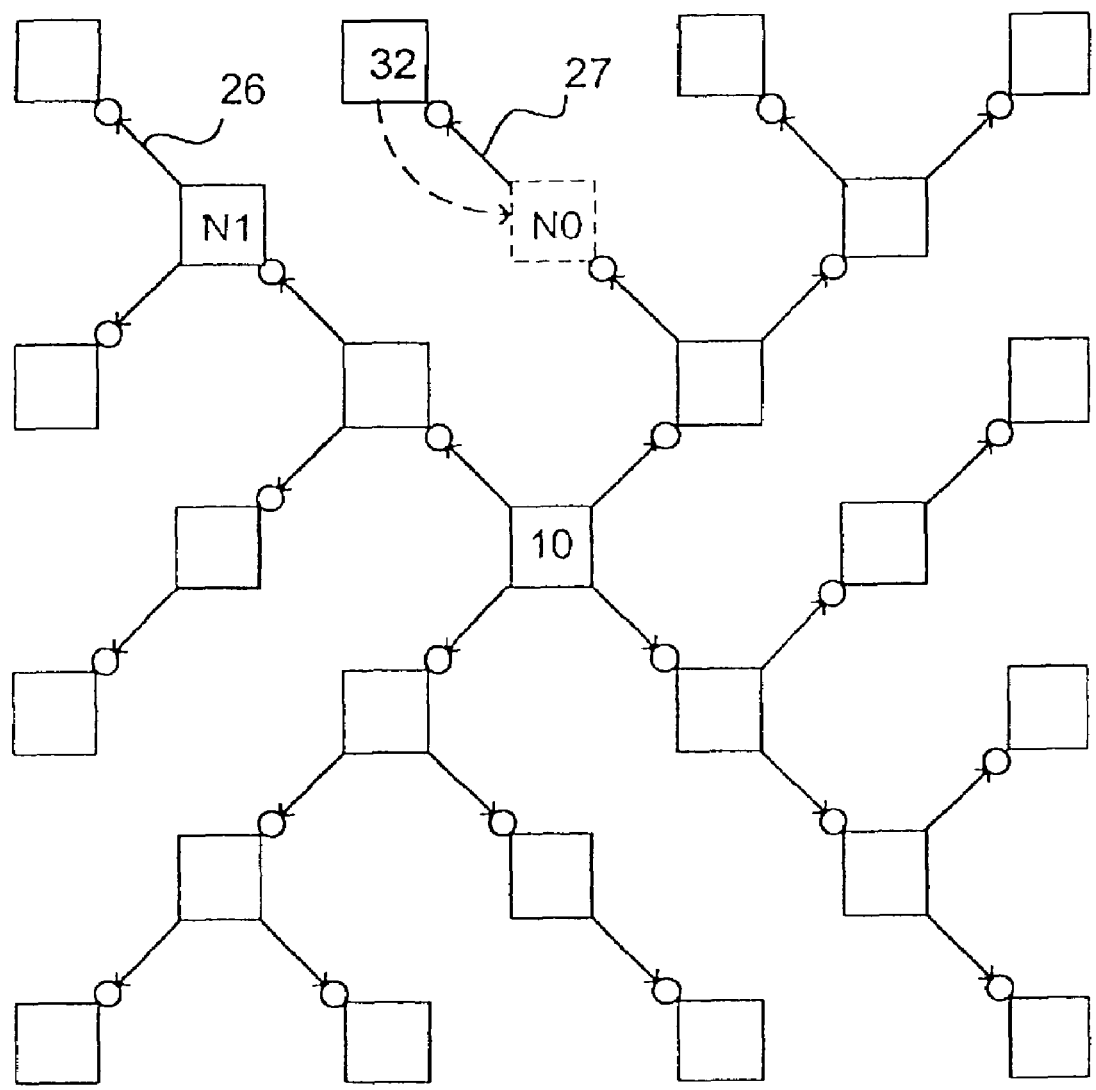
State 14    FIG. 9O

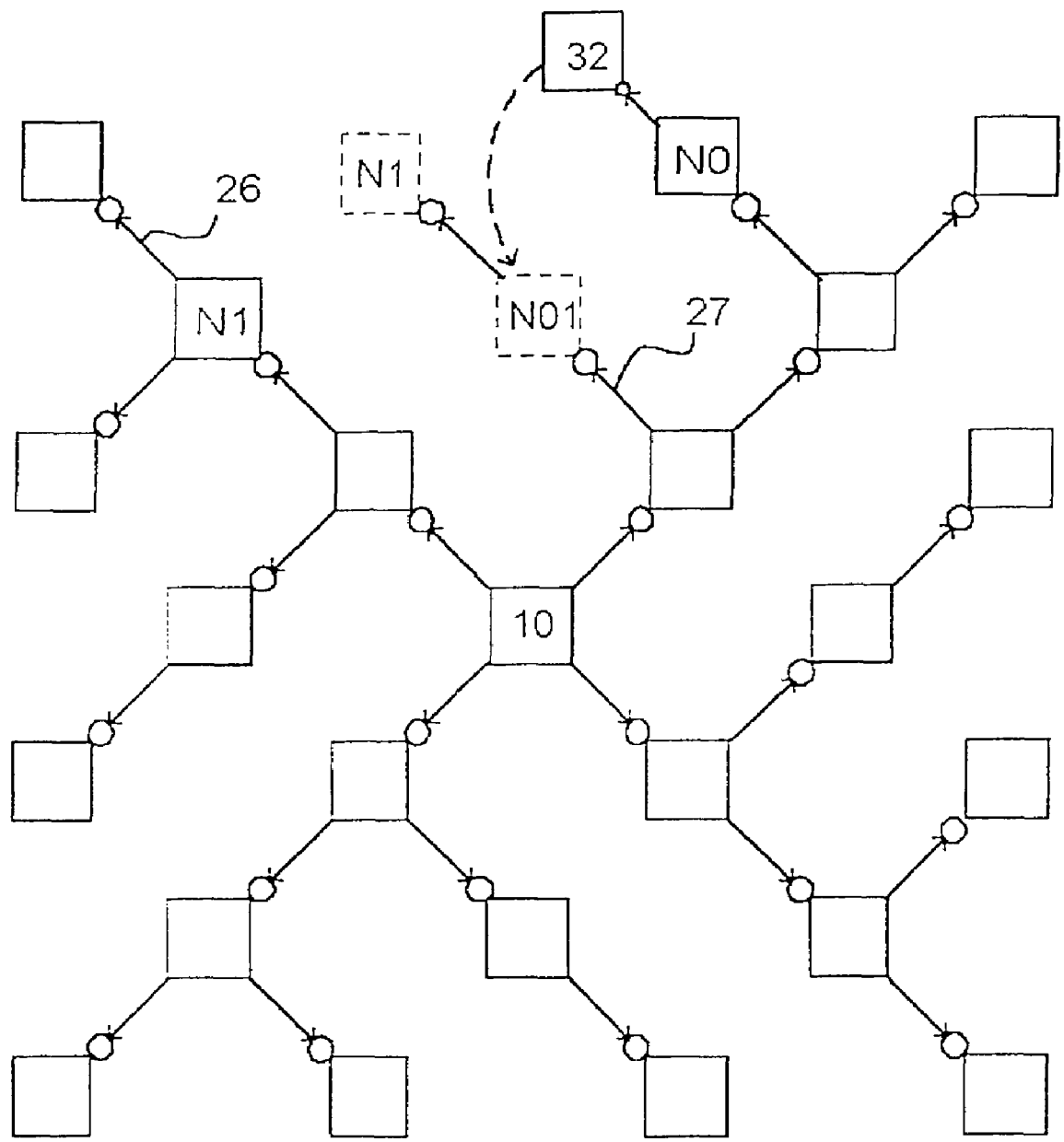
State 15      FIG. 9P

High Bandwidth Computer Array

"Christmas tree light" topology

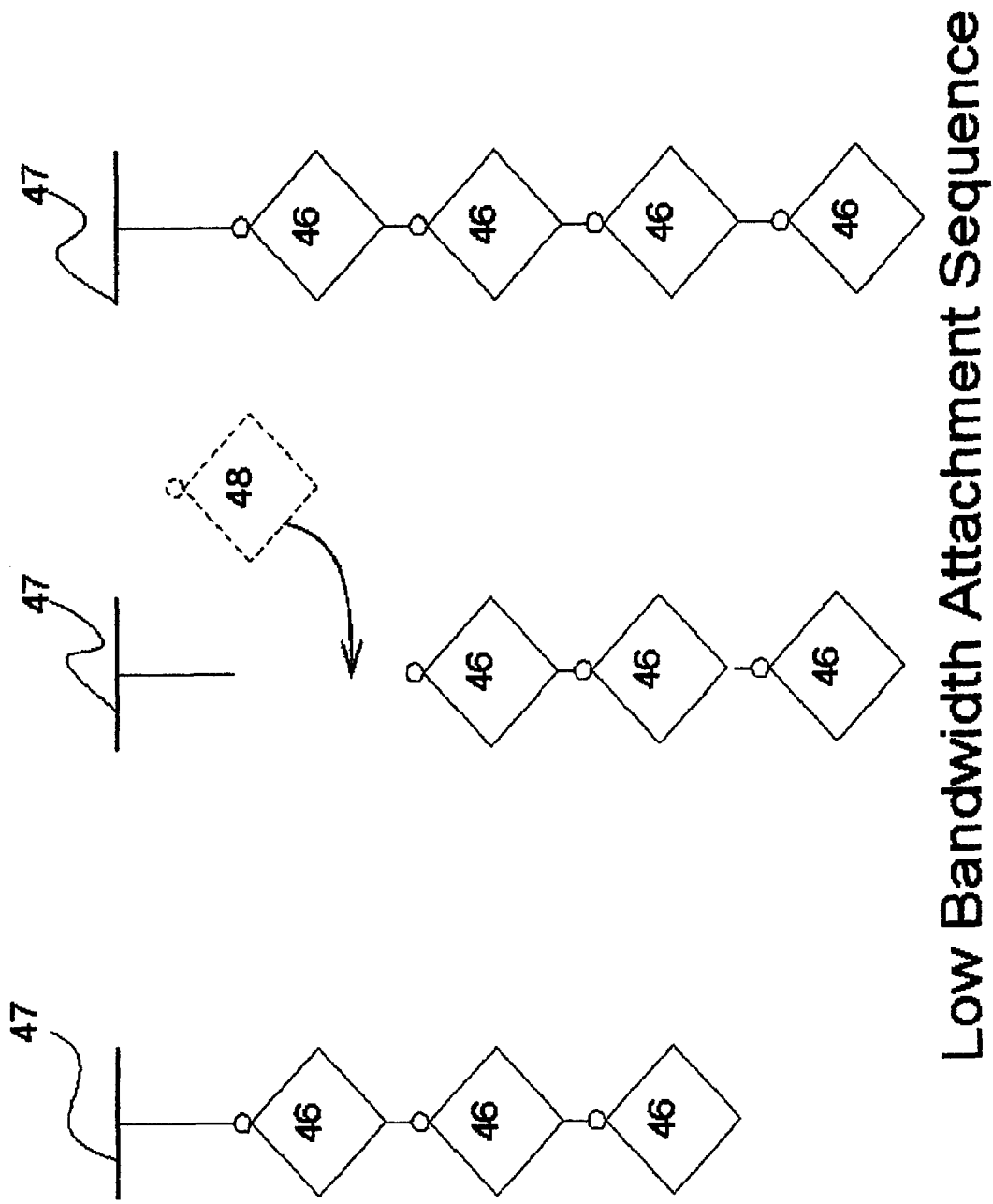
FIG. 15 Low Bandwidth Attachment Sequence

High Bandwidth Computer Array

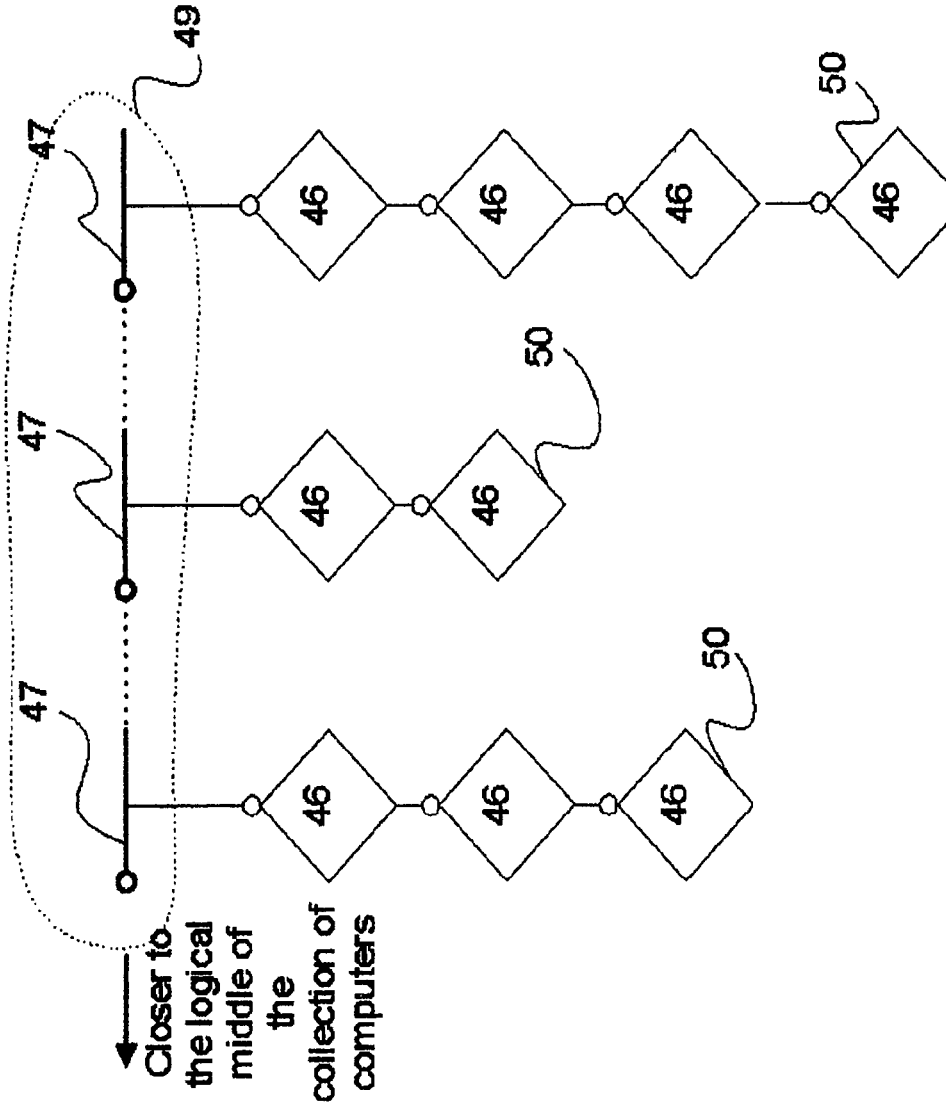
FIG. 16B Unbalanced Low Bandwidth Computers

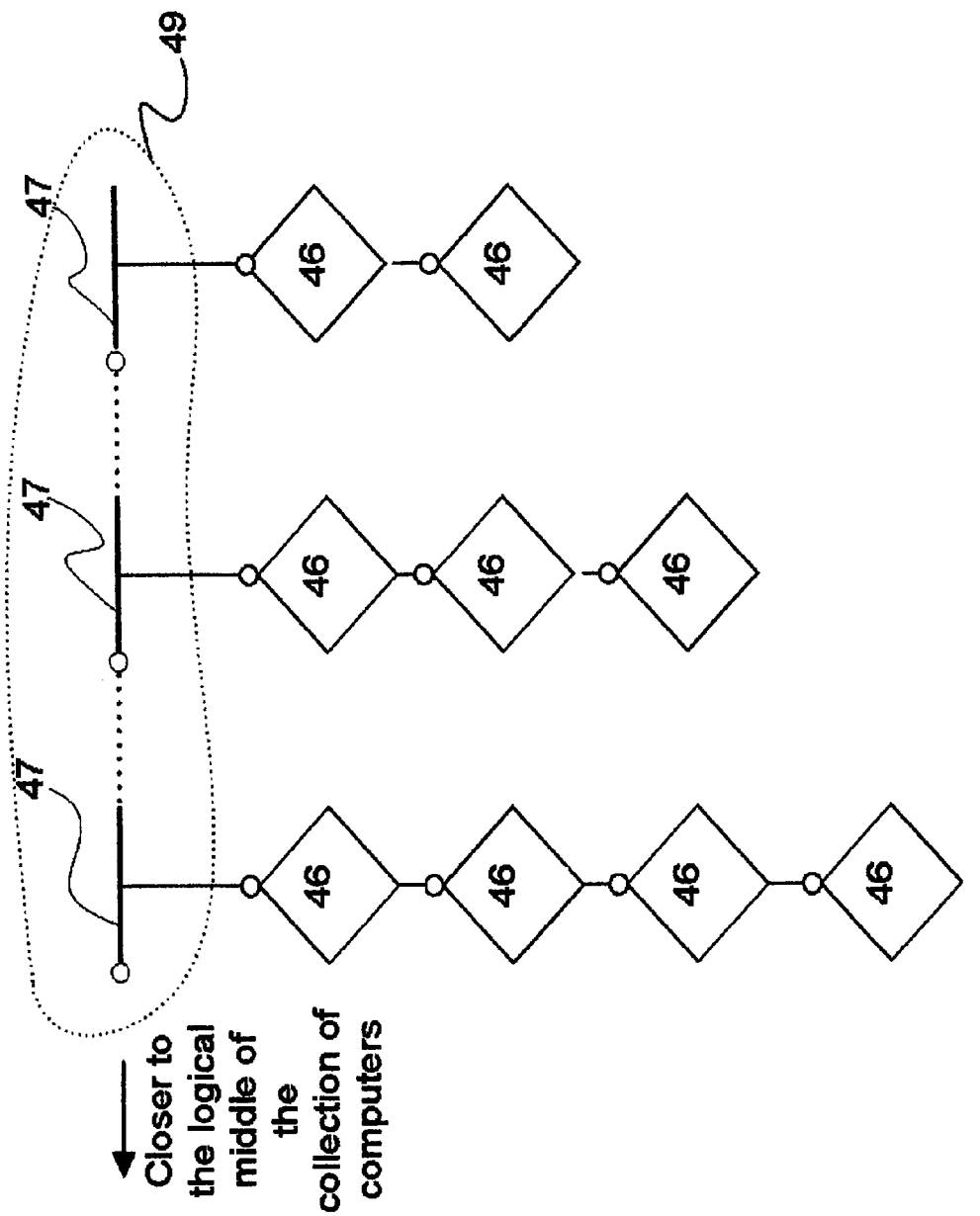
FIG. 16C Balanced Low Bandwidth Computers

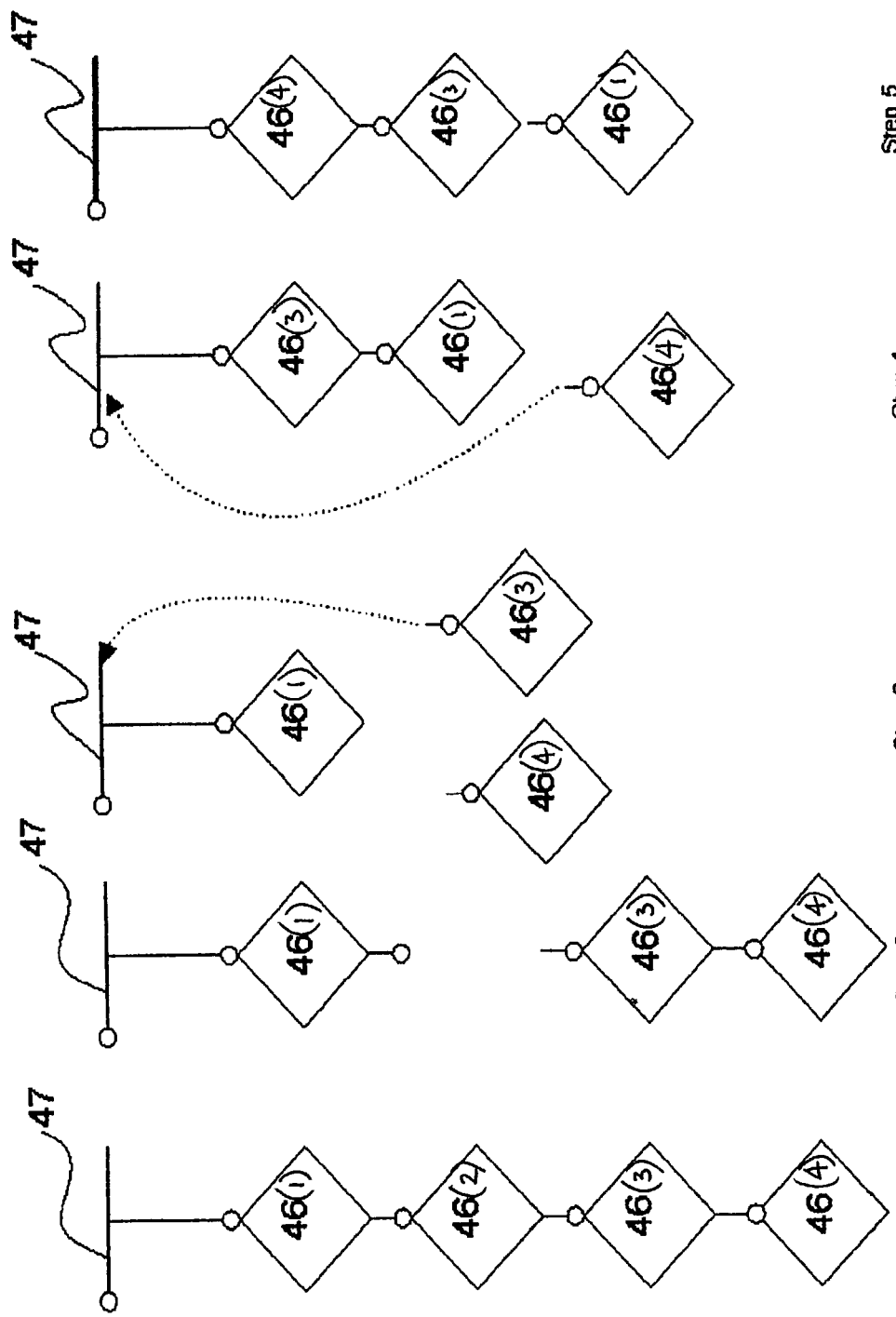

LAN Multicast

Visual Real Time Monitor of Interconnected Computers

Visual Real Time Monitor of Interconnected Computers Showing Low Bandwidth Computers Visual Real Time Monitor of Interconnected Computers Showing LAN Connected Computers

DISTRIBUTED MEANS OF ORGANIZING AN ARBITRARILY LARGE NUMBER OF COMPUTERS

REFERENCE TO PRIOR APPLICATION

The present application for patent claims priority from and hereby incorporates by reference the subject matter disclosed in U.S. patent application Ser. No. 09/887,391, filed on Jun. 22, 2001.

BACKGROUND OF THE INVENTION

1. Technical Field of the Invention

This invention relates to the fields of computer communications and computer networking.

2. Description of Related Art

The invention describes a means of coordinating a plurality of computers physically connected to a network. The invention allows rapid broadcast and search of the hosts using distributed control.

Such a system is an improvement over existing centrally controlled coordination in the areas of security, attack resistance, robustness, speed, and scalability.

Physical vs. Logical Organization

The invention may be used by any computer possessing a means to communicate one to another with all other computers to be coordinated.

The invention works by arranging the physically connected computers into a virtual hierarchy that may be efficiently searched and to which messages may be broadcast.

Prior Art—Centralized Control

A collection of computers possessing the ability to communicate one to another may be coordinated by a controlling computer. The controlling computer can maintain a list of network addresses of the computer collection. The controlling computer can maintain a list describing the contents available on each computer in the collection. The controlling computer can also maintain a list a names or other identifying characteristics of each computer in the collection.

The controlling computer may broadcast a message to all the coordinated computers by reading its list of network addresses and creating and sending a message to each computer in the list. The controlling computer may respond to a query regarding the contents available in the collection of computers by searching its list of contents. When a content match is found, the controlling computer can provide the network address of the computer possessing the content.

The controlling computer may respond to a query regarding the name or other identifying characteristic of a computer in the collection by searching its list of names or other identifying characteristics of each computer in the collection. When a match to the computer name or other identifying characteristic is found, the controlling computer can provide the network address of the computer in the collection matching the desired name or other identifying characteristic.

Disadvantages of Centralized Control
1. Scalability
2. Security
3. Failure sensitivity Scalability A controlling computer can coordinate a finite number of computers. The amount, of computing power increases linearly with the number of computers to be coordinated. At some point, the controlling computer will be unable to coordinate any more computers and the collection of computers must cease increasing.

Security

All communications between the collection of computer is coordinated by the controlling computer. A successful security attack on the controlling computer will disable all coordinated communications with the collection of computers.

Failure Sensitivity

Similarly, a software failure or hardware failure on the single controlling computer can disable coordinated communications with the entire collection of computers.

Prior Art—Hierarchical Organizations

A logical communication hierarchy of computers may be created with a single host at the top of the logical hierarchy and two or more computers at the next level. Each one of the computers at the second level is logically connected to two or more computers. Each of the computers at the third level is logically connected to two or more computers, and so on.

In the simplest case each computer is connected to a single host going up the hierarchy and to two computers going down the hierarchy. The top level of the hierarchy has a single computer. The second level has two computers. The third level has four computers. The fourth level has eight computers. Each successive logical level contains the next power of 2 number of computers.

The total number of computers in the hierarchy is the sum of the computers at each of the N levels in the hierarchy. For example in the simple sample just described, the fifth level would contain 32 computers and the entire hierarchy would contain 63 computers.

The tenth level of a ten level hierarchy would contain 1024 computers and the entire hierarchy would contain 2047 computers. The equation describing the total number of computers in such a network is $2*(2\text{ power }N) - 1$. Where N is the number of levels.

Advantage of Hierarchical Organizations

A virtual hierarchy such as that described above may broadcast a message from the top level computer to all computers in the hierarchy is an amount of time equivalent to: N*(average message transit time).

For example, in an Internet environment, the message delay might be 10 msec. To broadcast a message to all computers in a ten level hierarchy containing 2047 computers would take 100 msec.

To broadcast a message to all computers in a twenty level hierarchy containing 2,097,151 computers would take only 200 msec.

Without a hierarchy, serially sending a message to 2 million computers would require 2,097,151*(average message transit time).

Disadvantages of Hierarchical Organization
1. Inflexibility
2. Insecurity
3. Failure sensitivity Inflexibility A hierarchy is great for broadcasting a message from a constant fixed computer to a hierarchy of constant fixed computers. Should a message require broadcasting from any other computer than that at the top of the hierarchy, other mechanisms must be used such as passing the message upward to the top and then broadcasting it downward from the top of the hierarchy.

Insecurity

A hierarchy is progressively more vulnerable to disruption the closer to the top of the hierarchy one gets. In fact, if an attack were launched on the top computer of the hierarchy rendering it inoperable, the entire hierarchy would be rendered inoperable.

Failure Sensitivity

Similarly, each computer in a hierarchy is connected to two or more computers beneath it. Each of them is connected to two or more computers and so on. Should a single computer in a hierarchy fail, all the computer connected beneath it in the hierarchy would be unable to communicate.

SUMMARY OF THE INVENTION

Some of the objectives of the invention are to provide a collection of computers with:

(a) the ability to perform one to many broadcast originating from any computer in the collection without requiring a fixed hierarchical organization;
(b) the ability to search all computers in the collection for specific content without requiring a central controlling computer;
(c) the ability to locate a specific computer in the collection using a name or other identifying characteristic without requiring a central controlling computer;
(d) the ability to self organize itself so broadcast and searching may be performed in an optimal manner;
(e) the ability to self organize itself in the presence of changing computer network addresses so broadcast and searching may be performed in an optimal manner;
(f) the ability to continue broadcast and searching functions in the presence of a security attack which disables a plurality of computers in the collection.
(g) the ability to repair itself and continue broadcast and searching functions in the presence of simultaneous failure of a plurality of computers in the collection.

Further objectives will become apparent from a consideration of the ensuing description and drawings.

BRIEF DESCRIPTION OF THE DRAWINGS

For a more complete understanding of the present invention, reference is made to the following detailed description taken in conjunction with the accompanying drawings wherein:

FIG. 6 shows the progression of a broadcast message originating from the top computer of the hierarchy.

FIGS. 9A-1 to 9P show the self organizing states of a quadrilateral configuration for the collection of computers.

Figure 1A:
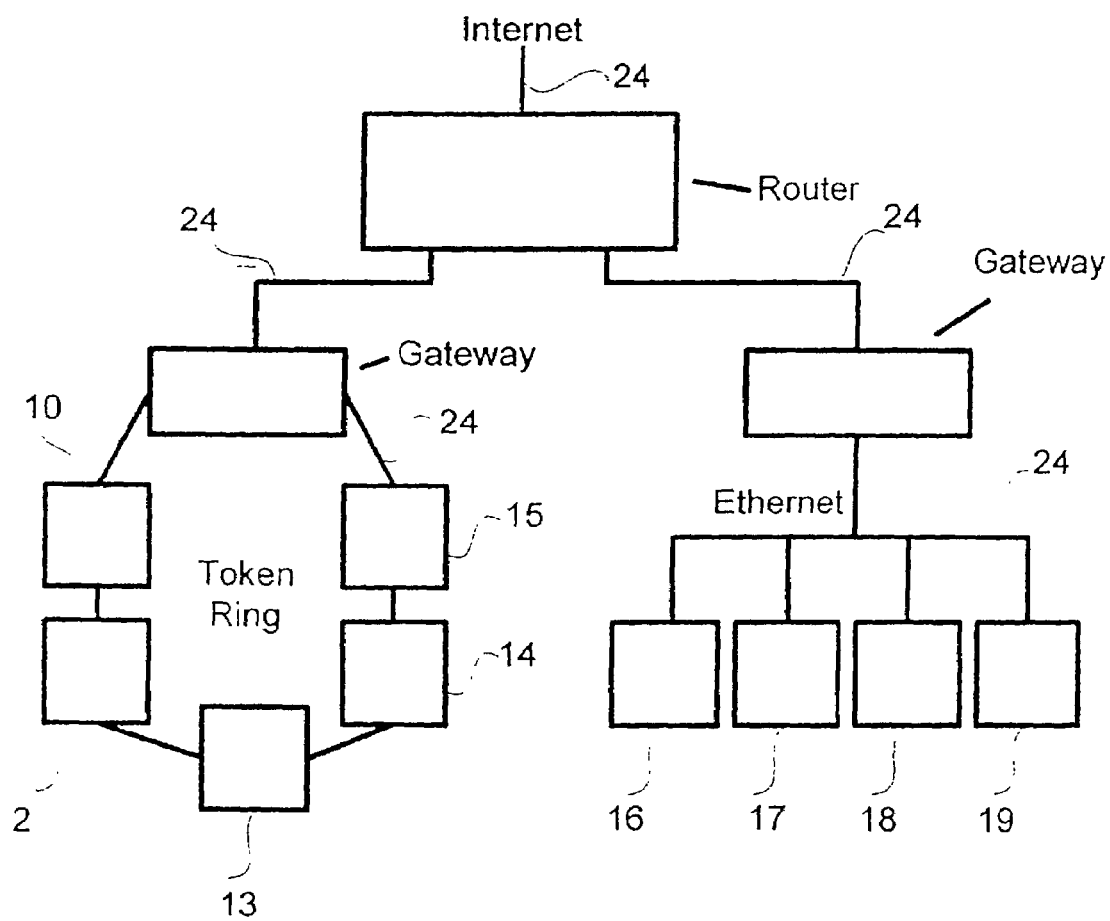
FIGS. 1A to 1B show a typical physical means of computers communicating one to another compared to a logical means of communicating for the same computers.

| Reference Numerals in Drawings | |
|---|---|
| 10 | logical middle of the collection of computers |
| 11 | top computer of a hierarchy |
| 12,13,14,15, 16,17,18,19, 20,21,22,23 | computers |
| 24 | physical means of communication |
| 25 | logical means of communication |
| 26 | radial |
| 27 | indirect radial |
| 28 | found computer |
| 29 | disabled computer |
| 30 | collection edge |
| 31 | logical connection |
| 32 | new computer |
| 33 | caching computer |
| 34 | searching computer |
| 40 | head |
| 41 | right hand |
| 42 | toe |
| 43 | left hand |
| 44 | WEBcast server |
| 45 | WEBcast player |
| 46 | low bandwidth computer |
| 47 | high bandwidth computer |
| 48 | new low bandwidth computer |
| 49 | string of high bandwidth computers |
| 50 | last computer in a string of low bandwidth computers |
| 51 | Internet cloud |
| 52 | gateway router |
| 53 | LAN connected master computer |
| 54 | LAN connected slave computer |
| 55 | local area network (LAN) |
| 56 | inbound TCP/IP stream on LAN |
| 57 | rebroadcast UDP stream on LAN |

Figure 12:
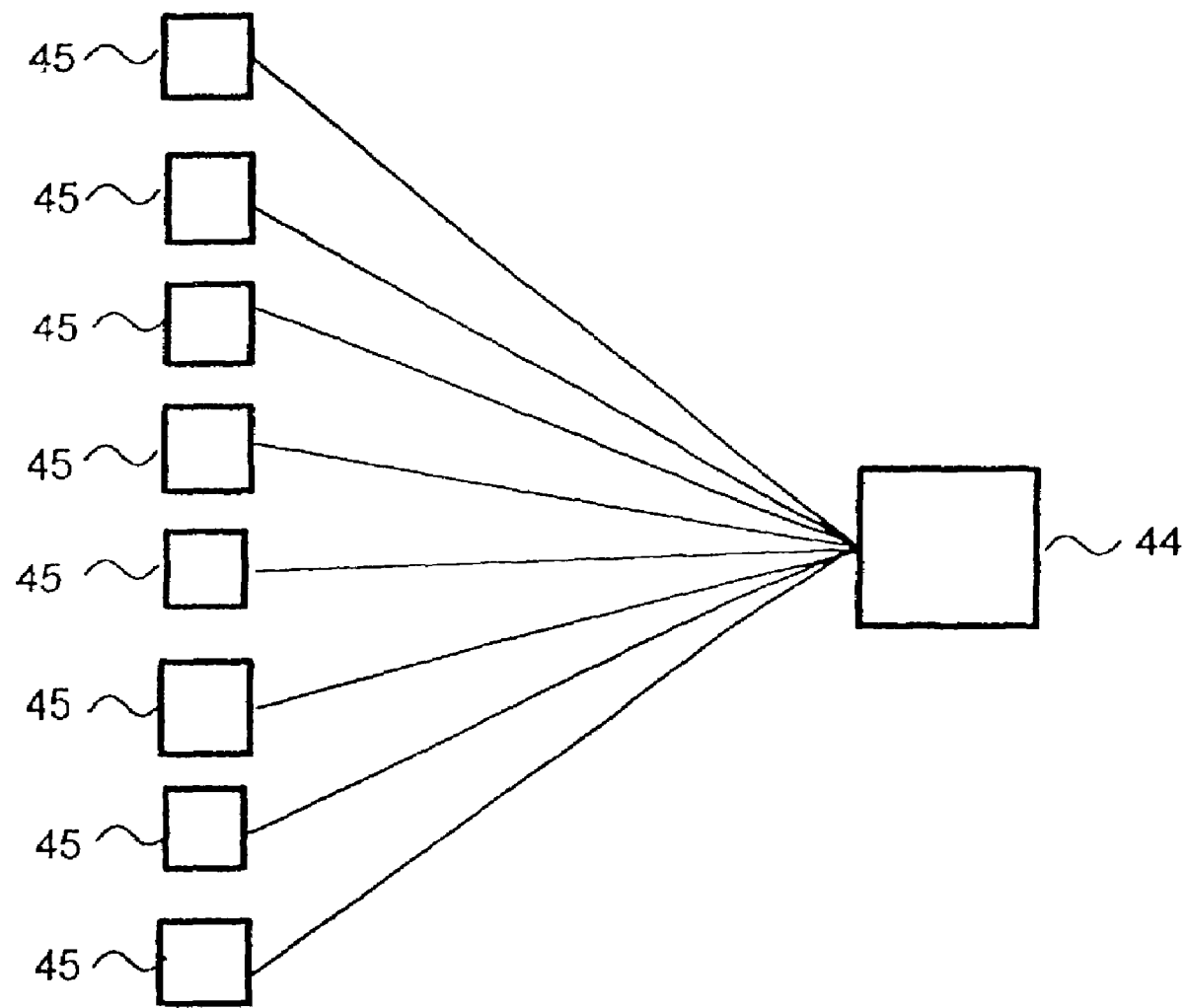

FIG. 12 shows a WEBcast server connected to an array of WEBcast players.

Figure 13:
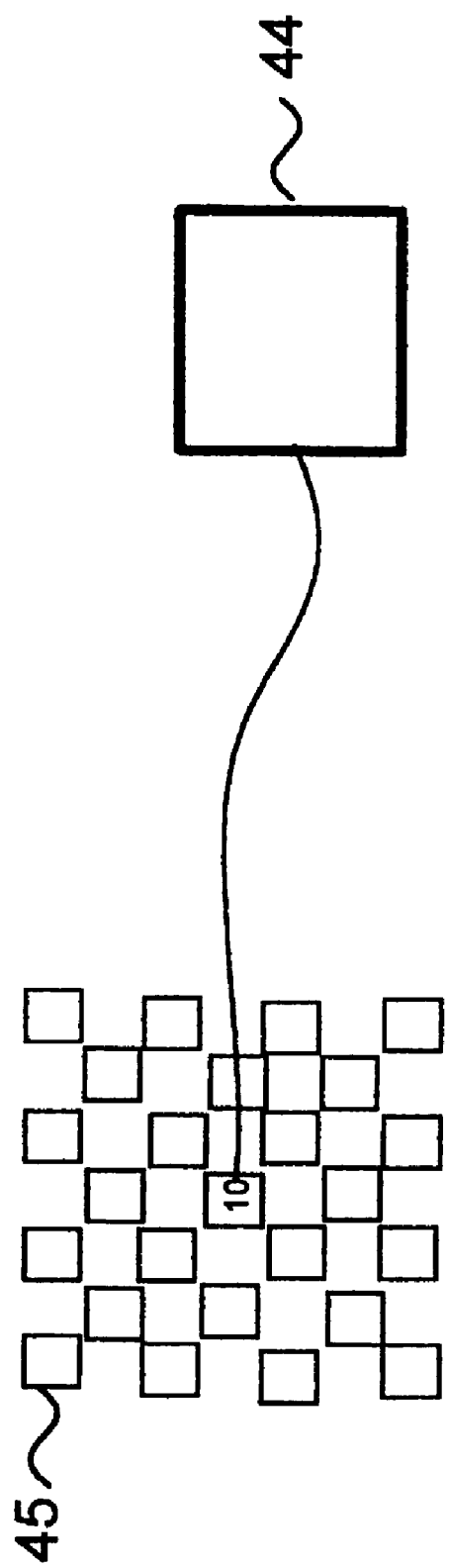

FIG. 13 shows a WEBcast server connected to the logical middle of WEBcast players.

Figure 14A:
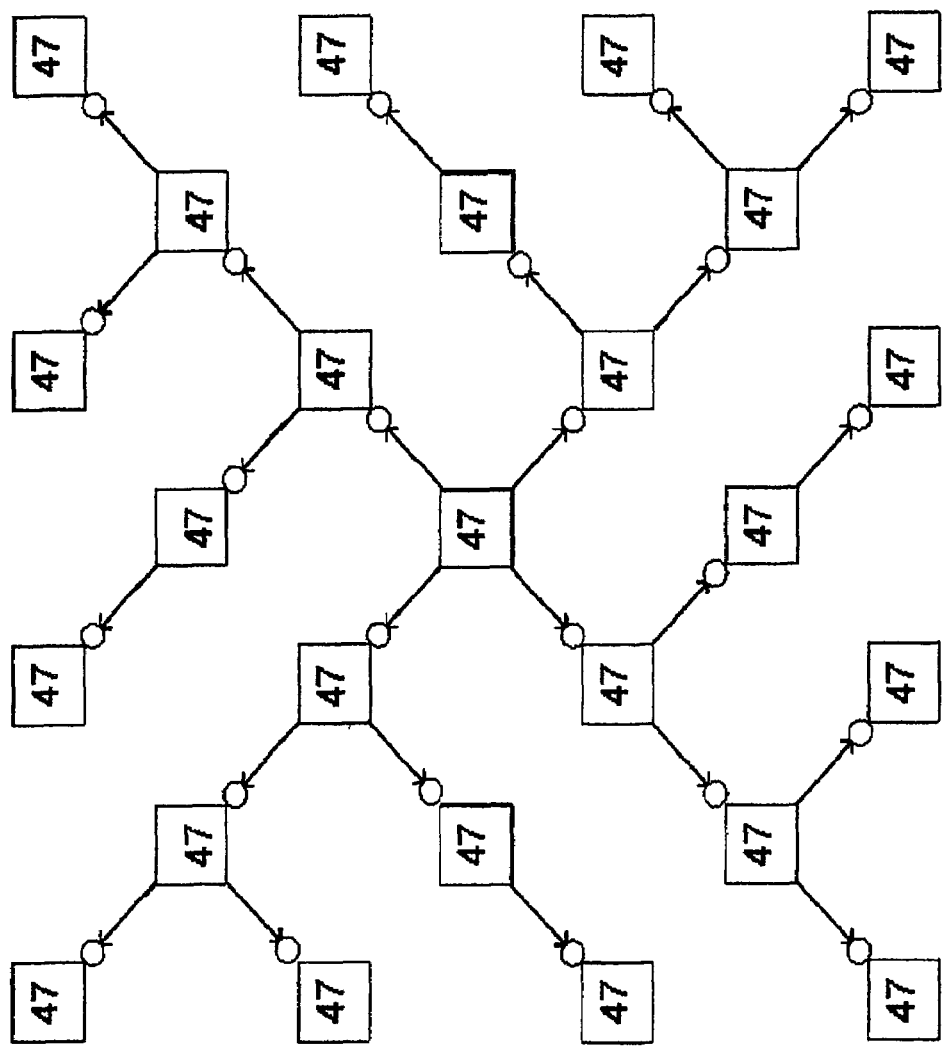

FIG. 14A shows a high bandwidth computer array.

Figure 14B:
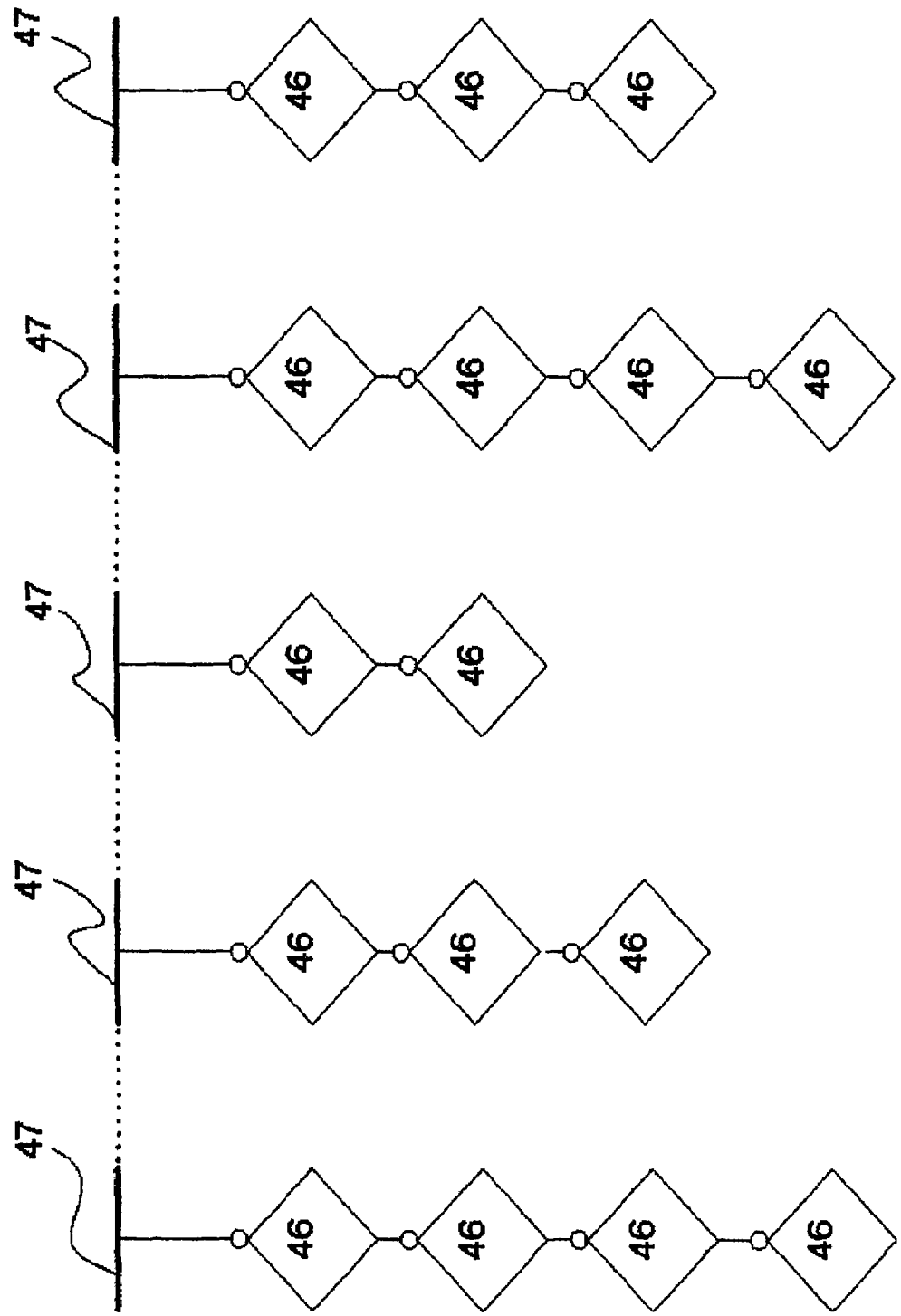

FIG. 14B shows a Christmas tree light topology where low bandwidth computers are connected to high bandwidth computers in a serial fashion.

FIG. 15 shows a low bandwidth attachment sequence.

Figure 16A:
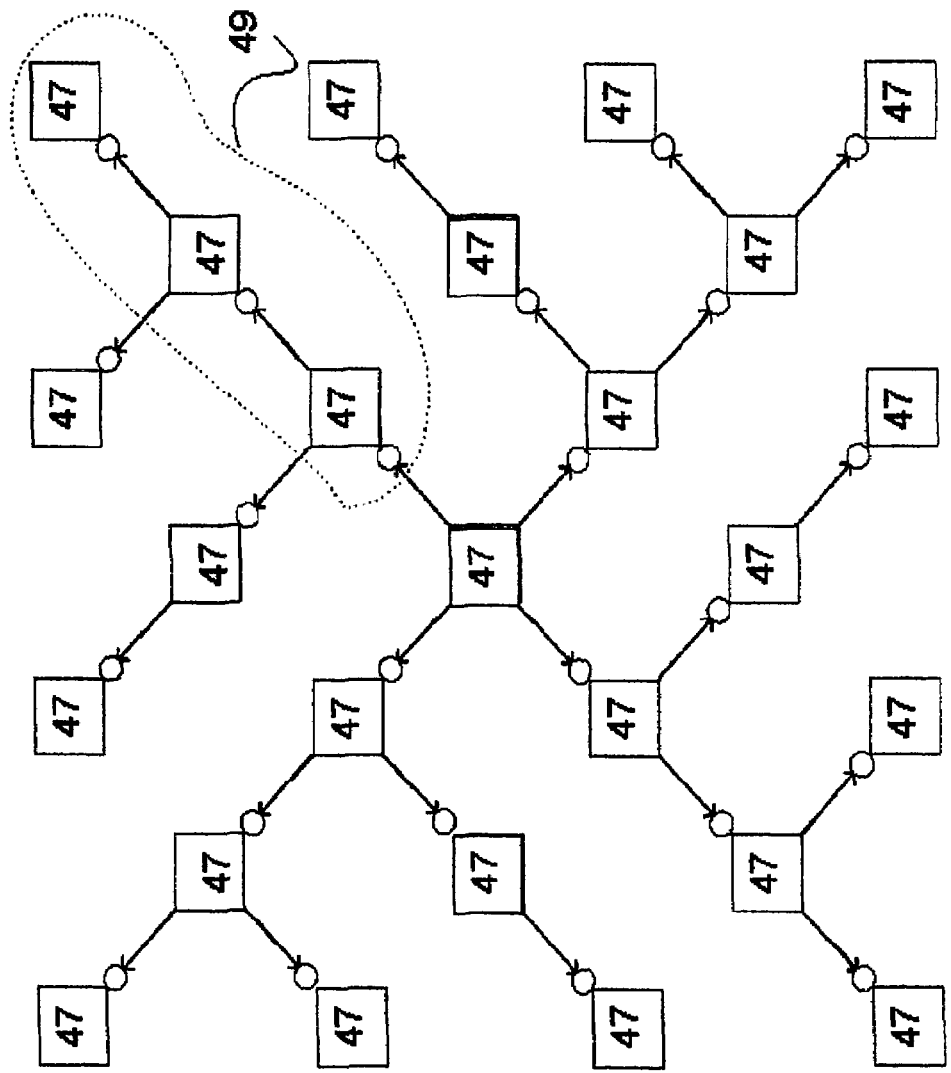

FIG. 16A shows a high bandwidth computer array.

FIG. 16B shows an unbalanced low bandwidth computers attached to high bandwidth computers.

FIG. 16C shows balanced low bandwidth computers attached to high bandwidth computers.

FIG. 17 shows error recovery for strings of low bandwidth computers when one low bandwidth computer fails to communicate.

Figure 18:
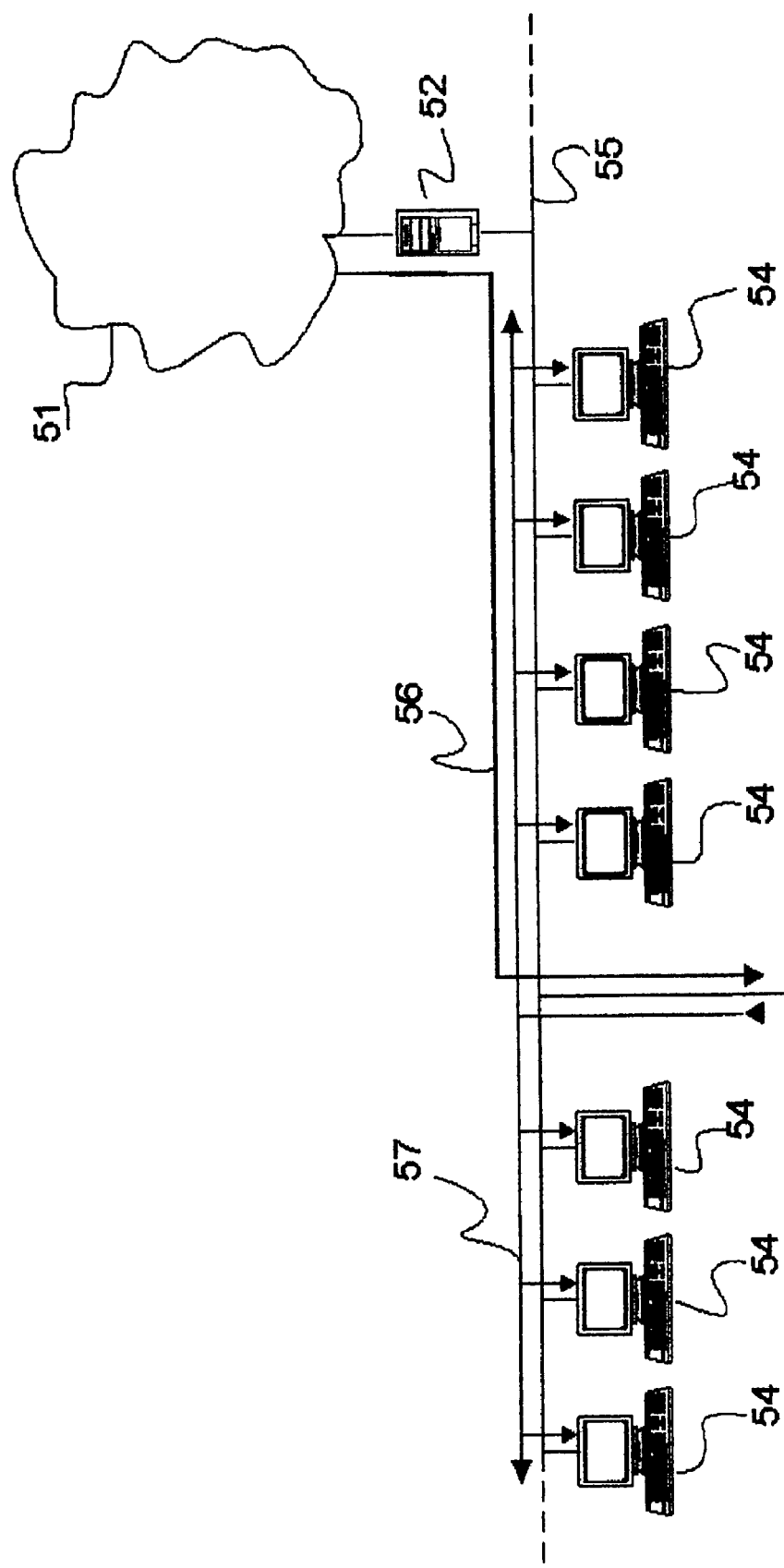

FIG. 18 shows a LAN multicast working in concert with the invention to remove multiple redundant broadcast streams.

Figure 19:
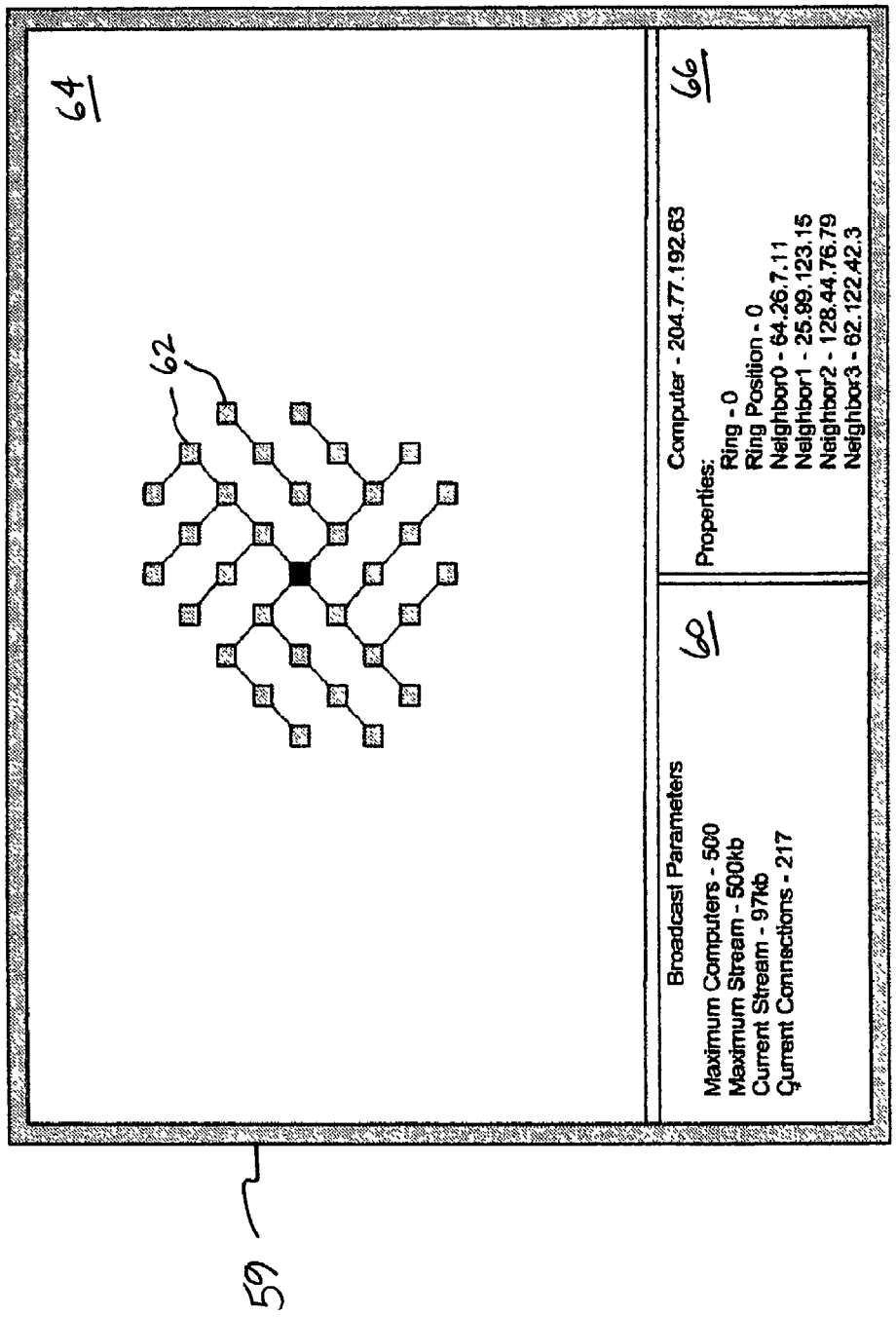

FIG. 19 shows a visual means for displaying the behavior of the array of interconnected computers.

Figure 20:
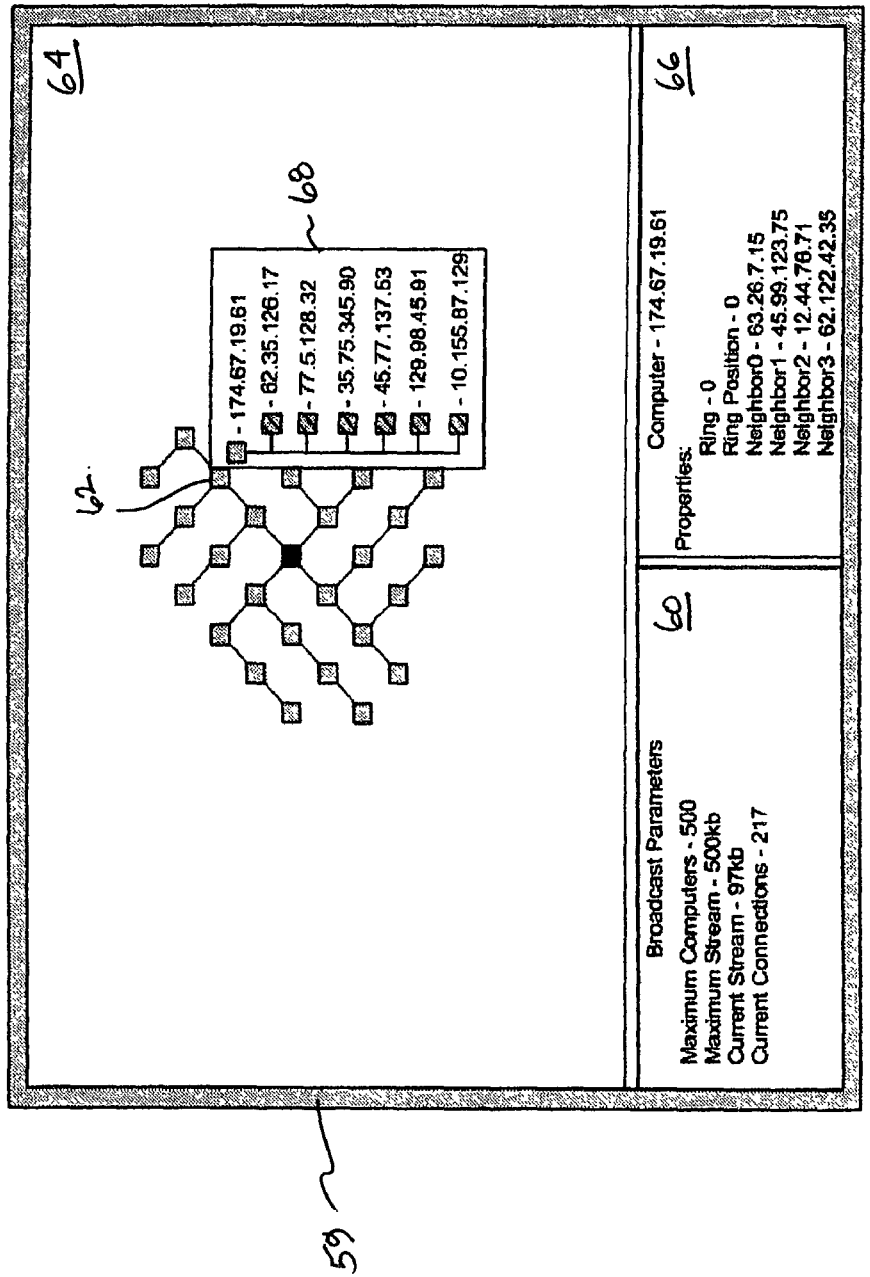

FIG. 20 shows a visual means for displaying the behavior of the array of interconnected computers including a pop-up window for revealing low bandwidth computers connected to a particular high bandwidth computer.

Figure 21:
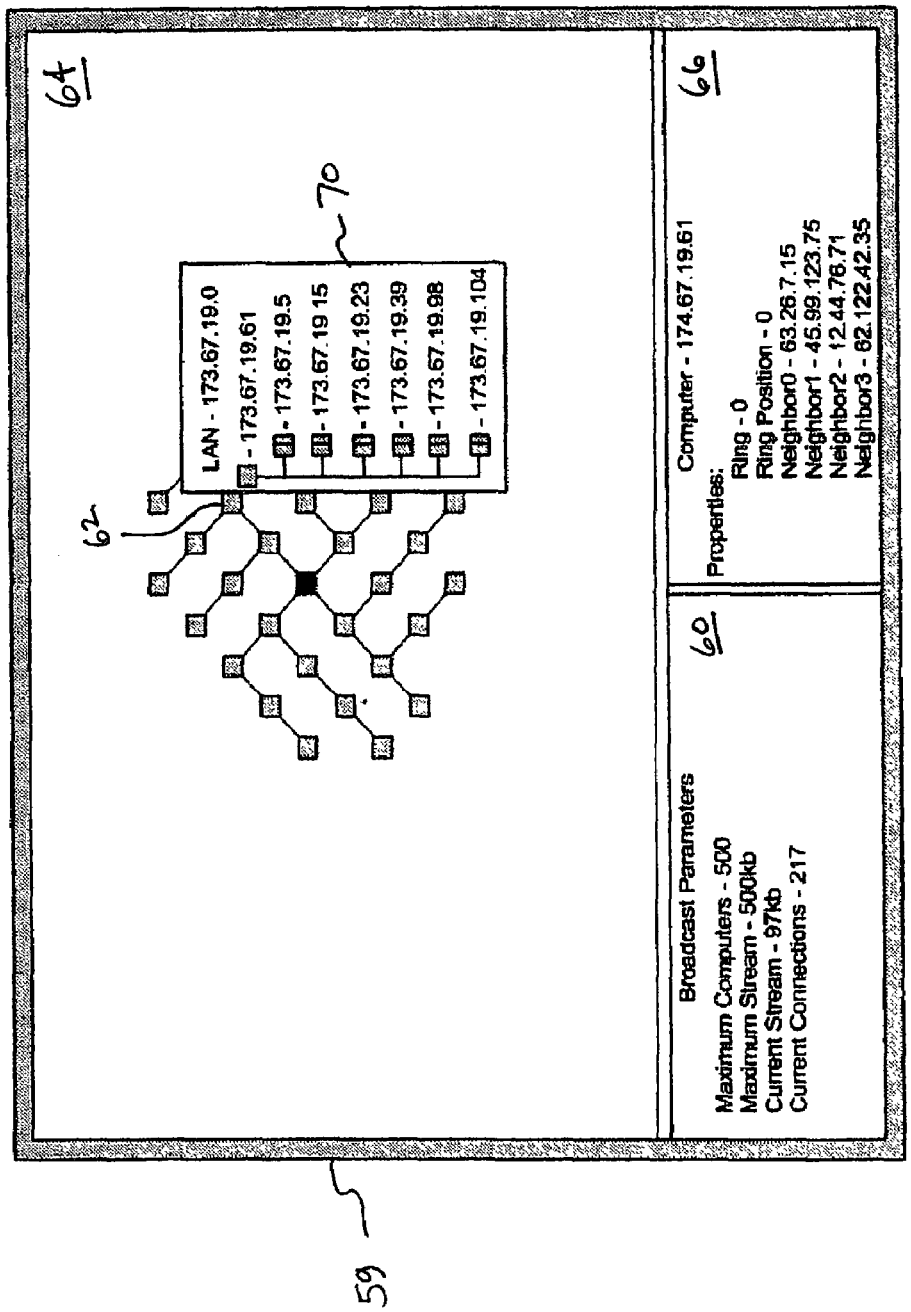

FIG. 21 shows a visual means for displaying the behavior of the array of interconnected computers including a pop-up window for revealing computers connected to a master computer on a LAN.

DETAILED DESCRIPTION OF THE INVENTION

Reference is now made to the Drawings wherein like reference characters denote like or similar parts throughout the various Figures.

Figure 1B:
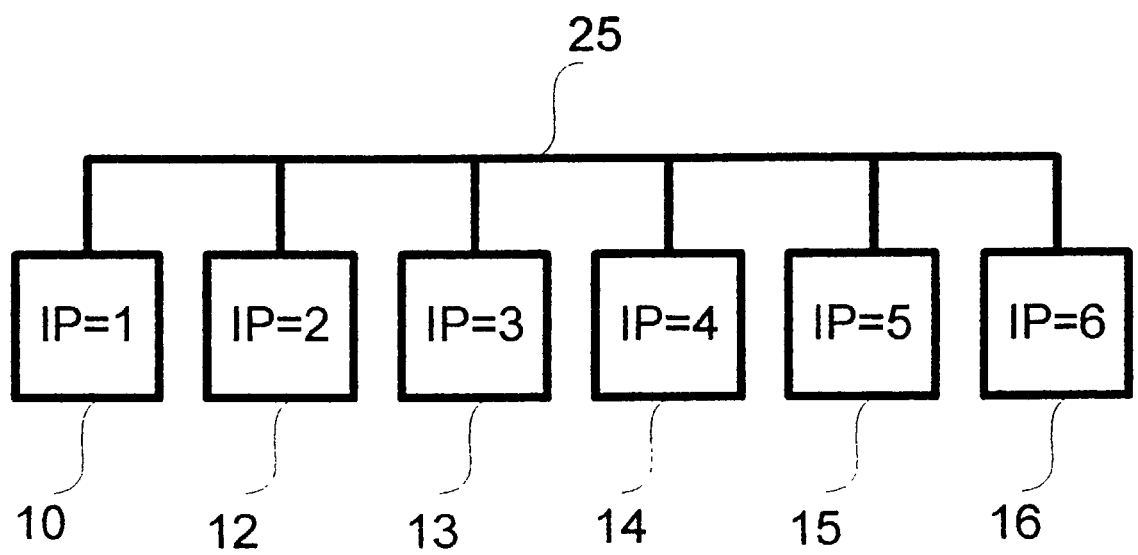
Figure 2:
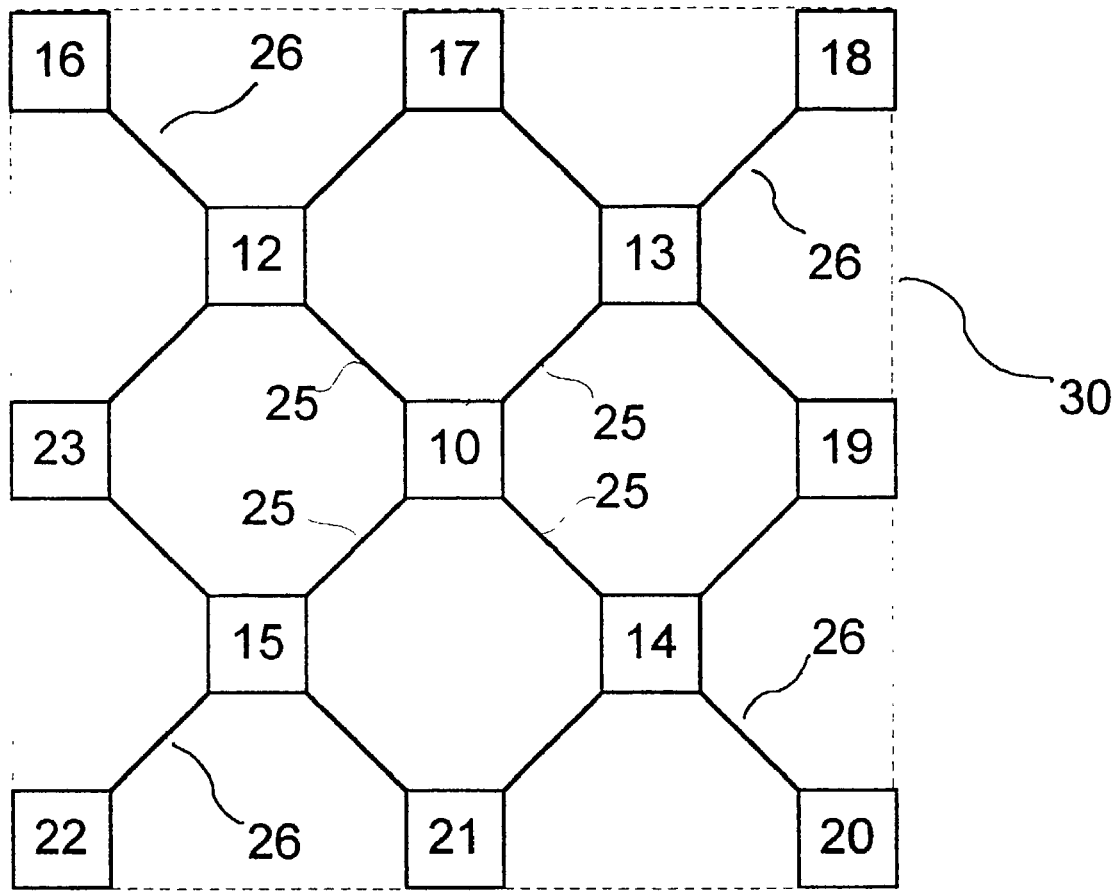
FIG. 2 shows a typical embodiment of the invention using a quadrilateral configuration for the collection of computers.

Description-FIGS. 1 to 3

Each computer 10,12,13,14,15 in the collection possesses a physical means 24 to communicate one to another as illustrated in FIG. 1A. The physical means of communication may be reorganized to produce a logical means to communicate 25 one to another as illustrated in FIG. 1B.

In an Internet embodiment, FIG. 1A would consist of computers physically connected via local area networks, routers, and the Internet backbone. In an Internet embodiment, FIG. 1B would consist of computers logically connected via (IP) Internet Protocol addresses.

The present invention is primarily directed to the logical configuration of a computer network, irrespective of the particular physical means of communication between computers in the network. A typical embodiment of the invention in a quadrilateral configuration is illustrated in FIG. 2. The logical middle 10 of the collection possesses a logical means to communicate 25 to four neighbor computers 12,13,14,15 that comprise a concentric square. Each computer in the collection possesses a logical means to communicate 25 to four neighbors. The concentric square consisting of four computers 12,13,14,15 is in turn logically connected with the concentric square consisting of eight computers 16,17,18,19,20, 21,22,23. The collection of computers ends at the collection edge 30.

Figure 3A:
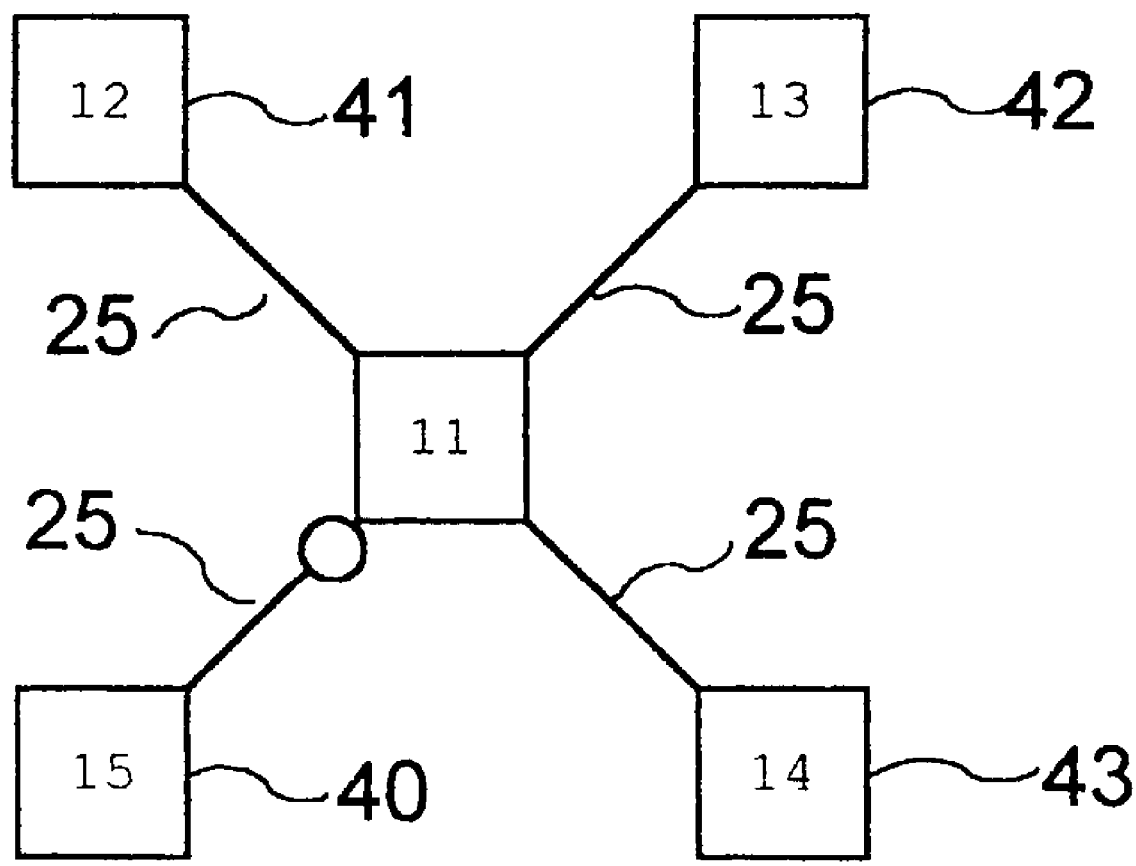
FIGS. 3A and 3B show a computer's neighbors and the linking of neighbors in the collection of computers.

The logical means to communicate 25 is defined by a neighbor relationship. Each computer possesses links to four neighbors. FIG. 3A illustrates each computer's neighbors as neighbor0 40, neighbor1 41, neighbor2 42, and neighbor3 43. Neighbor1 41 is to the right of (or counterclockwise from) neighbor0 40, neighbor2 42 is to the right of (or counterclockwise from) neighbor1 41, and neighbor3 43 is to the right of (or counterclockwise from) neighbor2 42.

Figure 3B:
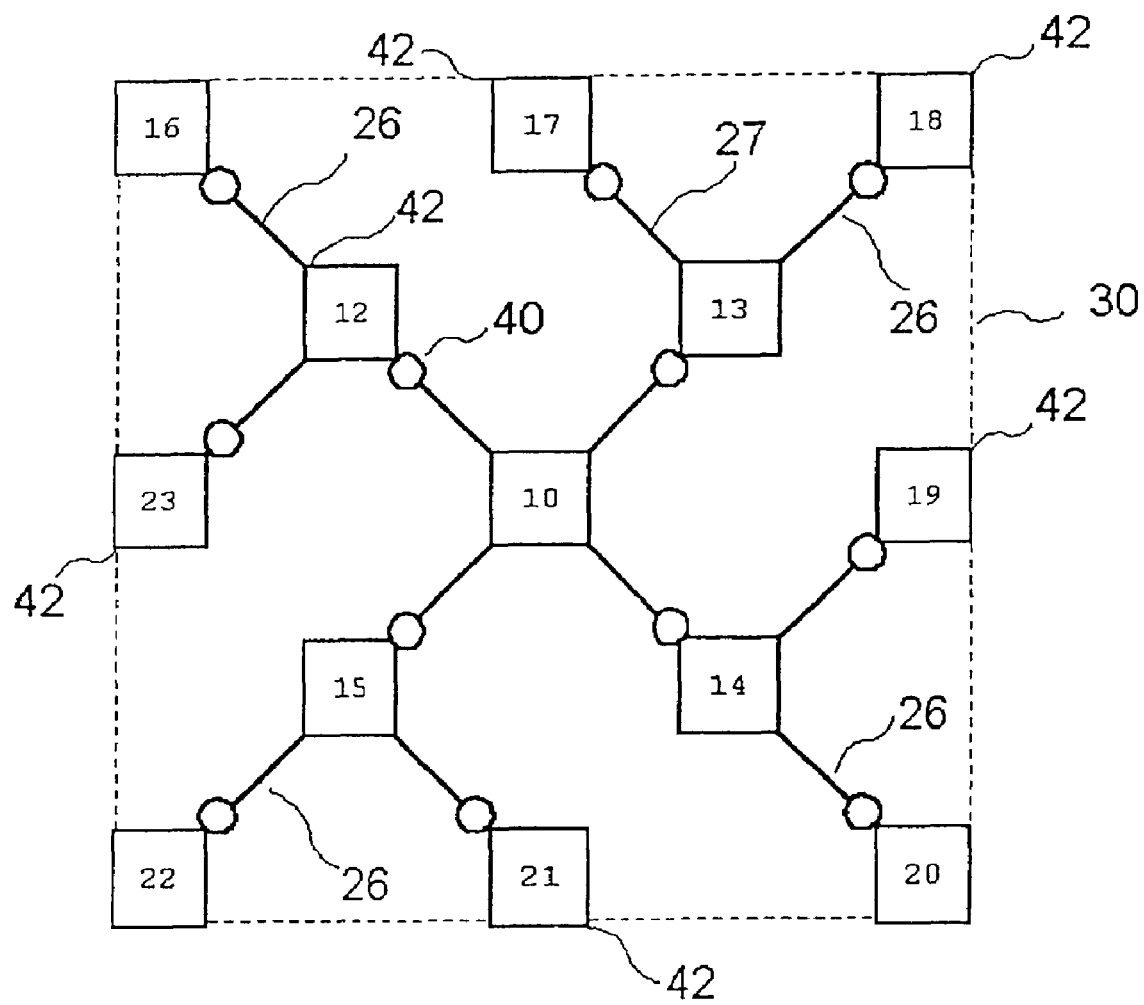

In FIG. 3B the neighbor0s 40 of four computers 12,13,14, 15 point to the logical center 10 of the collection. The neighbor2s 42 of these computers 12,13,14,15 point to four more computers 16,18,20,22, and so on. In addition, the neighbor1s 41 of these computers 12,13,14,15 point to four more computers 17,19,21,23, and so on.

The neighbor2 42 to neighbor0 40 configuration of the computers emanating from the logical center 10 of the collection may be considered radials 26. The radials 26 pass through the computers at the vertices of the concentric quadrilaterals. The neighbor0s 40 of computers on a radial point toward the logical middle of the collection of computers. The neighbor2s 42 of computers on a radial point toward the collection edge 30.

The neighbor1 41 of every computer on a radial 26 point to a line of neighbor2 42 to neighbor0 40 relationships which form indirect radials 27. The neighbor0s 40 of computers on an indirect radial 27 point toward a radial 26. The neighbor2s 42 of computers on an indirect radial 27 point toward the collection edge 30. Generally, the neighbor relationships are used for logically organizing the computers, while the radials 26 and indirect radials are used for disseminating information throughout the collection of computers.

Figure 4:
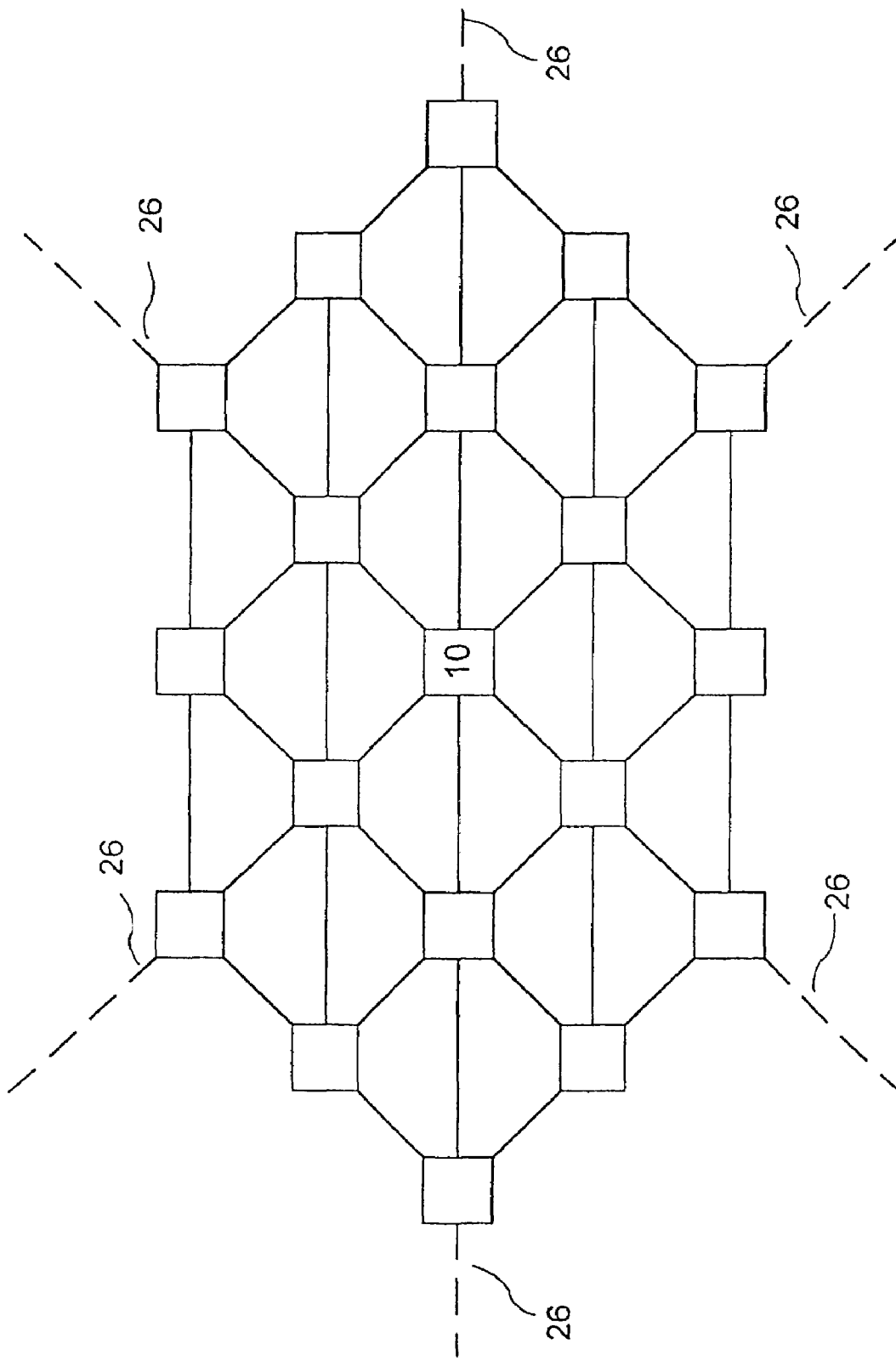
FIG. 4 shows a typical embodiment of the invention using a hexagonal configuration for the collection of computers.

A typical embodiment of the invention in a hexagonal configuration is illustrated in FIG. 4. As will be appreciated by persons of ordinary skill in the art, the hexagonal configuration possesses six radials 26 emanating from the logical center 10 of the collection, while indirect radials 27 generally emanate from a neighbor 2 (out of a total of six neighbors) of every computer on a radial 26. Although the invention is described in connection with a quadrilateral or hexagonal configuration, configurations with any even plurality of sides are possible in accordance with the invention. Three dimension configurations are also possible. For example, a spherical implementation that encompasses the entire collection of computers is possible. Such an implementation can be used to prevent "orphaned" computers regardless of which computer is serving as the top computer 11 at any given time. The more sides in the configuration, the more states exist in managing the collection of computers and the faster the broadcast and search of the entire collection may be performed. In any event, it will be recognized that, among other things, the orientation of the indirect radial depends on the particular configuration.

Operation-FIGS. 5 to 7

Figure 5A:
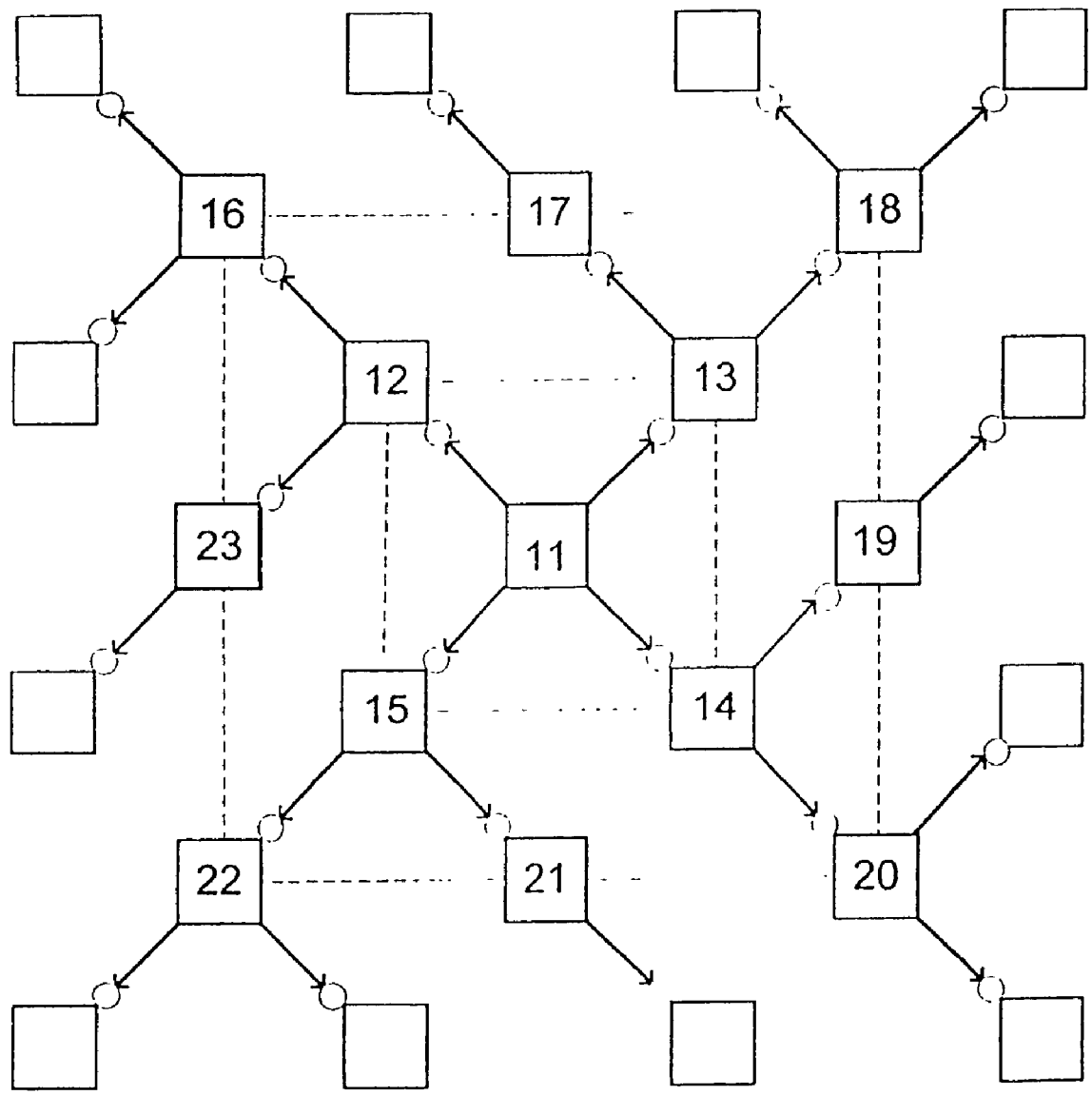
FIGS. 5A to 5C show the virtual hierarchy created by a typical embodiment of the invention using a quadrilateral configuration for the collection of computers.

The invention creates a logical organization in which each and every computer in the collection appears to be at the top of a hierarchy formed by concentric polygons. For purposes of describing the invention, the logical middle 10 of the collection of computers corresponds to the geometrical center, while the top computer 11 in the hierarchy represents a location at which a search or broadcast originates. As a result, the top computer 11, at any given time, changes based on which computer in the overall hierarchy is acting as a source of a broadcast, search, or other dissemination of information throughout the network or a portion thereof. FIG. 5A illustrates a hierarchy emanating from the top computer 11 in the hierarchy through a collection of computers 12,13,14,15,16, 17,18,19,20,21,22,23 organized into concentric squares. In the example illustrated by FIG. 5A, the top computer 11 in the hierarchy is also the logical middle 10 of the collection of computers.

In the case of the quadrilateral configuration, the number of computers in the concentric squares increases by four from concentric square to concentric square. The first square surrounding the top computer 11 in the hierarchy contains four computers 12,13,14,15. The next concentric square contains eight computers 16,17,18,19,20,21,22,23. The next concentric square contains twelve computers, and so on.

Figure 5B:
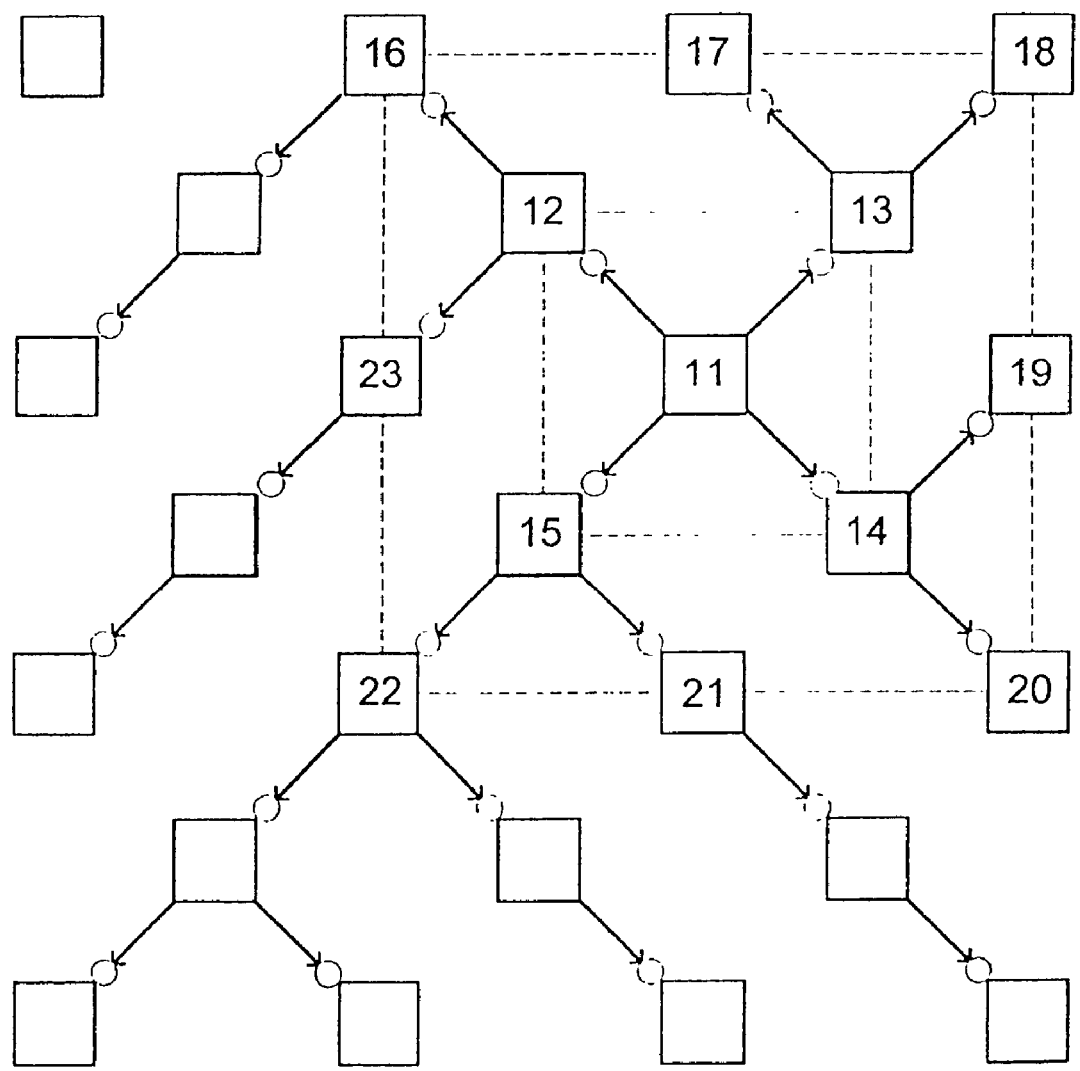

FIG. 5B illustrates a hierarchy emanating from the top computer 11 in the hierarchy through a collection of computers 12,13,14,15,16,17,18,19,20,21,22,23 organized into concentric squares. In the example illustrated by FIG. 5B, the top computer 11 in the hierarchy is not the logical middle 10 of the collection of computers.

The number of computers in the concentric squares increases by four from concentric square to concentric square. The first square surrounding the top computer 11 in the hierarchy contains four computers 12,13,14,15. The next concentric square contains eight computers 16,17,18,19,20, 21,22,23. The next concentric square (not fully shown) contains twelve computers, and so on.

Figure 5C:
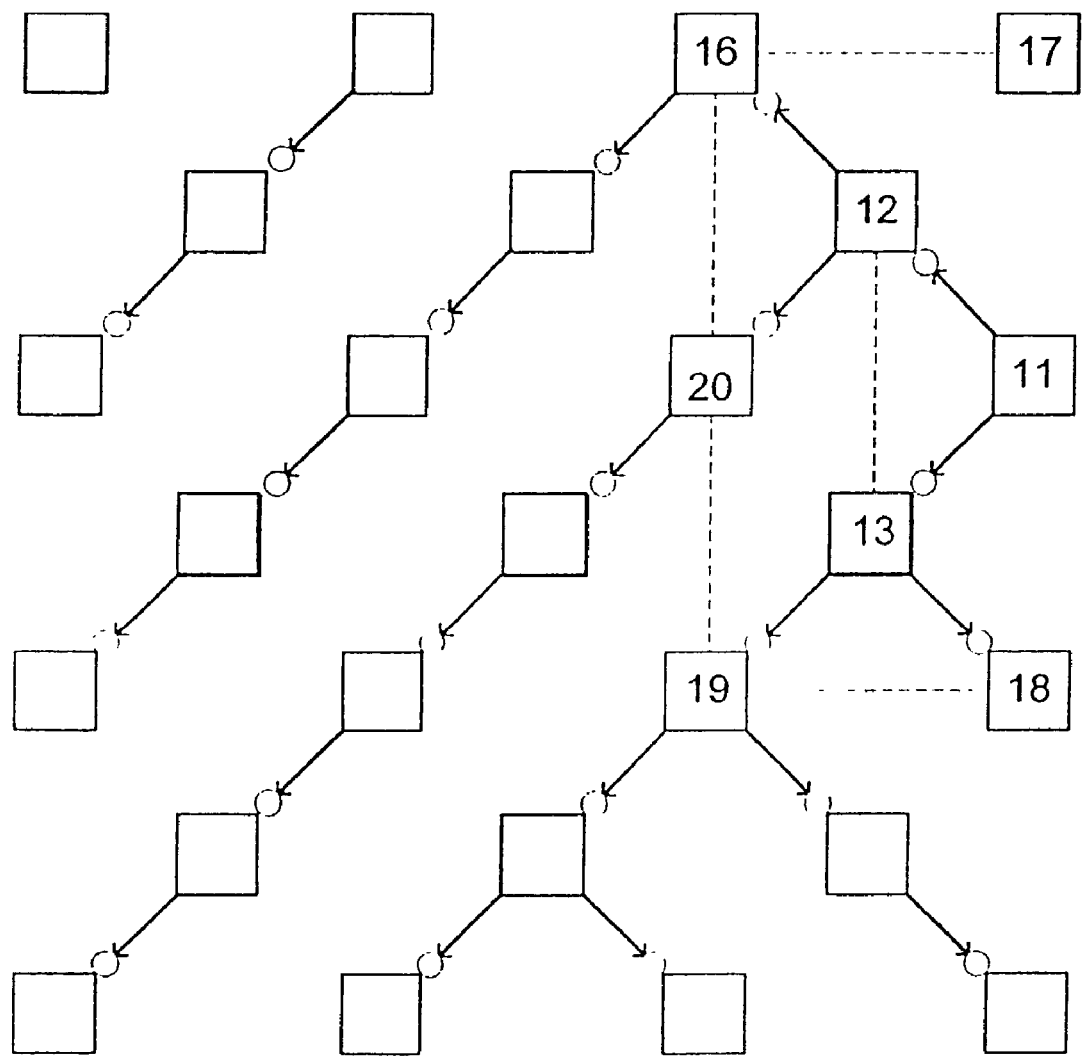

FIG. 5C illustrates a hierarchy emanating from the top computer 11 in the hierarchy through a collection of computers 12,13,14,15,16,17,18,19,20,21,22,23 organized into concentric squares. In the example illustrated by FIG. 5C, the top computer 11 in the hierarchy resides on the collection edge 30.

The number of computers in the concentric squares increases by four from concentric square to concentric square except computers residing on the collection edge 30 which do not possess a complete square of neighbors. In this case, therefore, the first square surrounding the top computer 11 in the hierarchy contains two computers 12,13. The next concentric square contains five computers 16,17,18,19,20. The next concentric square (not fully shown) contains six computers. The next concentric square contains nine computers, and so on.

Message Broadcast

One-to-many message broadcast may efficiently be performed by the collection of computers as each computer passes the broadcast to either one or two more computers in the next concentric polygon. FIG. 6 illustrates the rapid increase in number of computers reached with the addition of each concentric polygon.

Another look at FIG. 5A illustrates how a broadcast operation may use this configuration to relay a message from the top of the hierarchy out through the concentric squares of computers. The message is initially passed from the top computer 11 in the hierarchy to the four computers in the surrounding concentric square 12,13,14,15. In the example illustrated by FIG. 5A, the top computer 11 in the hierarchy is also the logical middle 10 of the collection of computers.

The message is then passed by the computers at the four corners of the square 12,13,14,15 to the eight computers in the surrounding concentric square 16,17,18,19,20,21,22,23. The message is then passed to the computers in the next concentric square and so on.

Another look at FIG. 5B illustrates how a broadcast operation may use this configuration to relay a message from the top of the hierarchy out through the concentric squares of computers. The message is initially passed from the top computer 11 in the hierarchy to the four computers in the surrounding concentric square 12,13,14,15. In the example illustrated by FIG. 5B, the top computer 11 in the hierarchy is not the logical middle 10 of the collection of computers.

The message is then passed by the computers at the four corners of the square 12,13,14,15 to the eight computers in the surrounding concentric square 16,17,18,19,20,21,22,23. The message is then passed to the computers in the next concentric square and so on.

Another look at FIG. 5C illustrates how a broadcast operation may use this configuration to relay a message from the top of the hierarchy out through the concentric squares of computers. In the example illustrated by FIG. 5C, the top computer 11 in the hierarchy resides on the collection edge 30. Computers residing on the collection edge 30 do not possess a complete square of neighbors.

The message is initially passed from the top computer 11 in the hierarchy to the two computers 12,13 in the surrounding but incomplete concentric square. The message is then passed to the five computers 12,13,14,15,16. In the surrounding but incomplete concentric square. The message is then passed to the computers in the next surrounding but incomplete concentric square and so on.

As can be seen in both FIGS. 5B and 5C, there is a possibility that one or more computers will be orphaned (e.g., computer 17 in FIG. 5C), at least with respect to a message that does not originate from a top computer 11 at the logical middle 10 of the collection of computers. The existence of such orphaned computers, however, does not create a problem in most applications. Preferably, although not necessarily, a broadcast will originate from a top computer 11 that is at the logical middle of the collection of computers. Thus, the broadcast will reach all of the computers in the collection. On the other hand, messages that originate from a top computer 11 that is not at the logical middle 10 frequently do not need to reach all of the computers in the collection. For example, a search for a specified file or application normally does not have to be exhaustive because there is often sufficient redundancy in a computer network to locate a subject of a search without querying every computer in the network.

Searching the Collection of Computers for Content

A search of content residing on computers in the collection may be performed if the message passed through the hierarchy contains search parameters and the network address of the requesting computer. The message will radiate through the hierarchy causing each computer in the collection to search its local content. When a computer being searched finds a match to the searched content, that computer contacts the network address of the requesting computer and identifies the network address where the content is located.

Locating a Computer by a Name or Other Identifying Characteristic.

A computer in the collection of computers may be located by a name or other identifying characteristic if the message passed through the hierarchy contains the name or other identifying characteristic and the network address of the requesting computer. The message will radiate through the hierarchy causing each computer in the collection to compare the name or other identifying characteristic to its own name or other identifying characteristic.

Initially Creating the Collection of Computers

The collection of computers must begin with a single computer which will be the initial logical middle 10 of the collection of computers. The next four additions to the collection of computers will constitute the neighbor0 40, neighbor1 41, neighbor2 42, and neighbor3 43 neighbors of the logical middle 10 of the collection of computers.

Adding Additional Computers to the Collection of Computers

In order to become part of the collection of computers, a computer must first find another computer which is part of the collection of computers.

A computer can find to the collection of computers using several techniques including but not limited to:

(a) Trying to attach to a known list of available computers in the collection of computers.

(b) Trying to attach to a computer from a list of computers with which this computer has previously communicated.

(c) Seeking a computer connected to the collection of computers by broadcasting queries to network addresses created from an algorithm such as a random number generator.

When a new computer 32 locates a computer belonging to the collection of computers, the found computer 28 (see FIG. 7A) will reside either on a radial 26 or indirect radial 27. The neighbor2 42 of the found computer 28 will point toward the collection edge 30. By following the found computer's 28 neighbor's neighbor2s 42 one after another, the collection edge 30 may be located. The new computer 32 is attached to the collection of computers at the edge 30.

Figure 7A:
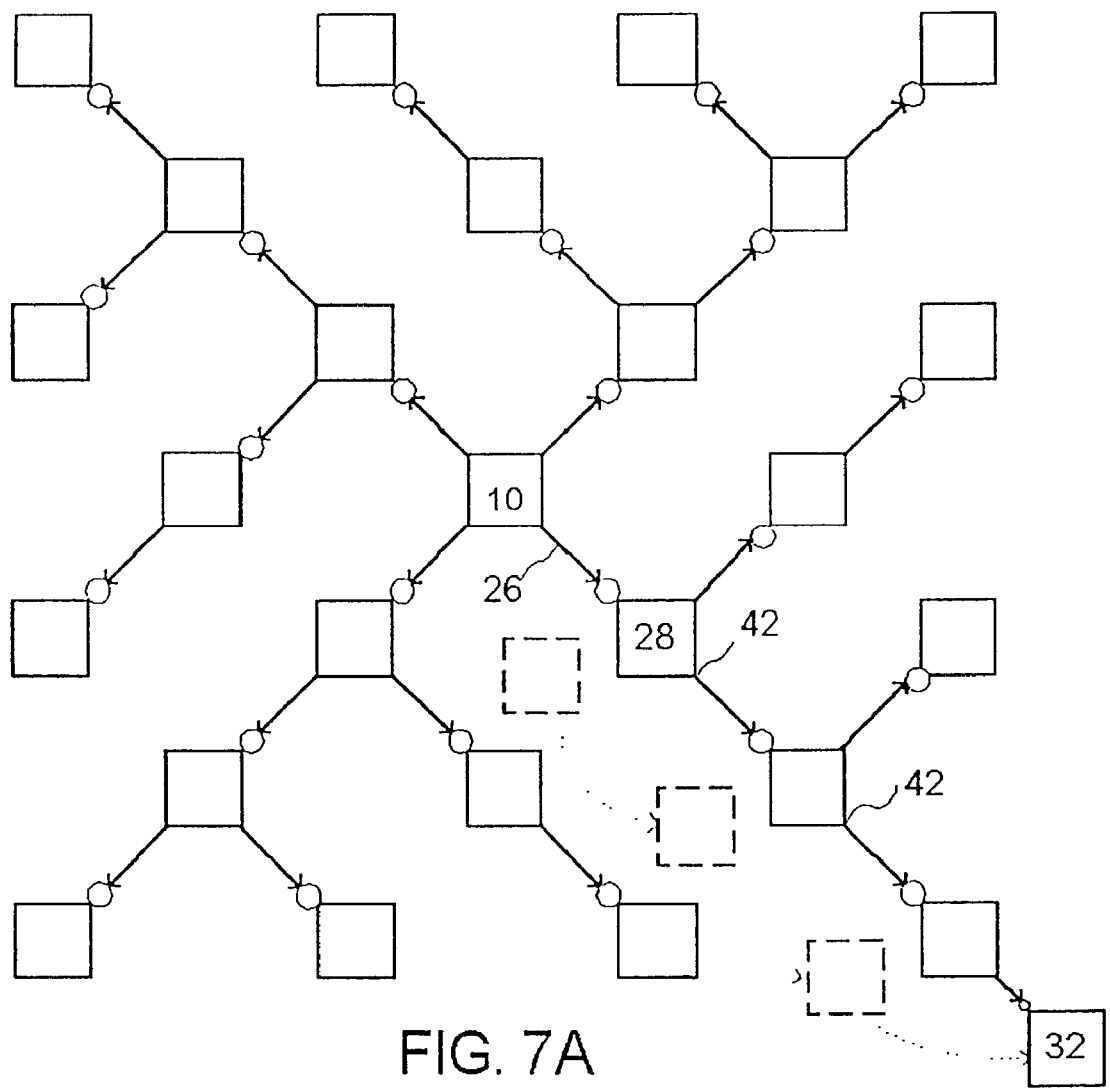
FIGS. 7A and 7B show a new computer being added to the collection of computers.

FIG. 7A illustrates following a radial 26 from the found computer 28 to the collection edge 30 to attach a new computer 32.

Figure 7B:
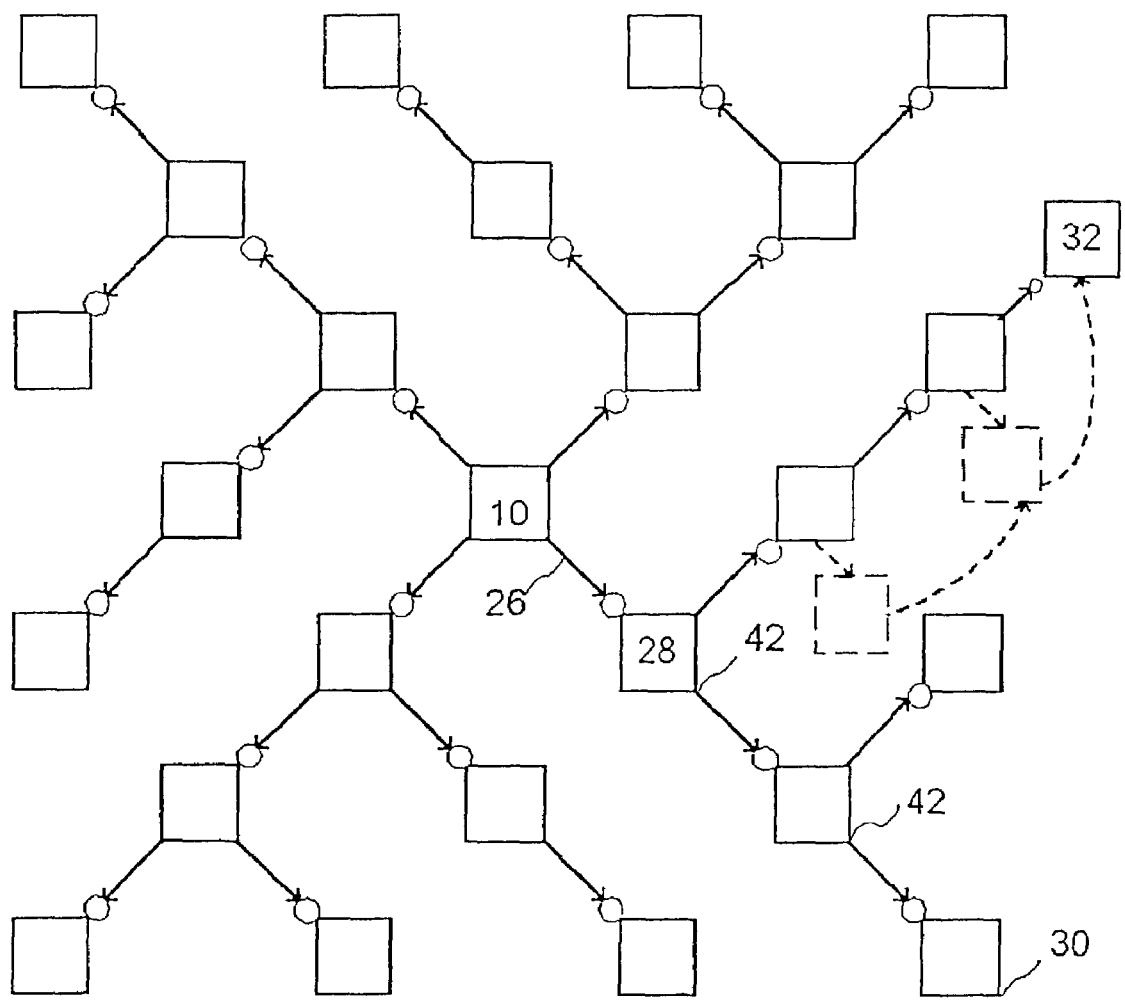

FIG. 7B illustrates following an indirect radial 27 from the found computer 28 to the collection edge 30 to attach a new computer 32.

Self Organizing a Hierarchy

Figure 8A:
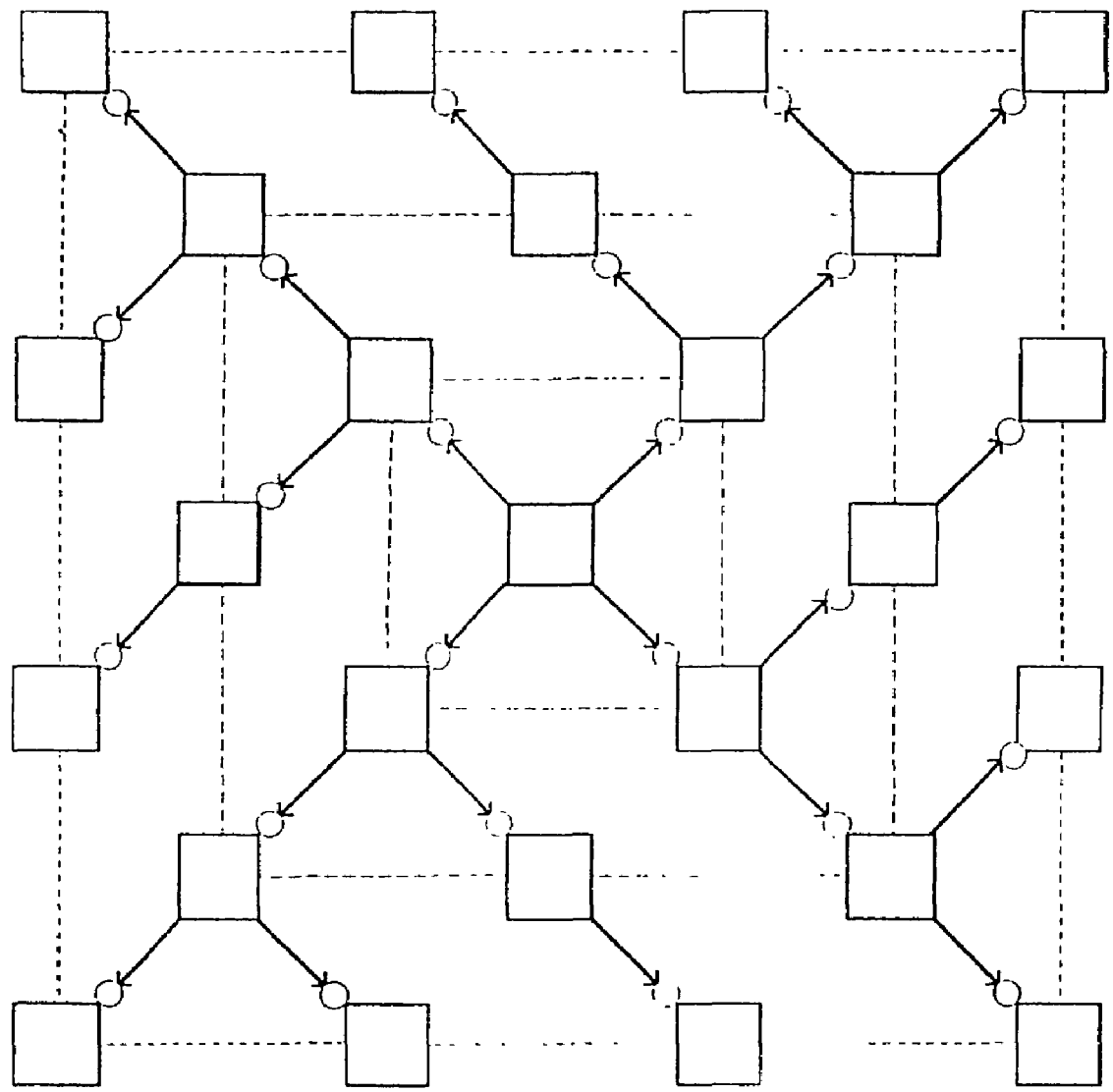
FIGS. 8A and 8B shows a non-optimized view of a quadrilateral configuration for the collection of computers and an optimized view of the same collection of computers.
Figure 8B:
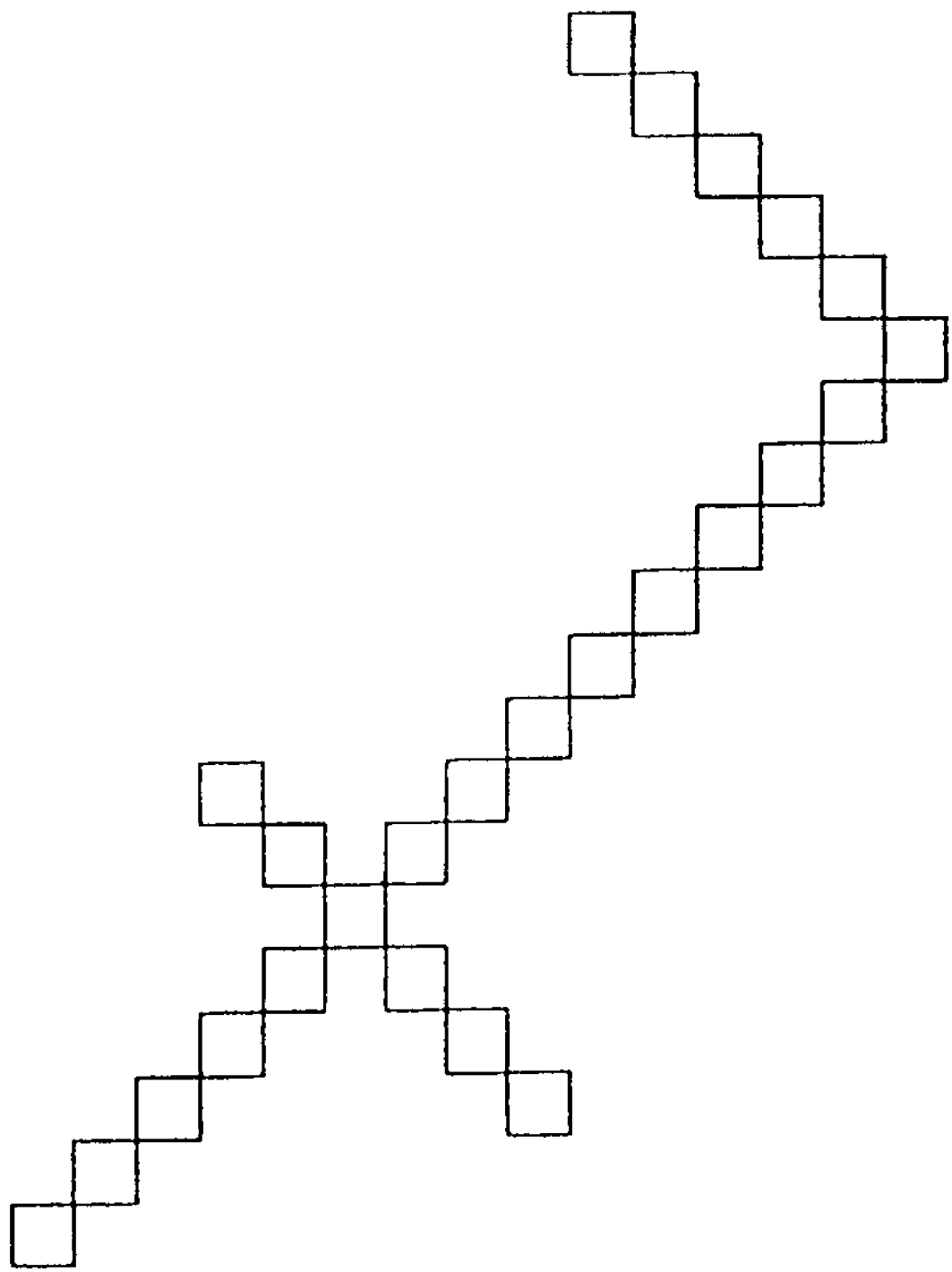

The collection of computers may be searched more rapidly if it maintains itself as a symmetrical compact shape such as that illustrated in FIG. 8A rather than a collection of long thin strings as illustrated in FIG. 8B. For example, a message can be broadcast to all 25 members of the collection of computers illustrated in FIG. 8A within three hops from the logical middle 10 of the collection of computers. However a message requires fourteen hops to be fully broadcast to the members of the collection of computers illustrated in FIG. 8B.

Figure 9A:
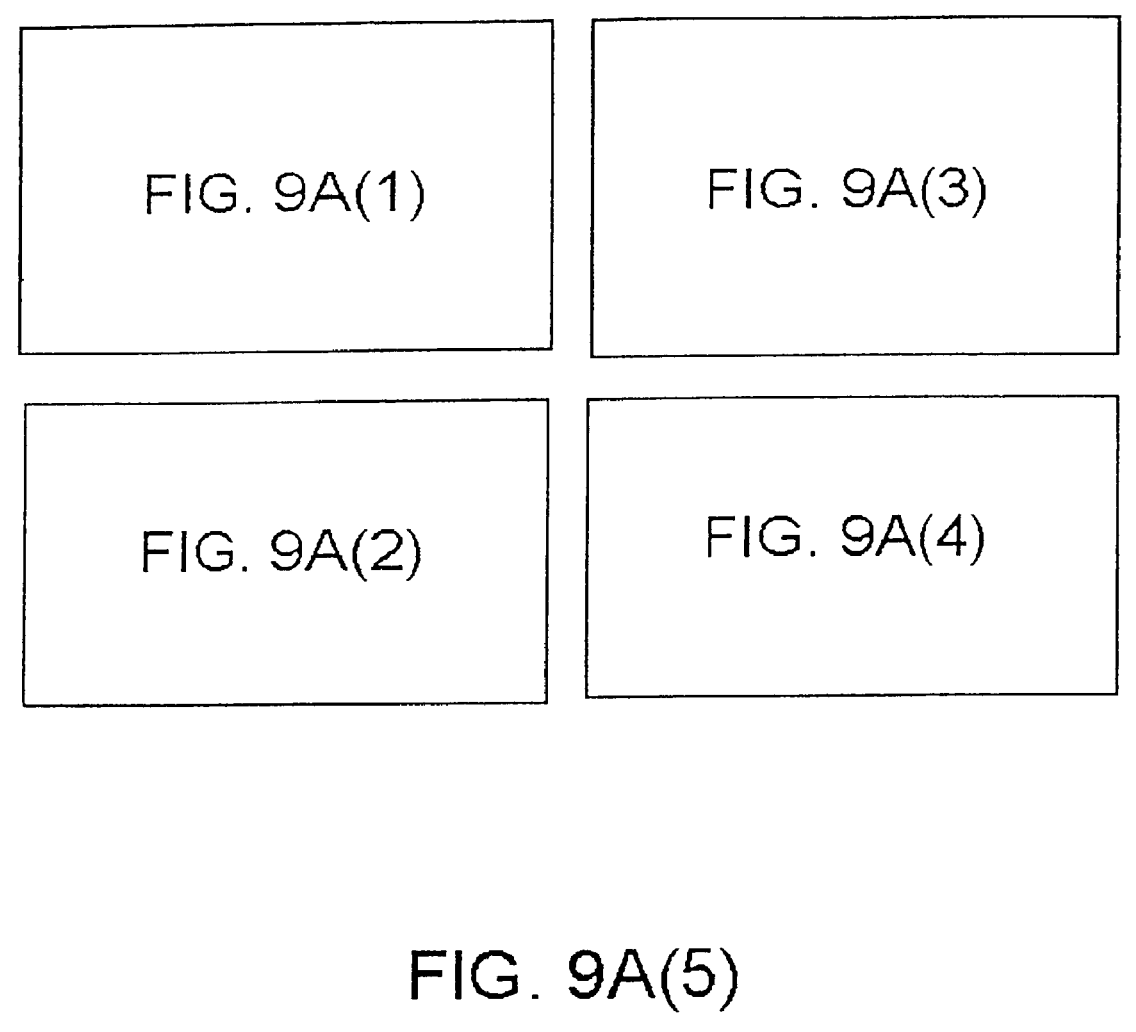

To maintain symmetrical compactness of the collected computers, each computer in the collection follows a goal seeking behavior illustrated in FIGS. 9A-1 to 9H and generally defined as:

(a) Orbit counter clockwise at the same level of concentric polygon until another computer is encountered;

(b) Decay inward until another computer is encountered.

The result of the above two rules applied by each computer in the collection will result in the creation of a logical network in the shape of a near perfect quadrilateral (or other polygon, depending on the configuration).

Self Organizing States

In the preferred embodiment, each unit follows the goal seeking behavior illustrated in FIGS. 9A-1 to 9P through the logic of a state machine. A state machine is a logical mechanism that defines the existence of a plurality of physical or logical states of being and the occurrences necessary to change the mechanism from one state of being to another.

For purposes of clarity, neighbor0 40 may be referred to as N0. Similarly neighbor1 41 may be referred to as N1, neighbor2 42 may be referred to as N2, and neighbor3 43 as N3. In some states, both the existence of a neighbor and existence of a neighbor's neighbor determine the state. In such instances, for clarity, the neighbor0 of neighbor0 is referred to as N00. Similarly the neighbor2 of neighbor1 is referred to as N12.

FIGS. 9A-1 to 9A-4 illustrate the state diagram of the goal seeking behavior of an individual computer relative to the collection of computers of which it is a part. In particular, FIGS. 9A-1 to 9A-4 exemplify the possible state transitions at least for a quadrilateral configuration. These states, however, relate only to the logical organization of the computers with respect to the logical middle 10 and not to the identify or location, at any particular time, of the top computer 11. For clarity, each computer in the collection of computers may exist in one of the following states based on the existence and state of its neighbor units and its proximity to a radial 26:

State 1 (illustrated in FIG. 9B)—The computer is searching for a found computer 28 in the collection of computers. Three strategies are used:

(a) Search a pre existing list of network addresses of computers known to belong to the collection of computers.

(b) Search a cache of network addresses of computer with which the searching unit communicated when previously connected to the collection of computers.

(c) Use a brute force search of all possible network addresses of computers. In an embodiment using Internet addresses, the search will be made by generating random 32-bit numbers corresponding to Internet Protocol (IP) addresses and excluding the ranges of non routable IP addresses.

The searching computer confirms location of a computer in the collection of computers by executing a handshake protocol consisting of the following exchange:

(a) Searching Unit—"Are you connected to the collection of computers?"

(b) Queried Unit—"Yes I am, no I am not, or I don't understand."

When the searching computer locates the collection of computers, its state becomes State 2.

State 2 (illustrated in FIG. 9C)—The computer has located the collection of computers and is attempting to locate the collection edge 30. The computer follows the neighbor2 42 neighbor links of the found computer 28 to locate the next closest computer to the collection edge 30. The computer will continue to follow the neighbor2 42 neighbor links of successive neighbors until a neighbor is found with no neighbor2 42 link. A neighbor without a neighbor2 42 link resides on the collection edge 30.

State 3 (illustrated in FIG. 9D)—The computer is located on the collection edge 30 and on a radial 26. Since the computer is located on the collection edge 30, the computer's neighbor2 42 does not exist. Furthermore, as illustrated in FIG. 9D the neighbor01 position is vacant.

At the first opportunity, the computer will move into the neighbor01 position thereby moving closer to the logical middle 10 of the collection of computers.

State 4 (illustrated in FIG. 9E)—The computer is located on the collection edge 30 and therefore the computer's neighbor2 42 does not exist. The computer is not located on the radial, but is touching it. The computer's neighbor1 41 does not exist.

At the first opportunity the computer will move into the neighbor01 position thereby moving closer to the logical middle 10 of the collection of computers.

State 5 (illustrated in FIG. 9F)—The computer is located on an indirect radial 27. Neighbor1 41 does not exist. Neighbor2 42 does not exist, and the neighbor01 position is filled.

At the first opportunity the computer will move onto the indirect radial 27 behind the neighbor01 position thereby moving closer to the logical middle 10 of the collection of computers.

State 6 (illustrated in FIG. 9G)—The computer is located on an indirect radial 27. Neighbor1 41 does not exist. Neighbor2 42 does not exist. The neighbor01 position is vacant.

At the first opportunity the computer will move into the neighbor01 position.

State 7 (illustrated in FIG. 9H)—The computer is located on an indirect radial 27, but its Neighbor1 41 is a radial 26. Neighbor2 42 does not exist.

At the first opportunity the computer will move onto the radial 26 behind the neighbor01 position.

State 8 (illustrated in FIG. 9I)—The computer is located on an indirect radial 27. The N12 position is vacant.

At the first opportunity the computer will move into the N12 position.

State 9 (illustrated in FIG. 9J)—The computer is located on an indirect radial 27. Neighbor1 41 exists and Neighbor1 41 is on a radial 26.

This is a stable state. No movement is possible without other neighbors moving first.

State 10 (illustrated in FIG. 9K)—The computer is located on a radial 26. Either Neighbor1 41 or Neighbor2 42 exist preventing movement.

This is a stable state. No movement is possible without other neighbors moving first.

State 11 (illustrated in FIG. 9L)—The computer is located on an indirect radial 27. Either Neighbor2 42 or N12 exist preventing movement. One neighbor must exist to prevent movement.

This is a stable state. No movement is possible without other neighbors moving first.

State 12 (illustrated in FIG. 9M)—The computer is located on a radial 26. Neighbor0 40 is vacant. Either neighbor1 41 or neighbor3 43 exist so there is a way to link to the neighbors of the missing neighbor0 40.

At the first opportunity, the computer will move into the vacant neighbor0 40 position.

State 13 (illustrated in FIG. 9N)—The computer is located on an indirect radial 27 but is touching a radial 26. Neighbor0 40 is vacant. Either neighbor1 41 or neighbor3 43 exist so there is a way to link to the neighbors of the missing neighbor0 40.

At the first opportunity, the computer will move into the vacant neighbor0 40 position.

State 14 (illustrated in FIG. 9O)—The computer is located on an indirect radial 27. Neighbor0 40 is vacant. Either neighbor1 41 or neighbor3 43 exist so there is a way to link to the neighbors of the missing neighbor0 40.

At the first opportunity, the computer will move into the vacant neighbor0 40 position.

State 15 (illustrated in FIG. 9P)—The computer is located on an indirect radial 27. Neighbor0 40 exists. Neighbor1 41 is vacant. Neighbor2 42 is vacant. Neighbor01 is vacant.

At the first opportunity, the computer will move into the vacant neighbor01 position.

Bandwidth Availability Sorting

After entering one of the stable states, each computer will compare its available network bandwidth with that of its Neighbor0 40. If the computer's available network bandwidth is greater than that of its Neighbor0 40, the computer and its Neighbor0 40 will swap places in the collection of computers.

The effect of the computers swapping places is that the collection of computers becomes sorted by available network bandwidth. The computers with the greatest amount of available network bandwidth will be closest to the logical middle 10 of the collection of computers.

Failure Recovery

The collection of computers can rebuild the connections necessary for broadcast and searching in the event a computer in the collection becomes disabled by a hacking attack or ceases functioning due to technical or network problems.

Figure 10A:
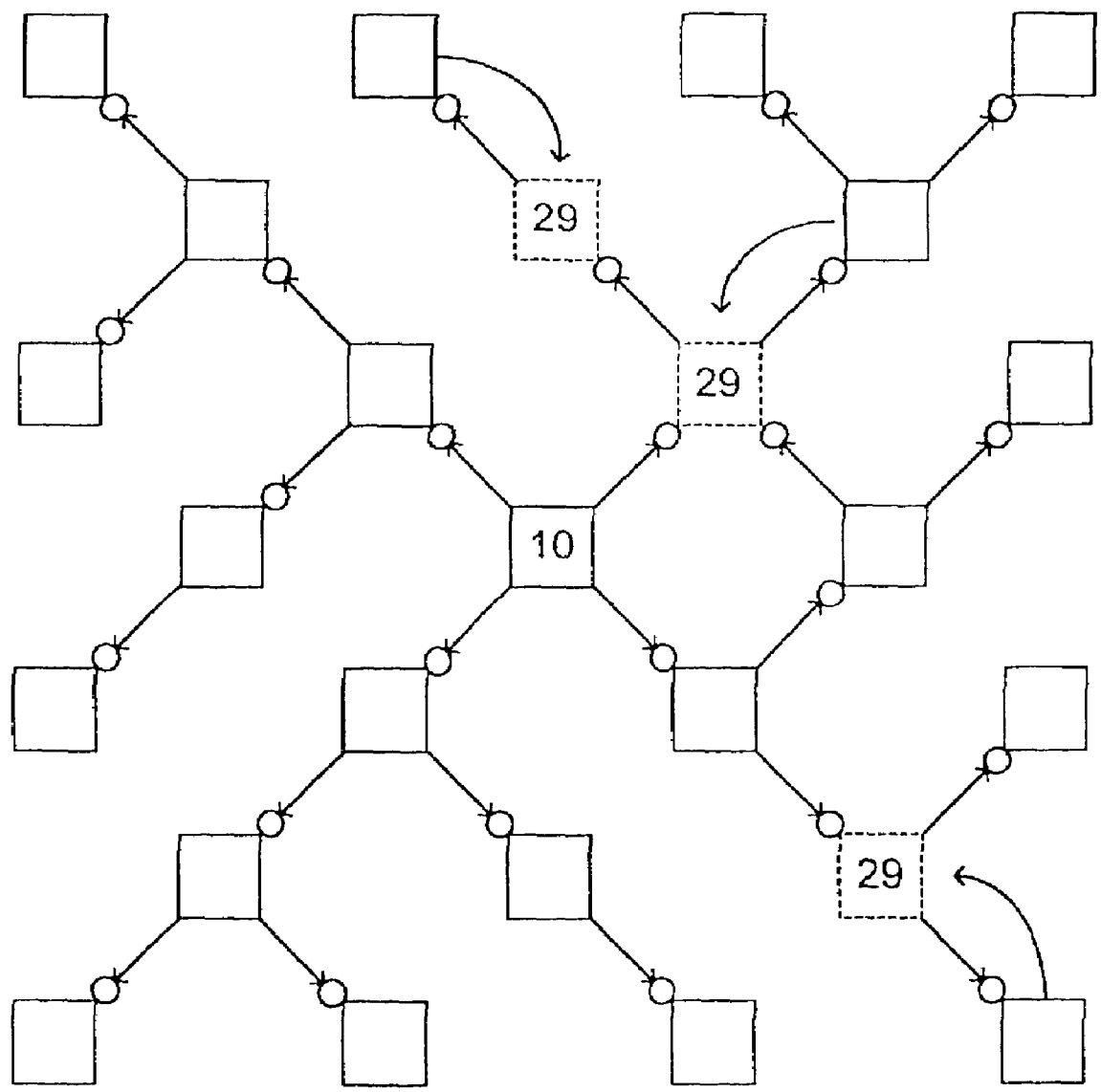
FIGS. 10A to 10C show a view of a quadrilateral configuration with three missing computers.
Figure 10B:
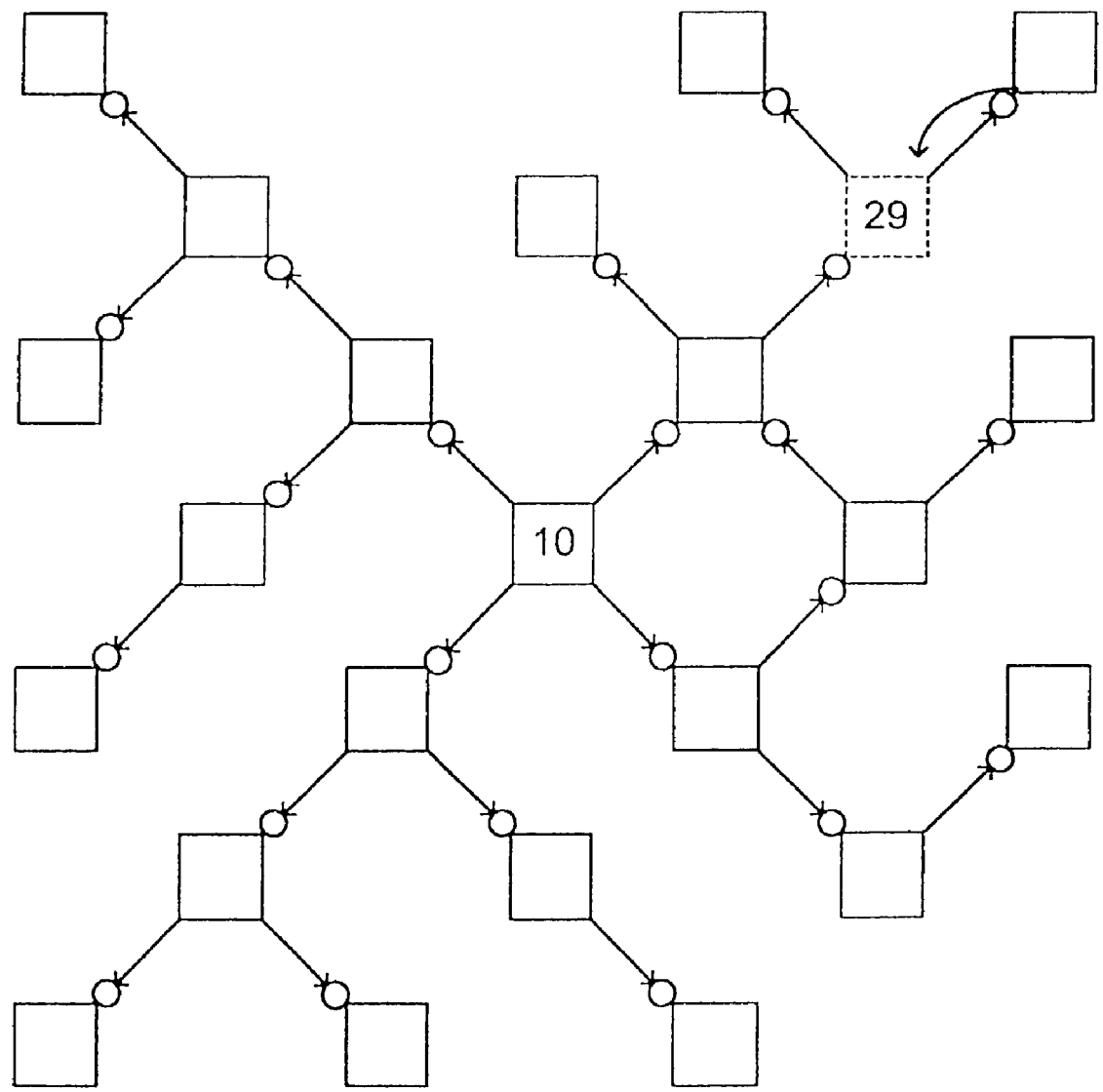
Figure 10C:
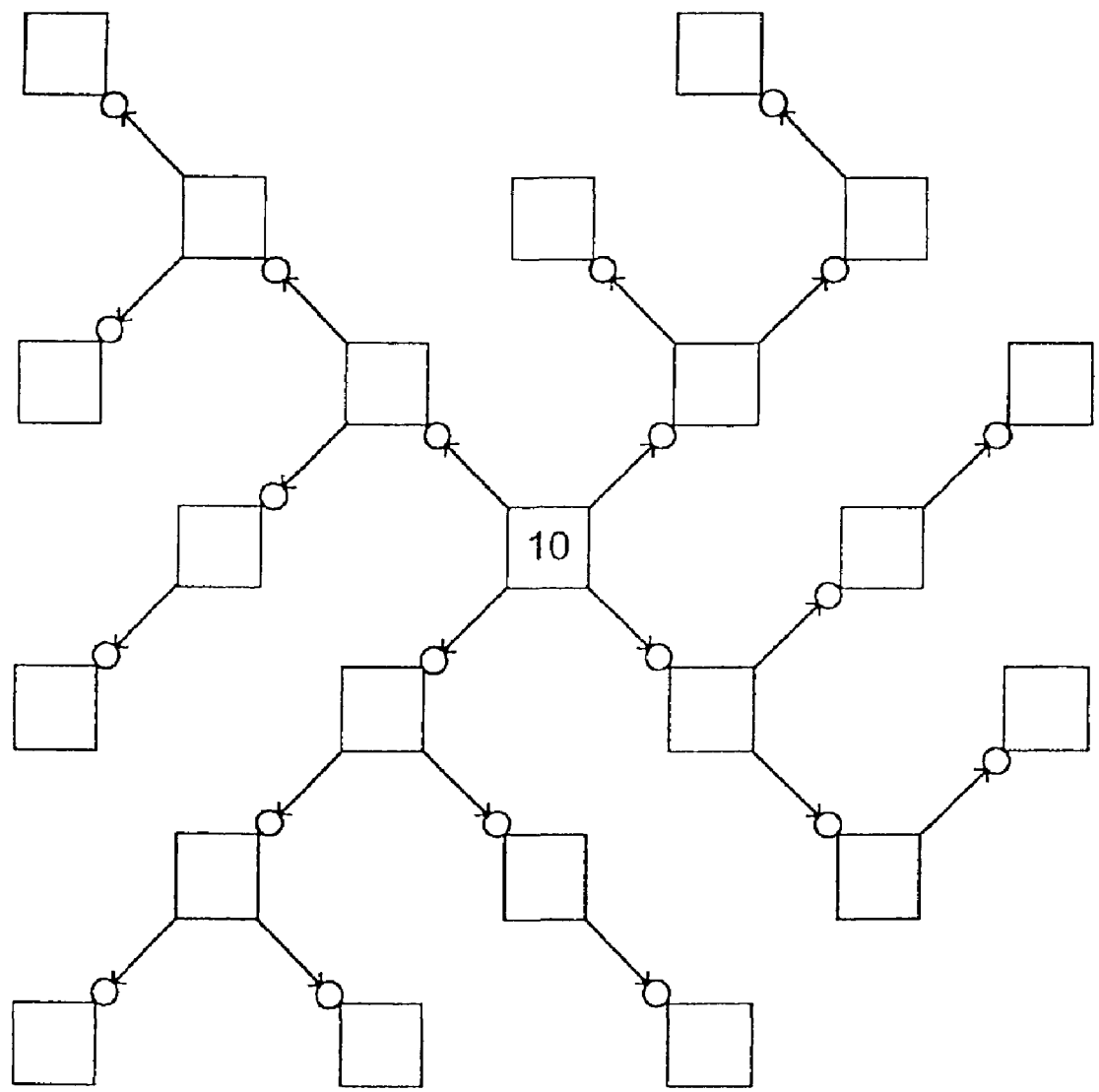

FIG. 10A illustrates the collection of computers following the disabling of several computers. The disabled computers 29 are unable to pass along broadcast messages and must therefore be replaced. FIGS. 10B through FIG. 10C illustrate the process by which the remaining computers in the collection reorganize the remaining computers.

Once the disabled computers have been removed from the interior of the collection of computers, the reorganization will continue to rebuild the symmetrical compactness illustrated in FIGS. 9B to 9K.

Computer Locking

Each computer in the collection of computers functions as an autonomous unit asynchronously related to its neighbors. In order to synchronize the movements of computers to different positions in the collection, it is necessary to prevent race conditions or ambiguous situations which could occur should a computer make a decision based on the states of its neighbors and move its position at the same time the neighbor's states are changing.

For this reason a computer in the collection will lock its neighbors from making any moves until it:

(a) Senses the state of its neighbors.
(b) Decides if a move is necessary.
(c) Performs the move.

The lock has a timeout to prevent a never ending lock should the locking computer be disabled in some way before releasing the lock.

Limiting Broadcast or Searches

In some cases it may be desirable to limit message broadcast or content searches to a subset of the collection of computers. In that case, the broadcast or search may be limited by specifying the number of concentric rings to search relative to the computer requesting the broadcast or search.

Bandwidth Throttling

If all computers in the collection of computers do comprehensive message broadcasts or content searches, the communications means logically connecting the computers may become congested.

Any computer in the collection of computers can view the sum total of the communications traffic between all computers. Should the communications traffic begin to approach to capacity of the logical communications channel a means of reducing the traffic must be considered.

The following technique is fair to each user of the collection of computers, rewards efficient use, and penalizes overused. Before each broadcast or search is initiated, each and every computer in the collection of computers will perform the following before performing a broadcast or search:

(a) Measure the logical communication channel bandwidth utilization.
(b) If the utilization is below a predetermined desired threshold, proceed with the broadcast or search, otherwise,
(c) Calculate the time since the last search.
(d) If the time since the last search is less than a predetermined amount, insert a predetermined delay in front of the request for broadcast or search which is related to the amount the communications channel bandwidth utilization exceed the predetermined desired threshold.

The above algorithm will assure that broadcast and search performance will degrade gracefully under heavy use of the collection of computers.

Caching Computers

If the collections of computers large enough and search demands frequent enough to fill the logical communication channel bandwidth, a more efficient use of bandwidth is possible by defining a subset of the collection of computers to perform a caching function. The computers chosen to perform the caching function are those with faster network connections.

Figure 11:
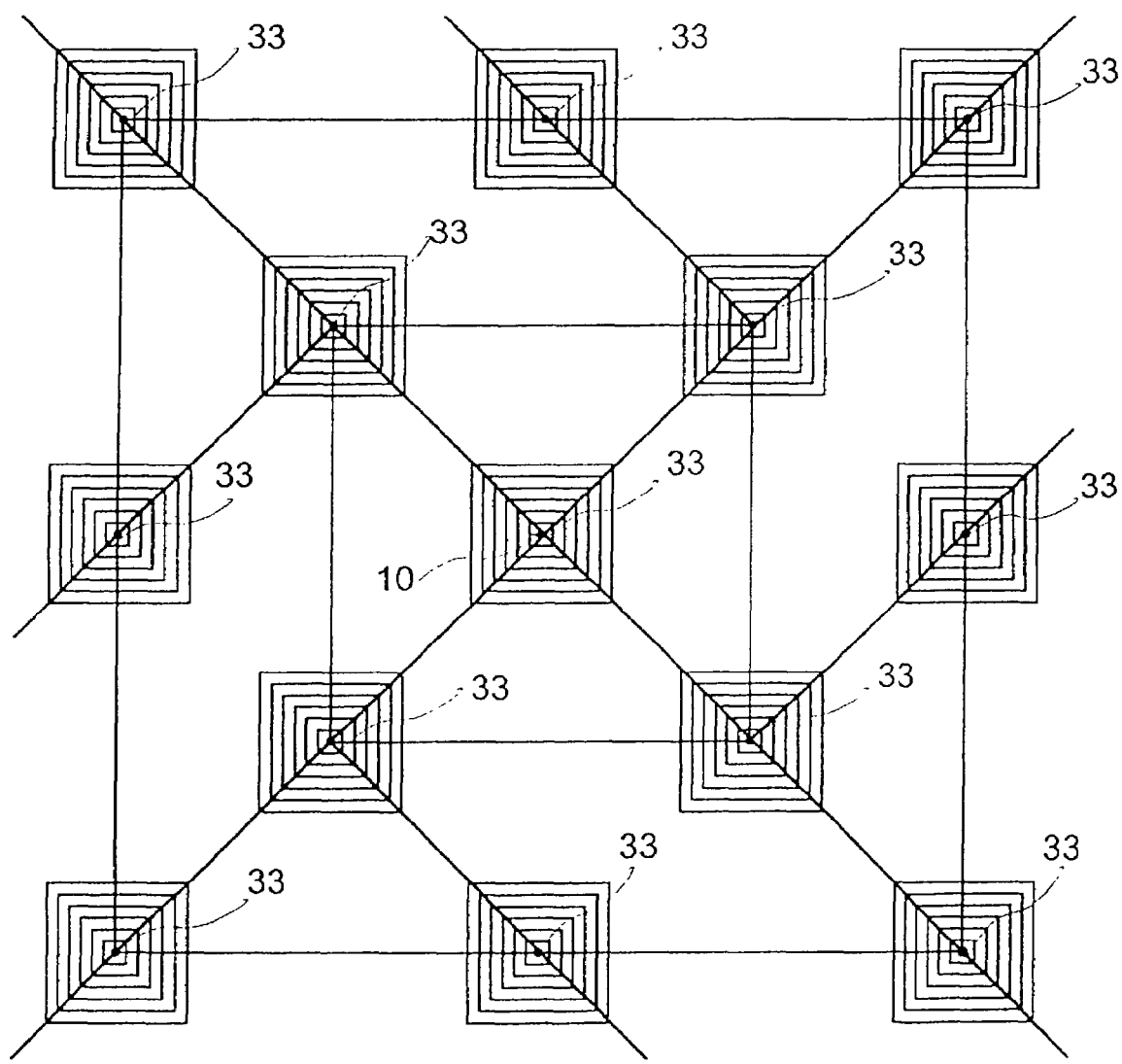
FIG. 11 shows the organization of computers with a subset of computers performing caching.

FIG. 11 illustrates the preferred embodiment of the caching organization. In FIG. 11 the caching computers 33 are organized into a collection of computers similar to the collection of non-caching computers shown in FIG. 2. Each caching computer 33 is the logical middle of a collection of computers. As such, the caching computers 33 and the underlying collections of computers represent a hierarchy within a hierarchy or, in an alternative way of looking at it, a simple type of three dimensional configuration. Each caching computer 33 caches the content index and name or other identifying characteristic of each computer in the collection of computers which surround the caching computer 33.

Each caching computer 33 is also a member of the collection of caching computers. The collection of caching computers self organizes itself so that the computer with the most available network bandwidth resides at the logical middle 10 of the collection of caching computers.

Each caching computer in the collection of caching computers compares its available network bandwidth with the network bandwidth of its neighbor nearer the logical middle of the collection of caching computers. If the caching computer possesses more available network bandwidth than its neighbor, the computer and its neighbor swap positions in the collection of caching computers.

Each caching computer in the collection continuously performs the compare and swap operation, such that the collection of caching computer is always sorted with the computer having the most available network bandwidth located at the logical middle of the collection of caching computer and each concentric polygon contains computers with successively less available network bandwidth.

Adding a Caching Computer

A caching computer is added to the collection of caching computers in much the same way as a computer is added to the collection of computers as described in Self organizing a Hierarchy and illustrated in FIGS. 9A-1 to 9P.

A new caching computer can find the collection of caching computers using several techniques including but not limited to:

(a) Trying to attach to a known list of available caching computers in the collection of caching computers.

(b) Trying to attach to a caching computer from a list of caching computers with which this computer has previously communicated.

(c) Seeking a computer connected to the collection of caching computers by broadcasting queries to network addresses created from an algorithm such as a random number generator.

When a new caching computer locates a computer belonging to the collection of caching computers the found caching computer will reside either on a radial 26 or an indirect radial 27. The tail 41 of the found caching computer 28 will point toward the collection edge 30. By following the found caching computer's 28 neighbor's tail to head one after another, the collection edge 30 may be located. The new caching computer is attached to the collection of caching computers at the edge 30.

To maintain symmetrical compactness of the collected computers, each computer in the collection follows a goal seeking behavior as illustrated in FIG. 9:

(a) Orbit counter clockwise at the same level of concentric polygon until another computer is encountered;

(b) Decay inward until another computer is encountered.

A newly added caching computer will have a large amount of available network bandwidth, and as such will swap positions with its neighbors until it reaches the logical middle of the collection of caching computers. Preferably, a newly added computer will be designated as a caching computer based on whether the newly added computer possesses an available amount of bandwidth greater than some threshold. Newly added computers that do not possess an amount of bandwidth over the threshold are added as non-caching computers.

Adding a Non-caching Computer

In a caching system, a new computer 32 locates the collection of computers and then follows the head to toe links until it reaches the logical middle 10 of its collection of computers. The logical middle will be a caching computer that also belongs to the collection of caching computers.

The new computer 32 will follow the head to toe links of the collection of caching computers until it reaches the logical middle of the collection of caching computers.

The new computer 32 will provide the caching computer with its network address, the index of its content, and its name or other identifying characteristics. The new computer 32 will then follow a radial 26 of the collection of non-caching computers attached to the logical middle of the collection of caching computers. The new computer 32 will attach itself to the edge 30 of the collection of computers and begin the self-organizing logic to seek a position.

Self Balancing Cache

Due to the bandwidth availability comparison logic, the computer at the logical middle of the collected caching computers will always be the caching computer with the most available bandwidth. New non-caching computers will always be added to the collection of non-caching computers attached to this caching computer.

As more non-caching computers are added to the caching computer with the most available bandwidth, it will eventually have less available bandwidth than another caching computer in the collection of caching computers and be replaced at the middle of the collection of caching computers by a computer with more bandwidth available.

In the above fashion, the collection of caching computers will always maintain an optimally balanced distribution of non-cached computers attached to each caching computer.

Unavailable Computer

From time to time, a caching computer will poll each of the computers in its collection of non-caching computers. When a computer that is a member of a collection of computers headed by a caching computer becomes unavailable or unusable through some sort of failure, the caching computer will remove the unavailable computers cached content index, name, and other identifying characteristics.

Unavailable Caching Computer

From time to time, a caching computer will fail to respond to communications from non-caching computers in its collection of computers. The caching computer will be replaced by one of the non-caching computers in its collection of computers using the algorithms illustrated in FIGS. 9A-1 to 9P.

Should there be no more non-caching computers available in the disabled caching computers collection of computers, the collection of caching computers will fill in the void using the logic illustrated in FIGS. 9A-1 to 9P.

Auto-update

The invention embodies a feature by which a computer compares its version of software that controls the collection of computers to that of the neighbor 40,41,42,43 with which it is preparing to communicate. If the computer requesting the communication possesses a more recent version of the software that controls the collection of computers, then that version of software is transferred to the neighbor 40,41,42,43.

If the neighbor 40,41,42,43 to which communications is being requested posses a more recent version of the software that controls the collection of computers, then the more recent version of the software is transferred from the neighbor 40,41, 42,43 to the computer requesting the communications.

In this fashion, a software update applied to any computer in the collection of computers will propagate through the collection of computers at about the same rate as a message broadcast.

Distributing Executables Across the Collection of Computers

It is possible using the auto-update mechanism described above to distribute executable programs to all computers in the collection of computers.

It is possible using the auto-update mechanism described above to distribute executable programs to a subset of all the computers in the collection of computers by limiting the distribution to computers within a fixed number of concentric polygons of the computer initiating the distribution.

The computers receiving executable programs using the auto-update mechanism may be commanded to perform certain operations using the executable programs distributed using the auto-update mechanism including executing the programs to perform a calculation or other operation and returning a result to the computer initiating the distribution of the executable.

Broadcast of Streaming Media

One embodiment of the invention provides for the one to many broadcast of streaming media. Streaming media include but are not limited to WEB radio and corporate WEBcasts.

Current broadcast technology requires the originator posses a large server and high speed network connection necessary to open the required channel to each and every destination as illustrated in FIG. 12. Therefore a doubling of destinations requires a doubling of the originator's network bandwidth.

The invention offers an efficient means to broadcast streaming media by sharing the necessary bandwidth and computing power with each destination computer. FIG. 13 illustrates the streaming media possible with the collection of computers created by the invention.

The advantages of the invention over existing solutions are:

(a) The originator's network bandwidth need only be as large as that necessary for a single stream of the media.

(b) The number of destinations may be increased irrespective of the bandwidth of the originator's network connection.

(c) The number of destinations may be increased virtually without limit.

Making a Streaming Media Connection

A WEB radio station is an existing example of streaming media. With current technology, a user with a media player program contacts the station's WEB page, provides the user's network address, and requests to be connected to the station's streaming media server. The media server opens a connection and begins sending the media information to the user's media player at the user's network address. The media information is virtually the same as that sent to every other user.

When using one embodiment of the invention, a user with a media player program and a program implementing the invention contacts the station's WEB page, provides the user's network address, and requests to be connected to the station's streaming media server. The station streaming media server is using a version of the invention.

The media server directs the new user to the logical middle of the collection of computers 10. The new user's computer 32 follows the protocol described in FIGS. 9A-1 to 9P to attach to the collection of computers. Upon attachment to the collection of computers, the new computer 32 will begin receiving the streaming media from the neighbor to which its head 40 is attached.

When yet another computer is attached to the new computer 32, the new computer 32 will forward the streaming media to the added computer.

When a Computer Disconnects or Becomes Unavailable

When a computer in the collection of computers used to broadcast streaming media disconnects or otherwise becomes unavailable, the invention replaces the unavailable computer in the collection of computers using the protocol illustrated in FIGS. 10B and 10C.

Bandwidth Requirements

Each computer in the collection of computers requires an available outbound network bandwidth the same as the inbound network bandwidth of the streaming media. The exceptions are computers which reside on radials 26 which require twice the available outbound bandwidth as inbound bandwidth.

FIG. 14A illustrates a representative embodiment of a high bandwidth computer array in accordance with the present invention. Computers that are members of the array of computers shown in FIG. 14A need to possess a network bandwidth connection equal to at least twice the bandwidth of the stream being distributed. Such computers are referred to in the following discussion as high bandwidth computers 47. As will be recognized by those of ordinary skill in the art, the reason that the high bandwidth computers 47 need to possess a network bandwidth equal to at least twice the bandwidth of the stream being distributed is that each high bandwidth computer 47 needs to be able to relay messages received from its neighbor0 40 to each of two other computers—its neighbor1 41 and its neighbor2 42—when the high bandwidth computer 47 is located on a radial 26. Although high bandwidth computers 47 that are located on an indirect radial 27 at any given time do not necessarily need to possess a network bandwidth equal to at least twice the bandwidth of the stream being distributed at that time, such high bandwidth computers 47 need to have this type of high bandwidth capacity because a high bandwidth computer 47 that at one time is located on an indirect radial 27 can subsequently move to a radial 26 as a result of the self organizing procedures discussed in connection with FIGS. 8A-9P or as a result of the bandwidth availability sorting or failure recovery procedures discussed above.

A Method of Streaming to Low Bandwidth Computers

In some implementations, there may be low bandwidth computers 46 that do not possess a network bandwidth connection equal to at least twice the bandwidth of the stream being distributed or for which support of such bandwidth is undesirable. In these cases, a new topology may be created by connecting low bandwidth computers 46 to the high bandwidth computers 47 seen in FIG. 14A. FIG. 14B illustrates how low bandwidth computers 46 may be connected to high bandwidth computers 47 in a serial fashion much like Christmas tree lights. Each connected low bandwidth computer 46 need only relay a single stream to a single neighbor. In this embodiment, the high bandwidth computers 47 need to possess a network bandwidth connection equal to at least three times the bandwidth of the stream being distributed because each high bandwidth computer 47 needs to be able to relay messages received from its neighbor0 40 to each of three other computers—its neighbor1 41, its neighbor2 42, and the first low bandwidth computer 46 in a serial string of low bandwidth computers 46—at least when the high bandwidth computer 47 is located on a radial 26. It will be recognized by those of ordinary skill in the art that high bandwidth computers 47, when located on an indirect radial 27, will generally utilize only twice the bandwidth of the stream being distributed, although such a computer may subsequently move to a radial 26, as discussed above, where at least three times the bandwidth of the stream being distributed is necessary.

Adding Low Bandwidth Computers to High Bandwidth Computers

Figure 9B:
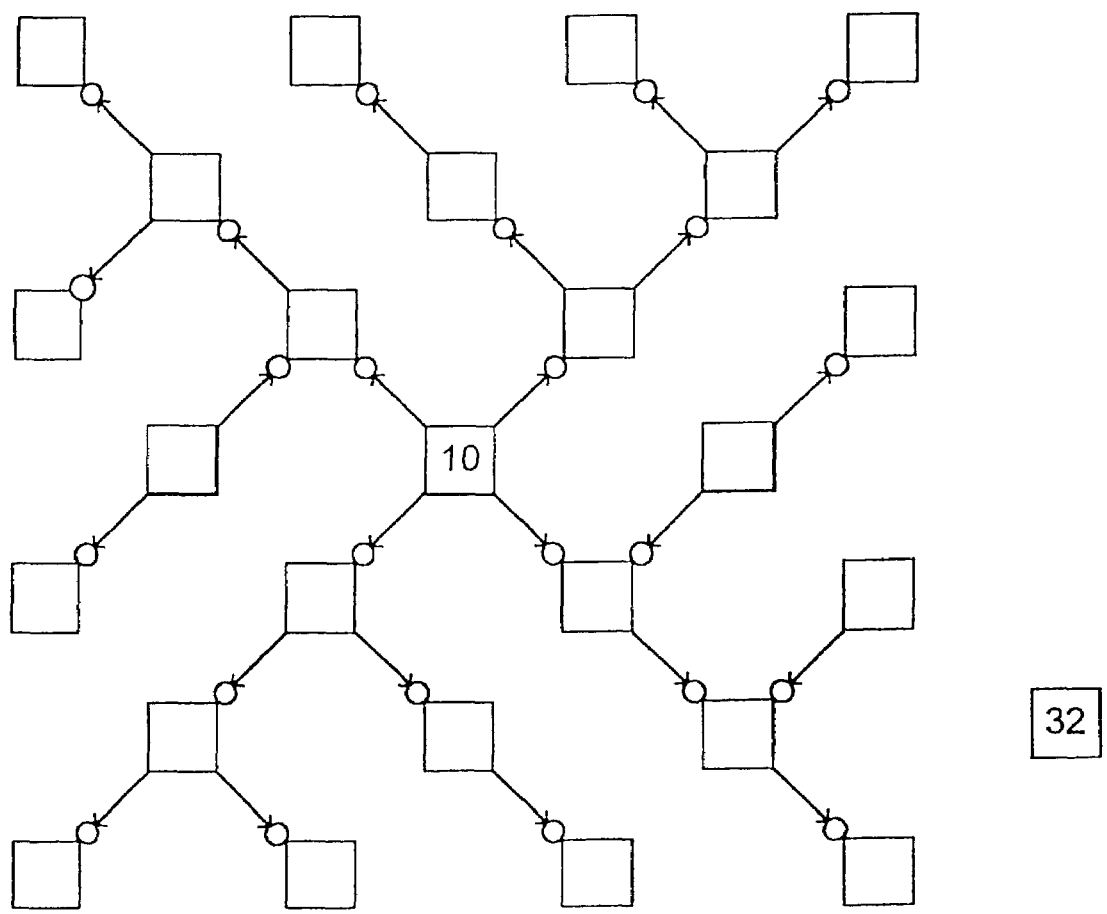

When a computer attempts to locate a found high bandwidth computer as described in connection with FIG. 9B it exchanges a series of messages with the high bandwidth computer 47 to determine if it is high or low bandwidth. If the test determines that the connecting computer is a low bandwidth computer 46, the computer is attached to the string of connected computers attached to the high bandwidth computer 47. The new low bandwidth computer 48 attaches itself in the position closest to the high bandwidth computer 47 as shown in FIG. 15. Existing low bandwidth computers 46 formerly attached to the high bandwidth computer 47 are pushed down one level. In an alternative embodiment, depending on the desired performance characteristics, new low bandwidth computers 46 can instead be attached to the end of the string of connected computers (i.e., to become the last computer 50 in the string (see FIG. 16B)).

Allocating Low Bandwidth Computers to High Bandwidth Computers

To maintain the lowest average delay from a media server (or top computer 11) to receiving computers, a means of allocating slower bandwidth computers to the higher bandwidth computers can be used. A balanced collection of computers will possess the equivalent delay from the media server 11 to the last computer 50, which also represents a collection edge, on the Christmas tree string attached to each high bandwidth computer 47.

A dotted line in FIG. 16A indicates a string 49 of high bandwidth computers 47. FIG. 16B shows a view of low bandwidth computers 46 attached to high bandwidth computers 47 that make up the string 49 of high bandwidth computers 47.

The Importance of Balance

The number of computers in the broadcast path from the logical middle 10 of the collection of computers to the last computer 50 in a string of low bandwidth computers 46 determines the delay of the broadcast message as well as the probability of the message being lost.

A path consisting of a few computers will deliver the broadcast message faster and with less probability of being lost than a path consisting of many computers. For this reason it is desirable to minimize the average path from the logical middle 10 of the collection of computers to the last computer 50 in a string of low bandwidth computers.

A perfectly balanced collection of high bandwidth computers 47 will show the same number of attached low bandwidth computers 46 connected to each high bandwidth computer 47 in the same concentric polygon as shown in FIG. 5A. Furthermore, the number of low bandwidth computers 46 attached to a high bandwidth computer 47 will decrease by one when moving to the next larger concentric polygon.

The string 49 of high bandwidth computers 47 and attached low bandwidth computers 46 shown in FIG. 16B is unbalanced.

Means of Balancing Distribution of Low Bandwidth Computers Attached to High Bandwidth Computers To achieve balance each high bandwidth computer 47 compares the number of low bandwidth computers 46 connected to it plus one to the number of low bandwidth computers 46 connected to its neighbor0 40. Adding one count recognizes that a high bandwidth computer 47 is one computer delay further away from the broadcast server 11 than its neighbor0 40.

If the computer doing the comparison determines that the number of low bandwidth computers 46 connected to it plus one is greater than the number of low bandwidth computers 46 connected to its neighbor0 computer 40, one low bandwidth computer 46 is transferred to the string of low bandwidth computers 46 connected to its neighbor0 40 from the string of low bandwidth computers 46 connected to the computer doing the comparison.

If the computer doing the comparison determines that the number of low bandwidth computers 46 connected to it plus one is less than the number of low bandwidth computers 46 connected to its neighbor0 computer 40, one low bandwidth computer 46 is transferred to the string of low bandwidth computers 46 connected to the computer doing the comparison from the string of low bandwidth computers 46 connected to its neighbor0 40.

The one added to the computer doing the comparison will guarantee that as one traverses the array of connected computers from the media server 10 toward the edge 30 of the array, the length of the strings of low bandwidth computers 46 will decrease.

In the preferred embodiment, when a transfer of a low bandwidth computer 46 is necessary, the low bandwidth computer 46 closest to the high bandwidth computer 47 will be removed. A high bandwidth computer 47 receiving a low bandwidth computer 46 will attach the transferred low bandwidth computer 46 to the position in the string closest to the high bandwidth computer 47.

The result of balancing is illustrated in FIG. 16C.

Error Recovery for Strings of Low Bandwidth Computers

Should a low bandwidth computer 46 in the string of computers fail or be unable to communicate, the neighbor2 42 of the stricken computer will disconnect itself from the failed computer and its own neighbor2 42 and attempt to reconnect to the high bandwidth computer as shown in FIG. 17. The neighbor2 42 disconnection will cause each computer on the string to disconnect and reconnect in succession to the high bandwidth computer.

In the illustrative example shown in FIG. 17, a string of four low bandwidth computers 46(1)-(4) is connected to a high bandwidth computer 47 at step 1. At step 2, the second low bandwidth computer 46(2) fails. As a result, the third and fourth low bandwidth computers 46(3) and 46(4) lose contact with the collection of computers. At step 3, the third and fourth low bandwidth computers 46(3) and 46(4) disconnect from one another, and the third low bandwidth computer 46(3) attempts to reconnect to the high bandwidth computer 47. Upon reconnecting, the first low bandwidth computer 46(1) is moved down in the reconstructed string and becomes the neighbor2 42 of the third low bandwidth computer 46(3). After the third low bandwidth computer 46(3) reconnects to the high bandwidth computer, the fourth low bandwidth computer 46(4) attempts to reconnect to the high bandwidth computer 47 at step 4. Upon reconnecting, the third low bandwidth computer 46(3) is moved down in the reconstructed string and becomes the neighbor2 42 of the fourth low bandwidth computer 46(4) as shown in step 5.

If, however, a disconnected computer 46 is unable to reconnect to the high bandwidth computer 47 to which it was previously associated, the disconnected computer 46 will attempt to locate a found computer using the strategies described in State 1.

LAN Multicast

In another embodiment of the invention, some of the computers in the collection of computers may be connected via a local area network. A local area network (LAN) is a high speed electronic connection between computers located in close physical proximity. A local area network will not consist of components of a public network such as the Internet.

When multiple computers on a LAN request connection to the array of computers, multiple redundant broadcast streams will be present on the LAN. As shown in FIG. 18, the redundancy may be removed by use of LAN multicast working in concert with the invention.

A LAN connected master computer 53 may be either a high bandwidth computer 47 or a low bandwidth computer 46 as shown in FIG. 14A and FIG. 14B. The LAN connected master computer 53 connects to the collection of computers via an Internet cloud 51 through a gateway router 52.

LAN Multicast allows a single User Datagram Protocol (UDP) packet to be sensed by all the computers connected to a LAN.

The LAN connected computer receives a broadcast through the following mechanism:

1. When a LAN connected computer attempts to locate a broadcast stream from a specific logical middle of the collection of computers 10, it first sends a multicast UDP packet requesting the Internet Protocol (IP) and port address of a LAN connected master computer 53 to all computers connected to the LAN 55.
2. If a LAN connected master computer 53 is present on the LAN, the master computer 53 responds back to the sender of the UDP packet with its LAN Internet Protocol (IP) address and the Internet port on which the rebroadcast UPD stream 57 may be found.
3. The LAN connected computer receives the IP and port address and becomes a LAN connected slave computer 54 listening to the rebroadcast message on the indicated IP and port address.
4. If a LAN connected computer receives no response to its multicast UDP packet requesting a LAN connected master computer 53, the computer contacts the logical middle of the collection of computers 10 and positions itself in the collection of computers using the state diagrams described in FIGS. 9A-9P. The LAN connected computer now becomes a LAN connected master computer 53 and will begin receiving the broadcast stream as the inbound TCP/IP stream 56.
5. Should the LAN connected master computer 53 subsequently receive a broadcast UDP packet requesting a master computer 53, it will assign an available port for the rebroadcast UDP stream 57 and respond back to the requesting LAN computer with the IP address and port to receive the stream. The LAN connected master computer 53 will then begin rebroadcasting the stream received on the inbound TCP/IP stream 56 on the rebroadcast UDP stream 57 for all LAN connected slave computers 54 to receive.

Since a new LAN connected master computer 53 assigns an available port for the rebroadcast of the UDP stream, a multiplicity of different broadcast streams using a multiplicity of different ports may exist at the same time on the LAN.

Moreover, because the LAN connected master computer 53 positions itself in the collection of computers as discussed in connection with FIGS. 9A-9P, the LAN connected master computer 53 will typically need to pass the received broadcast to a neighbor2 42 and possibly a neighbor1 41 of the collection of computers. These neighbor1 41 and neighbor2 computers 41 and 42, in accordance with this embodiment, will generally be connected to the LAN connected master computer 53 via the Internet cloud 51. Accordingly, the LAN connected master computer 53 will pass the received broadcast to its neighbor1 and neighbor2 computers 41 and 42 across the LAN 55, through the gateway router 52, and via the Internet cloud 51.

A Visual Real Time Monitor for Rendering an Array of Interconnected Computers

In accordance with another embodiment of the invention, visual means for displaying the behavior of the array of interconnected computers makes management of the array easier. A preferred embodiment of display depicting high bandwidth computers 47 is shown in FIG. 19. A monitor 59 will display relevant broadcast parameters in a broadcast parameter window 60. Shaded squares 62 within a display window 64 indicate connected computers. Each shaded square 62 may be right clicked on by a mouse revealing information specific to that computer including its neighbors in a properties window 66.

The display 59 may also include a pop-up window 68 for revealing low bandwidth computers 46 connected to a particular high bandwidth computer 47 represented by a selected shaded square 62 as shown in FIG. 20.

The display 59 may also include a pop-up window 70 for revealing computers connected to a master computer 53 on a LAN 55, which is represented by a selected shaded square 62 as shown in FIG. 52.

Establishing Logical Center Startup Parameters

In some embodiments of a streaming media system built from the array of connected computers, a means of limiting performance may be desired in order to differentiate products. To accomplish such a performance limitation, the following parameters may be associated with each logical center computer:

1. Maximum streaming bandwidth.
2. Maximum number of connected computers.
3. Expiration date.

These parameters may be established at installation. In a preferred embodiment, the parameters will be encrypted so as to limit hacking. A mathematical checksum may be generated over the parameters and compared with the known value held in a controlling computer. In this manner, the controlling computer may from time to time confirm the parameters have not been altered.

A means of remotely updating the parameters will allow easy field upgrading of the logical center's capabilities.

Advantages of the Invention

The invention possesses the following advantages over the previous art include:

(a) The ability to broadcast a message from any computer in a collection of computers to broadcast to the balance of the collection by distributing the computing power and communications bandwidth required by the broadcast to the collection of computers.

(b) The ability of any computer in a collection of computers to search for content in a collection of computer by distributing the computing power and communication bandwidth required by the search to the collection of computers.

(c) The ability of any computer in a collection of computers to search for another computer in the collection of computers by a name or other identifying characteristic by distributing the computing power and communication bandwidth required by the search to the collection of computers.

(d) The ability to self organize computers into a collection of computers such that the computing power and communication bandwidth of the collection may be used to broadcast from one computer to the balance of computers in the collection; such that the computing power and communication bandwidth of the collection may be used to search for content existing on the collection of computers; and such that the computing power and communication bandwidth of the collection may be used to locate a computer in the collection by name or other identifying characteristic.

(e) The ability to self organize computers which possess transient network addresses into a collection of computers such that the computing power and communication bandwidth of the collection may be used to broadcast from one computer to the balance of computers in the collection; such that the computing power and communication bandwidth of the collection may be used to search for content existing on the collection of computers; and such that the computing power and communication bandwidth of the collection may be used to locate a computer in the collection by name or other identifying characteristic.

(f) The ability of an organized collection of computers to self repair itself after some computers become inoperative to an attack or technical malfunction.

(g) The ability to efficiently distribute or search for information across an entire universe of computers, processors, or communication nodes while maintaining security and robustness. The invention can be used, for example, to support streaming video or other streaming data, to provide a global search ability in which each individual computer can initiate a search of the entire universe of computers, or to support battle management communications (e.g., to distribute or collect information among satellites in a satellite defensive system or to coordinate large numbers of individual units, such as robots or unmanned aircraft, in connection with swarm technologies).

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for logically configuring a set of computers into a network of computers, the set of computers being comprised of a first set of high bandwidth computers comprising:
   selecting a first high bandwidth computer of the set of high bandwidth computers to serve as a logical center of the network of computers;
   identifying a second set of high bandwidth computers and a set of low bandwidth computers to be added to the network of computers computer based on a bandwidth connection capacity;
   adding the second set of high bandwidth computers to the network of computers;
   each computer of the second set of high bandwidth computers logically configuring the network of computers into a plurality of concentric polygons, wherein each added computer of the second set of high bandwidth computers operates to:
   find a second high bandwidth computer in of the first set of high bandwidth collection of computers;
   follow one of a radial and an indirect radial that includes the second high bandwidth computer to a collection edge, said radial comprising a series set of logically adjacent radial high bandwidth computers of the first set of high bandwidth computers that logically extends from the logical center, and the indirect radial comprising a series set of logically adjacent indirect radial high bandwidth computers of the first set of high bandwidth computers that logically extends from one of the set of logically adjacent radial high bandwidth computers, wherein the collection edge comprises a logically outermost high bandwidth computer of the first set of high bandwidth computers on said one of the radial and the indirect radial; and
   logically attach to the collection edge; and
   adding the set of low bandwidth computers to the network of computers; to and logically configuring the set of low bandwidth computers into a plurality of serial strings, each serial string logically attached to a first corresponding one of said the high bandwidth computers in the group of the first set of high bandwidth computers and the second set of high bandwidth computers.

2. The method of claim 1, wherein the step of adding the set of low bandwidth computers comprises attaching each low bandwidth computer to a particular one of said serial strings in a position closest to the corresponding one of the high bandwidth computers, wherein each low bandwidth computer previously attached to said the serial string is pushed down one level in said serial string.

3. The method of claim 1, further comprising the steps of:
   comparing a number of low bandwidth computers in a first one of the serial strings to a number of low bandwidth computers in a second one of the serial strings, said second serial string attached to a second corresponding high bandwidth computer that is logically adjacent to a the first corresponding high bandwidth; and
   moving a low bandwidth computer from said first serial string to said second serial string, based on said comparison, as necessary to maintain a balanced distribution.

4. The method of claim 1, further comprising: identifying a first computer to be added to the network of computers as being connected to a local area network (LAN);
   determining if said LAN includes a second computer that comprises a computer in said the network of computers;
   attaching said first LAN-connected computer to said second computer via a LAN multicast if said LAN is determined to include a computer in said—the network of computers; and
   performing said the step of identifying the first LAN-connected computer as being one of a high bandwidth computer and a low bandwidth computer if said LAN is determined to not include a computer in said network of computers.

5. The method of claim 1, further comprising displaying a representation of the logical configuration of said the set of high bandwidth computers.

6. The method of claim 5, further comprising: receiving an operator selection of a high bandwidth computer from said displayed representation; and displaying information relating to the selected high bandwidth computer, said information selected from the group consisting of broadcast parameters, properties, neighbor identifiers, and identifiers of low bandwidth computers forming a serial string that is logically attached to the selected high bandwidth computer.

7. A method for logically configuring a collection of computers, comprising:
   selecting a computer to serve as a logical center of the collection of computers; arranging computers from the collection of computers such that the collection of computers are logically configured to form a plurality of successively higher concentric polygon levels around the logical center;

adding a computer to the collection of computers;

determining that the added computer is physically connected to a local area network (LAN);

determining whether the LAN includes a previously added computer of the collection of computers;

if the LAN does not include a previously added computer, logically connecting the added computer to a computer in the collection of computers, located at a collection edge, wherein the collection edge comprises a logical outer edge of the collection of computers and forms at least a partial concentric polygon level around the plurality of concentric polygon levels;

if the LAN does include a previously added computer, logically connecting said added computer to receive a LAN multicast from said previously added computer; and sending a message from a top computer of the collection of computers to each of a plurality of neighboring radial computers, each neighboring radial computer forwarding the message to another neighboring radial computer and to a neighboring indirect radial computer, such that the message is forwarded to each computer in the collection of computers only once.

8. The method of claim 7, further comprising, when the LAN does not include a previously added computer, repeating the steps of:

changing a logical location of the added computer to a next lower concentric polygon level if a computer in the collection of computers is not situated at a logical position that neighbors the added computer at the next lower concentric polygon level; and changing a logical location of the added computer to a logically adjacent position on a current concentric polygon level of the added computer if a computer in the collection of computers is not situated at said logically adjacent position.

9. The method of claim 7, further comprising, prior to the step of logically connecting the added computer to a computer located at a collection edge, locating the collection edge by: identifying a previously connected computer in said collection of computers, and following one of a radial and an indirect radial to the collection edge, said radial comprising a series of logically adjacent radial computers that logically extend from the logical center, and said indirect radial comprising a series of logically adjacent indirect radial computers that logically extend from one of the radial computers, wherein the collection edge comprises a logically outermost computer on said one of the radial and the indirect radial.

10. The method of claim 7, further comprising, subsequent to said step of logically connecting the added computer to the computer located at the collection edge:

receiving a request via the LAN for a LAN-connected computer of said collection of computers; and responding to said request with information for connecting to a LAN multicast transmitted by said added computer.

11. The method of claim 7, further comprising displaying a representation of the logical configuration of said collection of computers.

12. The method of claim 11, further comprising:

receiving an operator selection of a computer connected to said LAN from said displayed representation; and displaying information relating to the selected computer connected to said LAN, said information selected from the group consisting of broadcast parameters, properties, neighbor identifiers, and identifiers of computers of said collection of computers connected to said LAN.

* * * * *